(12) United States Patent
Ikoma et al.

(10) Patent No.: US 11,574,221 B2
(45) Date of Patent: Feb. 7, 2023

(54) STATE DETERMINATION APPARATUS, STATE DETERMINATION METHOD, AND INTEGRATED CIRCUIT

(71) Applicants: MegaChips Corporation, Osaka (JP); Kyushu Institute of Technology, Kitakyushu (JP)

(72) Inventors: Norikazu Ikoma, Fukuoka (JP); Hiromu Hasegawa, Osaka (JP)

(73) Assignees: MEGACHIPS CORPORATION, Osaka (JP); KYUSHU INSTITUTE OF TECHNOLOGY, Kitakyushu (JP)

( * ) Notice: Subject to any disclaimer, the term of this patent is extended or adjusted under 35 U.S.C. 154(b) by 1096 days.

(21) Appl. No.: 15/498,006

(22) Filed: Apr. 26, 2017

(65) Prior Publication Data

US 2017/0316332 A1    Nov. 2, 2017

(30) Foreign Application Priority Data

Apr. 27, 2016 (JP) .............................. JP2016-089034

(51) Int. Cl.
   *G06N 7/00*      (2006.01)
   *G06N 20/00*     (2019.01)

(52) U.S. Cl.
   CPC ............. *G06N 7/005* (2013.01); *G06N 20/00* (2019.01)

(58) Field of Classification Search
   CPC ................................ G06N 7/005; G06N 20/00
   See application file for complete search history.

(56) References Cited

U.S. PATENT DOCUMENTS 5,963,667 A * 10/1999 Hashimoto ............ G06V 10/88
                                                    382/280
6,522,266 B1 * 2/2003 Soehren ............... A61B 5/7264
                                                    340/988

(Continued)

FOREIGN PATENT DOCUMENTS

JP          2007-202964         8/2007

OTHER PUBLICATIONS

Lyon, "Why are Normal Distributions Normal?", 2014, The British Journal for the Philosophy of Science, 65, pp. 621-649. (Year: 2014).*

(Continued)

*Primary Examiner* — Alexey Shmatov
*Assistant Examiner* — Clint Mullinax
(74) *Attorney, Agent, or Firm* — Xsensus LLP

(57) ABSTRACT

Provided is a state determination apparatus that appropriately performs pattern classification processing and/or pattern determination processing even when a map generated by the SOM technique includes discontinuous image regions. In the state determination apparatus, the matching processing unit obtains adaptability data indicating a correlation degree between template data indicating a state and the SOM output data. The state determination unit obtains a state evaluation value based on an activity value obtained by the activity value obtaining unit and the adaptability value. The time series estimation unit determines a state of an input data based on the state evaluation value and state transition probability between states. This allows for appropriately performing pattern classification processing and/or pattern determination processing even when a map generated by the SOM technique includes discontinuous image regions.

16 Claims, 26 Drawing Sheets

(56) References Cited

U.S. PATENT DOCUMENTS

| | | | |
|---|---|---|---|
| 9,639,746 B2* | 5/2017 | Bulzacki | G06K 9/6201 |
| 2005/0135667 A1* | 6/2005 | Saarela | G06V 10/993 |
| | | | 382/141 |
| 2005/0197590 A1* | 9/2005 | Osorio | A61B 5/048 |
| | | | 600/544 |
| 2008/0288493 A1* | 11/2008 | Yang | G06V 40/20 |
| 2012/0036097 A1* | 2/2012 | Prokhorov | G06K 9/00845 |
| | | | 706/20 |
| 2013/0073223 A1* | 3/2013 | Lapira | G06F 19/00 |
| | | | 702/34 |

OTHER PUBLICATIONS

Jalal et al, "Human Daily Activity Recognition with Joint plus Body Features Representation Using Kinect Sensor", 2015, International Conference on Informatics, Electronics & Vision (ICIEV), pp. 1-6. (Year: 2015).*

* cited by examiner

State transition probability

| | | State at the next timing t+1 | | | | | |
|---|---|---|---|---|---|---|---|
| | | Sitting (S1) | Standing (S2) | Running (S3) | Walking (S4) | UpStairs (S5) | DownStairs (S6) | Total |
| State at present timing t | Sitting (S1) | 0.990 | 0.010 | 0.000 | 0.000 | 0.000 | 0.000 | 1.000 |
| | Standing (S2) | 0.004 | 0.990 | 0.002 | 0.004 | 0.000 | 0.000 | 1.000 |
| | Running (S3) | 0.000 | 0.000 | 0.990 | 0.008 | 0.001 | 0.001 | 1.000 |
| | Walking (S4) | 0.000 | 0.006 | 0.002 | 0.990 | 0.001 | 0.001 | 1.000 |
| | UpStairs (S5) | 0.000 | 0.001 | 0.001 | 0.007 | 0.990 | 0.001 | 1.000 |
| | DownStairs (S6) | 0.000 | 0.001 | 0.001 | 0.007 | 0.001 | 0.990 | 1.000 |

FIG. 15

| State | pre_Pt(x) | Transition probability from state S4 | The number of particles to be moved | Pt(x) | D_deci(x) | Pt(x) * D_deci(x) | post_Pt(x) |
|---|---|---|---|---|---|---|---|
| S1 | 250 | 0.000 | 0 | 250 | 0.0 | 0.00 | 0 |
| S2 | 250 | 0.006 | 18 | 268 | 0.0 | 0.00 | 0 |
| S3 | 250 | 0.002 | 6 | 256 | 0.0 | 0.00 | 0 |
| S4 | 3000 | 0.990 | 2970 | 2970 | 0.5 | 1485.00 | 3884 |
| S5 | 1000 | 0.001 | 3 | 1003 | 0.4 | 401.20 | 1049 |
| S6 | 250 | 0.001 | 3 | 253 | 0.1 | 25.30 | 66 |
| Total | 5000 | 1.0 | 3000 | 5000 | 1.0 | 1911.50 | 5000 |

FIG. 20

STATE DETERMINATION APPARATUS, STATE DETERMINATION METHOD, AND INTEGRATED CIRCUIT

This application claims priority to Japanese Patent Application No. 2016-089034 filed on Apr. 27, 2016, the entire disclosure of which is hereby incorporated herein by reference.

BACKGROUND OF THE INVENTION

Field of the Invention

The present disclosure relates a technique that analyzes input data using SOM (Self-organizing map) to determine a state (pattern) indicating the input data.

Description of the Background Art

Self-organizing map (hereinafter referred to as "SOM") is achieved by modeling the visual cortex in the cerebral cortex. In the SOM, mapping input data into any-number-dimensional data by unsupervised machine learning enables visualization of multiple dimensional data (e.g., pattern classification). For example, the SOM maps high-dimensional input data into two-dimensional data, thereby enabling the high-dimensional input data to be projected in a second-dimensional map. Using the projected two-dimensional data (two-dimensional map) allows for performing classification processing of the input data (pattern classification processing). In the SOM, observing the projected two-dimensional data (two-dimensional map) through the above-described processing allows for visually and easily grasping a state for classification of the input data; thus the SOM is used in various fields.

For example, Patent Literature 1 (Japanese Unexamined Patent Publication No 2007-202964) discloses a technique of performing waveform analysis using the SOM.

The technique disclosed by Patent Literature 1 creates a waveform map using the SOM such that each of regions representing a waveform pattern forms a continuous region. As shown in FIG. 16 in Patent Literature 1, the technique of Patent Literature 1 creates a waveform map in which continuous image regions listed below only exist (no split image regions exist) and the continuous image regions are clearly arranged.

(1) Image region representing the waveform A+
(2) Image region representing the waveform A
(3) Image region representing the waveform B+
(4) Image region representing the waveform B
(5) Image region representing the waveform C+
(6) Image region representing the waveform C
(7) Image region representing the waveform D+
(8) Image region representing the waveform D In the technique of Patent Literature 1, performing classification processing using the above-described waveform map allows the input waveform data to be classified appropriately (it is possible to determine that the input waveform data is similar to a waveform pattern).

However, the technique of Patent Literature 1 needs to generate the waveform map using the SOM technique such that a region representing a waveform pattern forms a continuous region. Thus, it is difficult for the technique of Patent Literature 1 to perform classification processing or pattern determination processing using a waveform map having discontinuous image regions (e.g., split image regions). In other words, with the conventional technique, the existence of discontinuous image regions (e.g., split image regions) in the map generated by the SOM technique makes it difficult to appropriately perform classification processing or pattern determination processing.

To solve the above problems, it is an object of the present invention to provide a state determination apparatus, a state determination method and an integrated circuit that appropriately perform pattern classification processing and/or pattern determination processing even when a map generated by the SOM technique includes discontinuous image regions (e.g., split image regions).

SUMMARY

To solve the above problem, a first aspect of the present invention provides a state determination apparatus including feature vector obtaining circuitry, normalization circuitry, mapping conversion circuitry, matching processing circuitry, state determination circuitry, and time series estimation circuitry.

The feature vector obtaining circuitry is configured to obtain feature vector data from measured data obtained by measuring an event with an unknown state.

The normalization circuitry is configured to obtain a norm of the feature vector data and obtain normalized feature vector data by normalizing the feature vector data.

The mapping conversion circuitry is configured to obtain SOM output data by mapping the feature vector data into a space whose dimension differs from a dimension of the feature vector data.

The matching processing circuitry is configured to obtain adaptability data indicating a correlation degree between template data indicating a state and the SOM output data obtained by the mapping conversion circuitry.

The state determination circuitry is configured to obtain a state evaluation value based on the adaptability data obtained by the matching processing circuitry.

The time series estimation circuitry is configured to estimate a state indicated by the measured data based on the state evaluation value and state transition probability between states.

BRIEF DESCRIPTION OF THE DRAWINGS

FIG. 15 is a table showing state transition probabilities for States 1 to 6.

FIG. 20 is a diagram describing particle filter processing.

DESCRIPTION OF THE PREFERRED EMBODIMENTS

First Embodiment

A first embodiment will now be described with reference to the drawings.

1.1 Structure of State Determination Apparatus

Figure 1:
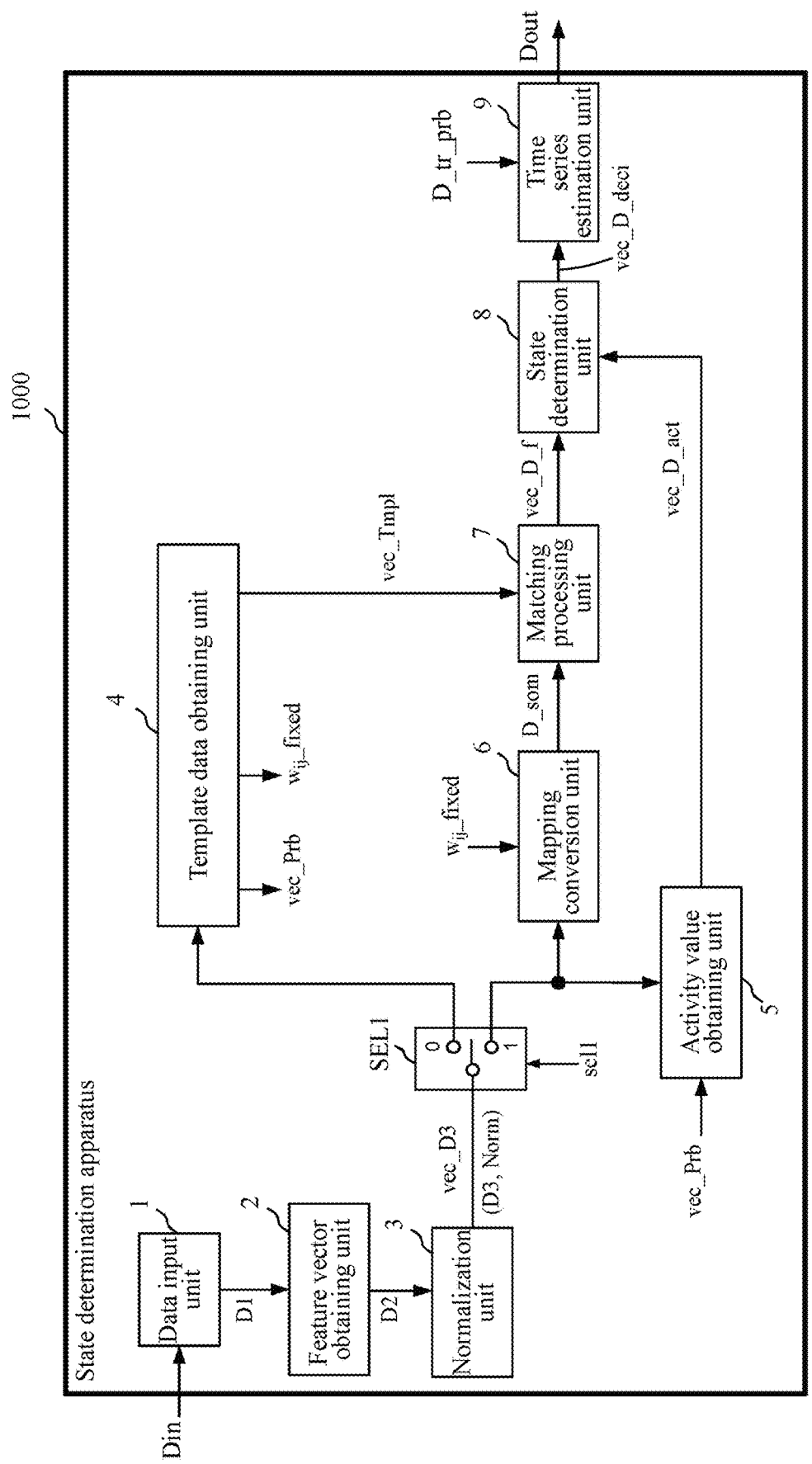
FIG. 1 is a schematic diagram of a state determination apparatus 1000 according to a first embodiment.

FIG. 1 is a schematic diagram of a state determination apparatus 1000 according to the first embodiment.

Figure 2:
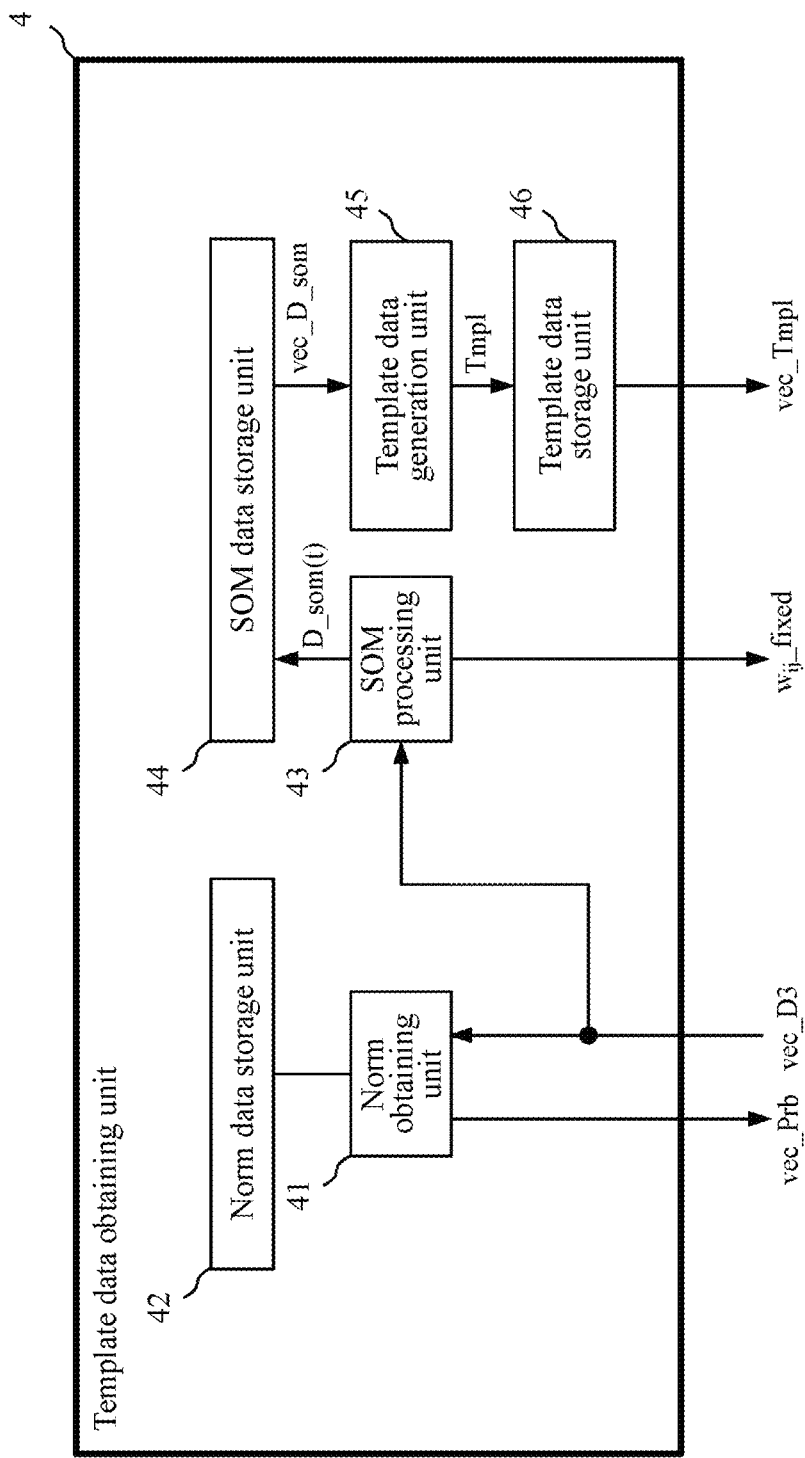
FIG. 2 is a schematic diagram of a template data obtaining unit 4 according to the first embodiment.

FIG. 2 is a schematic diagram of a template data obtaining unit 4 according to the first embodiment.

Figure 3:
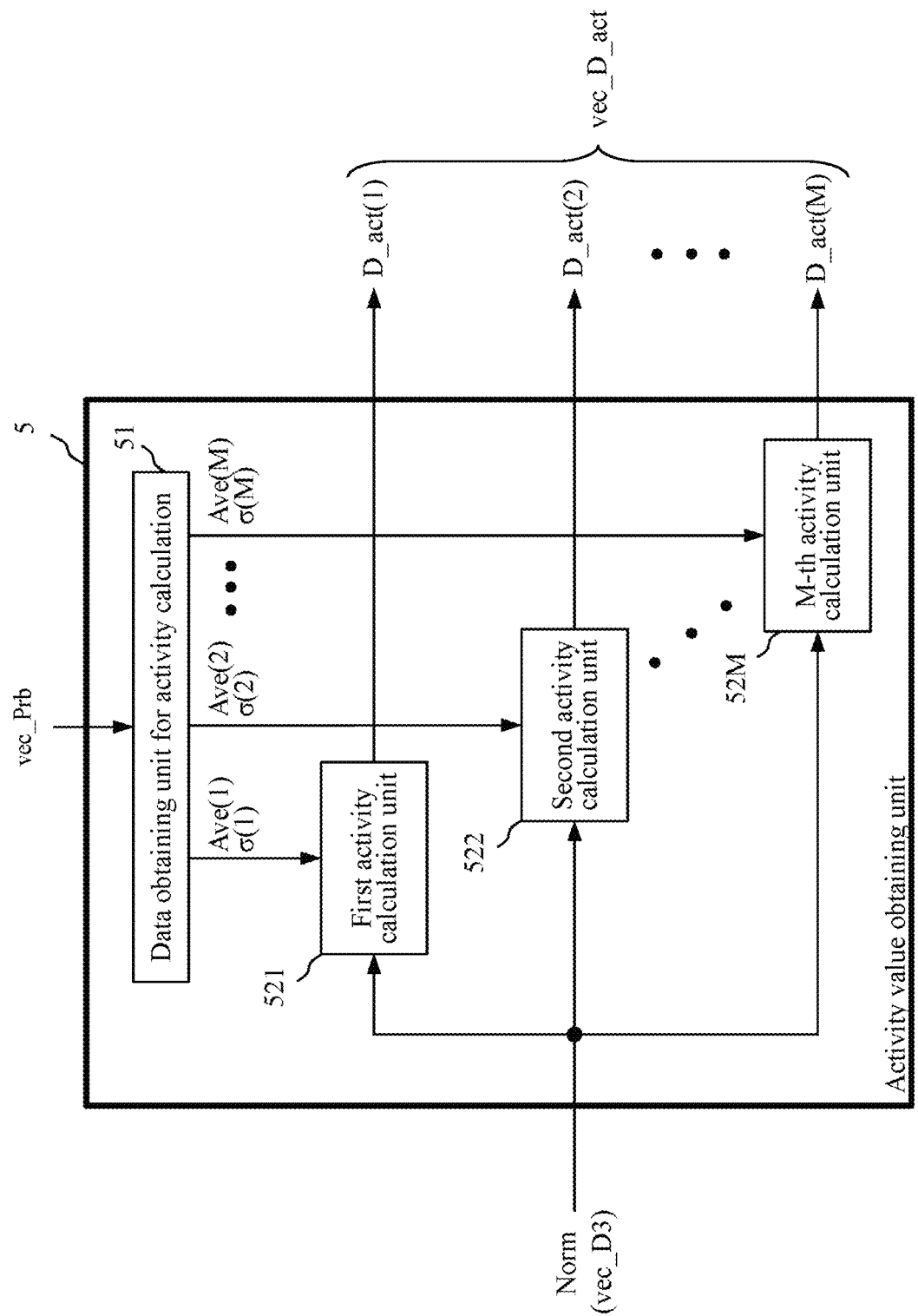
FIG. 3 is a schematic diagram of an activity value obtaining unit 5 according to the first embodiment.

FIG. 3 is a schematic diagram of an activity value obtaining unit 5 according to the first embodiment.

Figure 4:
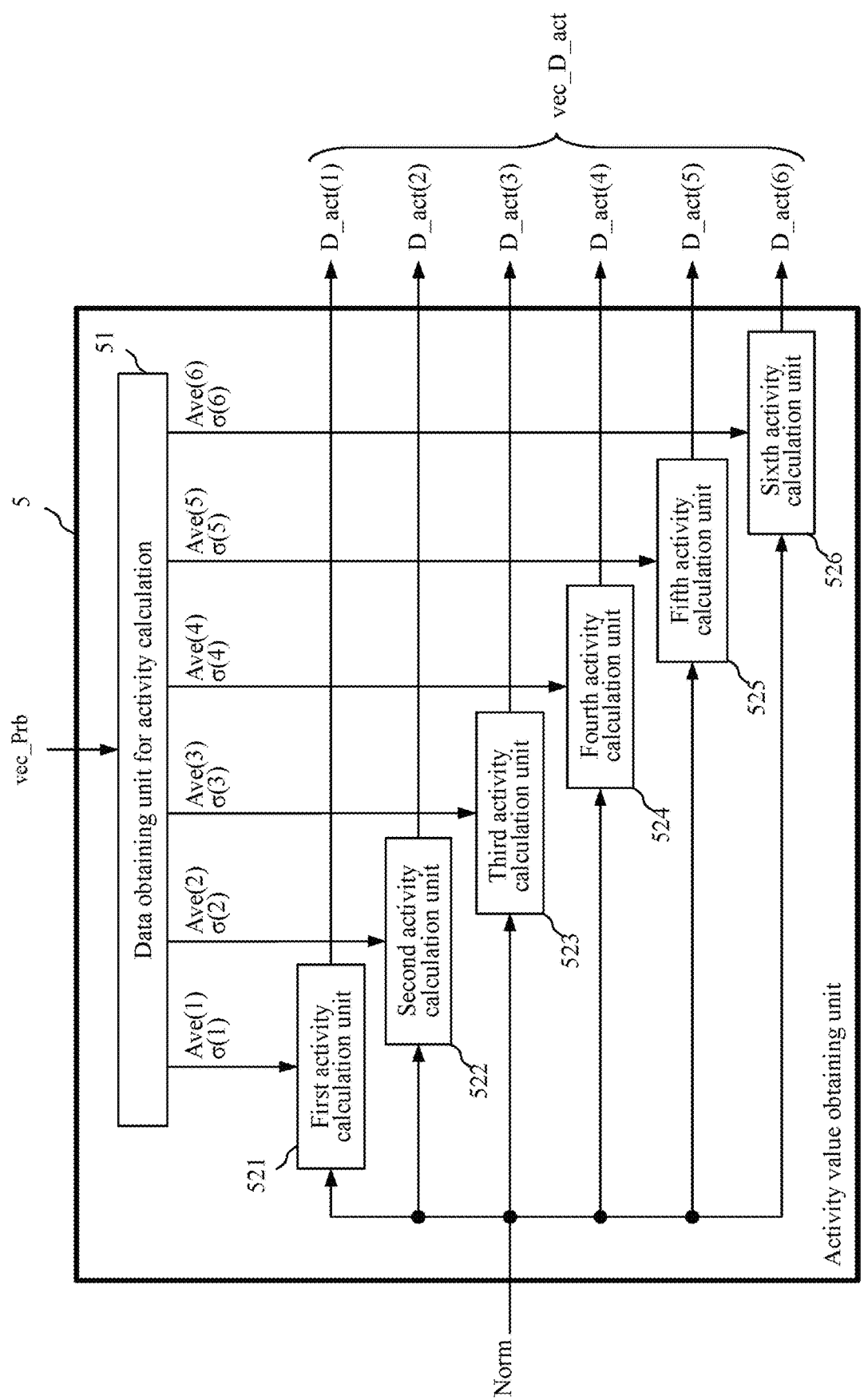
FIG. 4 is a schematic diagram of the activity value obtaining unit 5 in the case of M=6.

FIG. 4 is a schematic diagram of the activity value obtaining unit 5 in the case of M=6.

Figure 5:
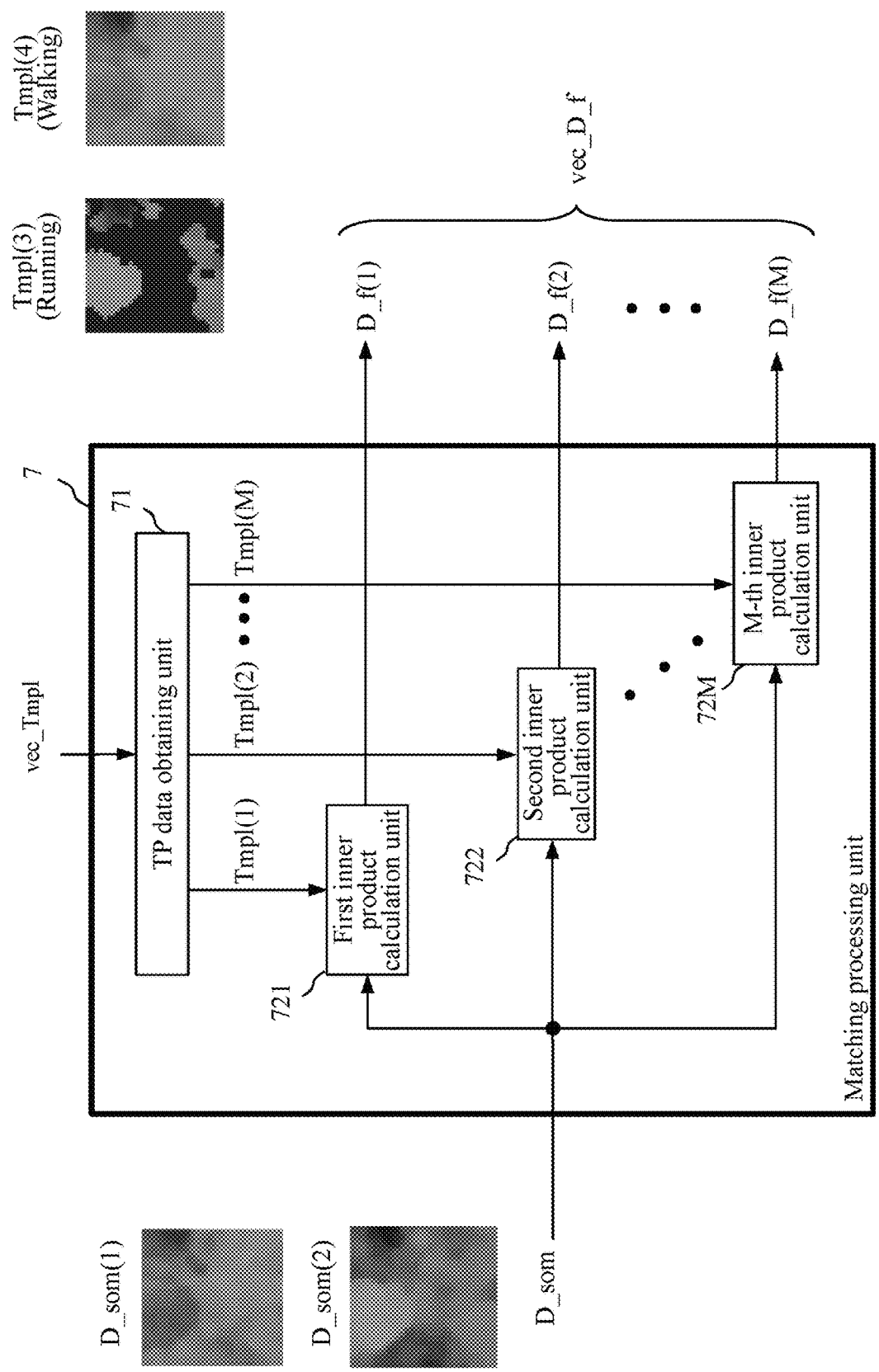
FIG. 5 is a schematic diagram of a matching processing unit 7 according to the first embodiment.

FIG. 5 is a schematic diagram of a matching processing unit 7 according to the first embodiment.

Figure 6:
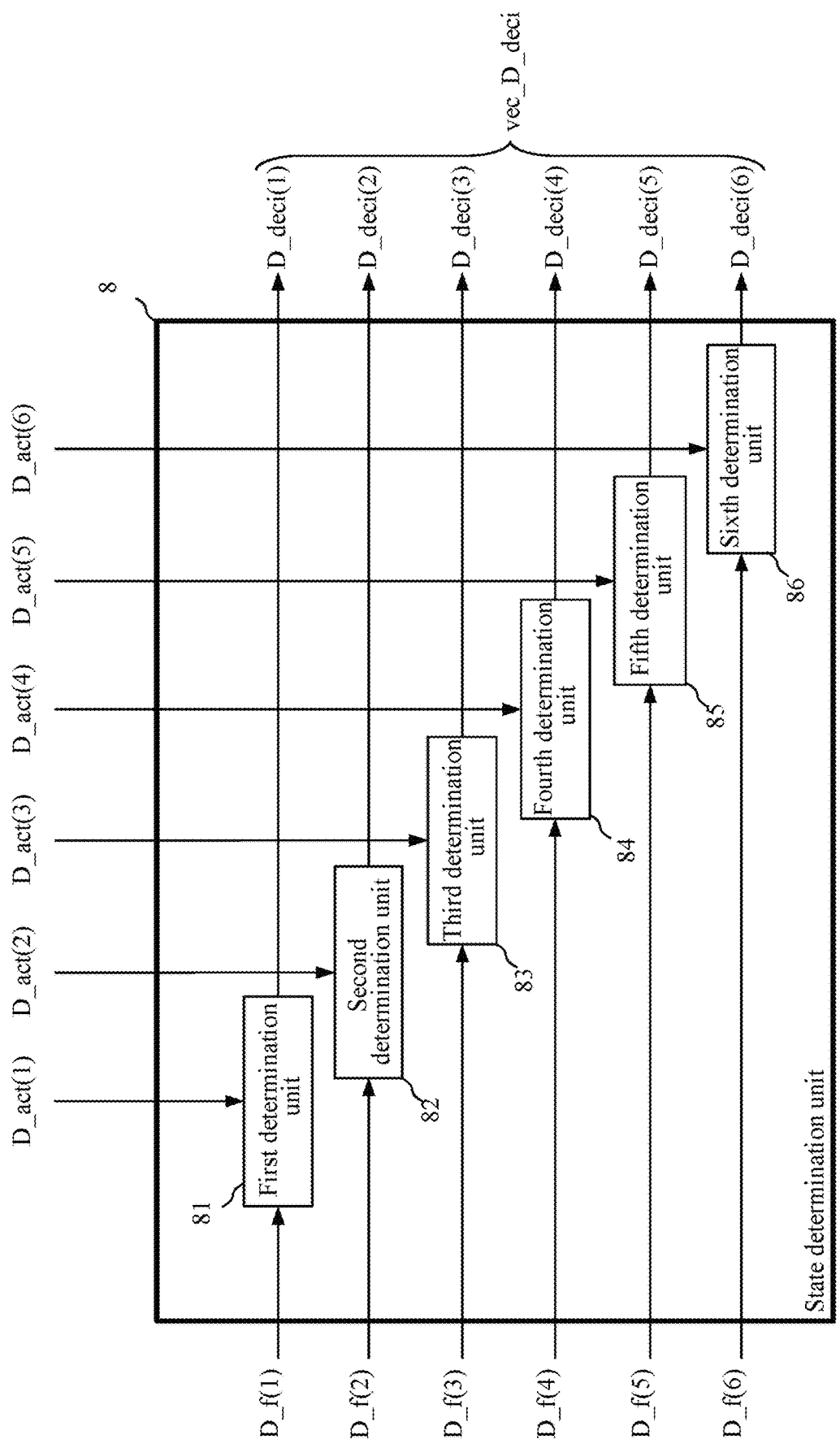
FIG. 6 is a schematic diagram of a state determination unit 8 according to the first embodiment in the case of M=6.

FIG. 6 is a schematic diagram of a state determination unit 8 according to the first embodiment in the case of M=6.

Figure 7:
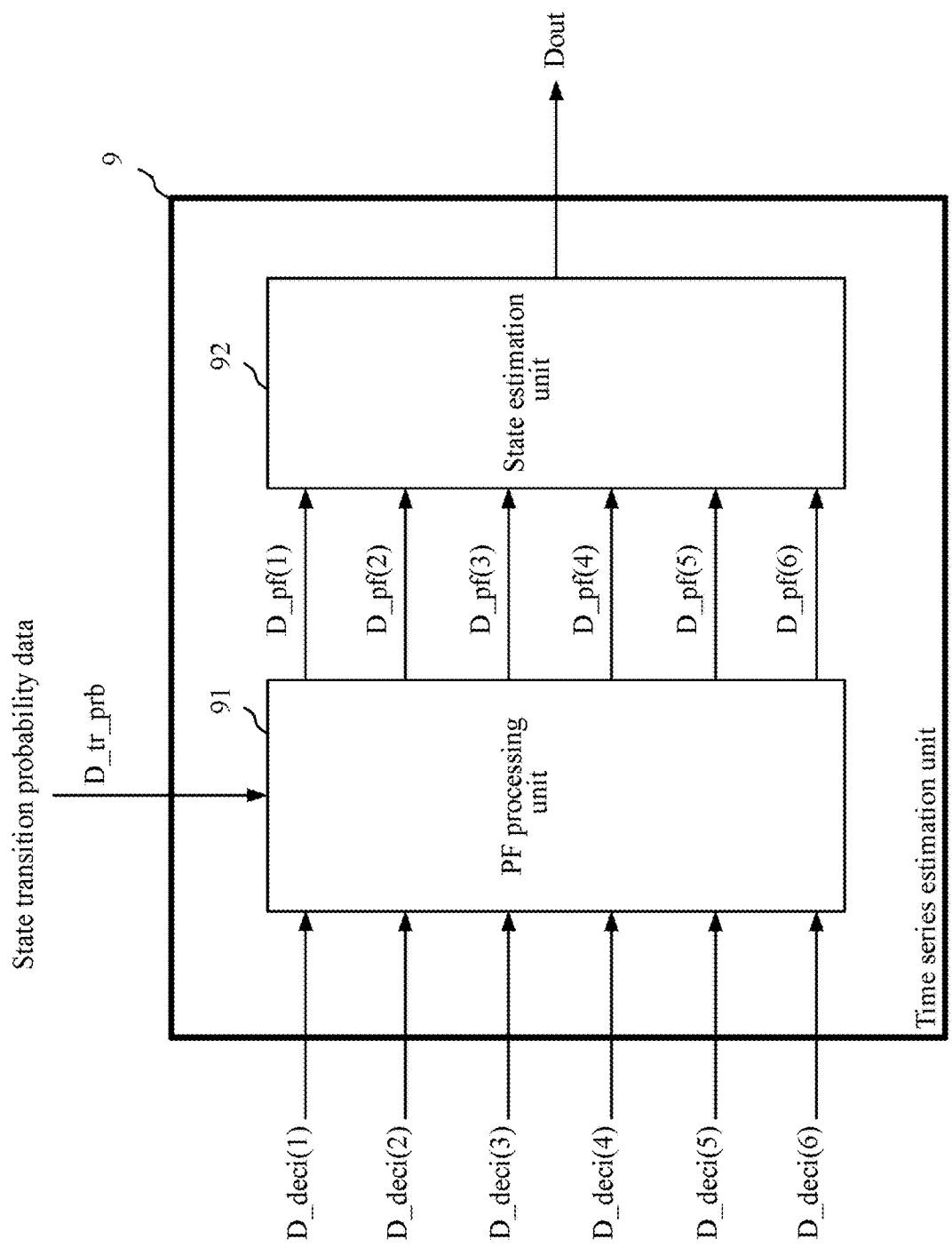
FIG. 7 is a schematic diagram of a time series estimation unit 9 according to the first embodiment in the case of M=6.

FIG. 7 is a schematic diagram of a time series estimation unit 9 according to the first embodiment in the case of M=6.

As shown in FIG. 1, the state determination apparatus 1000 includes a data input unit 1, a feature vector obtaining unit 2, selector SEL1, a normalization unit 3, a template data obtaining unit 4, an activity value obtaining unit 5, a mapping conversion unit 6, a matching processing unit 7, a state determination unit 8, and a time series estimation unit 9.

The data input unit 1 receives an electric signal (sensor output signal) outputted from a sensor (e.g., an acceleration sensor) for example. The data input unit 1 converts the received electric signal into a digital signal, and then transmits the converted signal, as a signal D1, to the feature vector obtaining unit 2.

The feature vector obtaining unit 2 receives the signal D1 transmitted from the data input unit 1. The feature vector obtaining unit 2, for example, performs frequency transform on the received signal D1 to obtain a feature vector. The feature vector obtaining unit 2 then transmits the obtained feature vector data to the normalization unit 3 as a signal D2 (feature vector data D2).

The normalization unit 3 receives the signal D2 (feature vector data D2) transmitted from the feature vector obtaining unit 2. The normalization unit 3 obtains a norm (norm data) Norm from the feature vector data D2 and performs normalization processing on the feature vector data D2 to obtain a normalized feature vector data D3. The normalization unit 3 then transmits the obtained norm data Norm and the normalized feature vector data D3, as vector data vec_D3, to the selector SEL1.

The selector SEL1 receives the vector data D3 transmitted from the normalization unit 3. The selector SEL1 transmits the vector data D3, in accordance with a selecting signal sel1, to (1) the template data obtaining unit 4 or (2) the activity value obtaining unit 5 and the mapping conversion unit 6. Note that the selecting signal sel 1 is generated by a controller (not shown) that controls the various functional units of the state determination apparatus 1000.

As shown in FIG. 2, the template data obtaining unit 4 includes a norm obtaining unit 41, a norm data storage unit 42, an SOM processing unit 43, an SOM data storage unit 44, a template data generation unit 45, and a template data storage unit 46.

The norm obtaining unit 41 receives the vector data vec_D3 transmitted from the selector SEL1. The norm obtaining unit 41 extracts the norm data Norm from the vector data vec_D3 and then stores the extracted norm data Norm in the norm data storage unit 42. The norm obtaining unit 41 reads norm data stored in the norm data storage unit 42 and obtains, from the read norm data, an average value Ave(StateK) of the norm data and a standard deviation σ(StateK) of the norm data for each state StateK, which is a state in which the read norm data was obtained. The norm obtaining unit 41 transmits the obtained data to the activity value obtaining unit 5 as vector data vec_Prb.

The norm data storage unit 42 stores the norm data transmitted from the norm obtaining unit 41. The norm data storage unit 42 is achieved using RAM (Random Access Memory), for example. The norm data storage unit 42 also transmits norm data to the norm obtaining unit 41 in accordance with a data read instruction requested by the norm obtaining unit 41.

The SOM processing unit 43 receives the vector data vec_D3 transmitted from the selector SEL1. The SOM processing unit 43 extracts normalized feature vector data D3 from the vector data vec_D3 and then performs SOM processing using the extracted normalized feature vector data D3.

(1) In a learning phase, the SOM processing unit 43 performs SOM processing using the normalized feature vector data D3 to determine combining weights between nodes in the input layer and neurons in the output layer. After the completion of the above-describe processing, the SOM processing unit 43 transmits the determined combining weights data to the mapping conversion unit 6 as combining weights data wij_fixed.

(2) In a template creating phase, the SOM processing unit 43 performs SOM processing using the normalized feature vector data D3 and then transmits the SOM output data to the SOM data storage unit 44 as data D_som(t), which is SOM output data at current timing t).

The SOM data storage unit 44 stores the SOM output data D_som(t) transmitted from the SOM processing unit 43. The SOM data storage unit 44 is achieved using RAM (Random Access Memory), for example.

The template data generation unit 45 reads a plurality of pieces of SOM output data D_som, such as N (N is a natural number) pieces of SOM output data, each of which is obtained at timings t to t+N−1, from the SOM data storage unit 44. Note that a plurality of pieces of SOM data that the template data generation unit 45 reads from the SOM data storage unit 44 are referred to as vector data vec_D_som. The template data generation unit 45 generates template data from the plurality of SOM data read from the SOM data storage unit 44, and then transmits the generated template data to the template data storage unit 46 as template data Tmpl.

The template data storage unit 46 stores the template data Tmpl transmitted from the template data generation unit 45. The template data storage unit 46 is achieved using RAM (Random Access Memory), for example.

As shown in FIG. 3, the activity value obtaining unit 5 includes a data obtaining unit 51 for activity calculation, M (M is a natural number) activity calculation units, which are a first activity calculation unit 521 to an M-th activity calculation unit 52M.

The data obtaining unit 51 for activity calculation receives the vector data vec_Prb transmitted from the norm obtaining unit 41 of the template data obtaining unit 4. The data obtaining unit 51 for activity calculation obtains, from the vector data vec_Prb, an average value Ave(StateK) and a standard deviation σ(StateK) of the norm data of the feature vector data D2 for each state StateK. The data obtaining unit 51 for activity calculation transmits the average value and standard deviation of the norm data of the feature vector data D2 for the k-th state (k is a natural number satisfying 1≤k≤M), as Ave(k) and σ(k) respectively, to the k-th activity calculation unit.

The first activity calculation unit 521 receives the norm data Norm included in the vector data vec_D3 transmitted from the selector SEL1 and the average value Ave(1) and the standard deviation σ(1) of the norm data of the feature vector data D2 in a first state transmitted from the data obtaining unit 51 for activity calculation. The first activity calculation unit 521 calculate an activity value D_act(1), which is an activity value in the first state, based on the average value Ave(1) and the standard deviation σ(1) of the norm data of the feature vector data D2 in the first state, and then transmits the calculated activity value D_act(1) to the state determination unit 8.

The second activity calculation unit 522 to the M-th activity calculation unit 52M performs the same processing as described above.

The activity value obtaining unit 5 transmits the activity value D_act(1) to D_act(M), which are obtained by the first activity calculation unit 521 to the M-th activity calculation unit 52M, to the state determination unit 8, as vector data vec_D_act.

For ease of explanation, a case of M=6 will be described below.

FIG. 4 is a schematic diagram of the activity value obtaining unit 5 in the case of M=6.

The mapping conversion unit 6 receives the normalized feature vector data D3 included in the vector data vec_D3 transmitted from the selector SEL1. The mapping conversion unit 6 also receives the combining weights data wij_fixed between nodes in the input layer and neurons in the output layer, which is determined by the SOM processing unit 43. The mapping conversion unit 6 performs SOM processing on the normalized feature vector data D3 using the combining weights data wij_fixed to obtain SOM output data D_som. The mapping conversion unit 6 transmits the obtained SOM output data D_som to the matching processing unit 7.

The matching processing unit 7 receives the SOM output data D_som transmitted from the mapping conversion unit 6. The matching processing unit 7 reads a plurality of pieces of template data Tmpl from the template data storage unit 46.

Note that a plurality of pieces of SOM data that the matching processing unit 7 reads from the template data storage unit 46 are referred to as vector data vec_Tmpl.

The matching processing unit 7 performs matching processing using the SOM output data D_som and the plurality pieces of template data read from the template data storage unit 46 to obtain adaptability data D_f for each template data.

The matching processing unit 7 transmits the obtained adaptability data D_f for each template data to the state determination unit 8 as vector data vec_D_f.

As shown in FIG. 5, the matching processing unit 7 includes a TP data obtaining unit 71, and M (M is a natural number) inner product calculation units, or a first inner product calculation unit 721 to M-th inner product calculation unit 72M.

The TP data obtaining unit 71 reads a plurality of pieces of template data Tmpl (M pieces of template data Tmpl(1) to Tmpl(M)) from the template data storage unit 46. The TP data obtaining unit 71 transmits M pieces of template data Tmpl(1) to Tmpl(M) to the first inner product calculation unit 721 to the M-th inner product calculation unit 72M, respectively.

The first inner product calculation unit 721 receives the SOM output data D_som transmitted from the mapping conversion unit 6 and the template data Tmpl(1) transmitted from the TP data obtaining unit 71. The first inner product calculation unit 721 performs processing for calculating an inner product using the SOM output data D_som and the template data Tmpl(1). The first inner product calculation unit 721 transmits a signal representing the calculated inner product value to the state determination unit 8 as a signal D_f(1).

Note that the same processing as described above is performed in the second inner product calculation unit 722 to M-th inner product calculation unit 72M.

In other words, a k-th (k is a natural number satisfying 1≤k≤M) inner product calculation unit 72k receives the SOM data D_som transmitted from the mapping conversion unit 6 and the template data Tmpl(k) transmitted from the TP data obtaining unit 71. The k-th inner product calculation unit 72k performs processing for calculating an inner product using the SOM output data D_som and the template data Tmpl(k). The k-th inner product calculation unit 72k transmits a signal representing the calculated inner product value to the state determination unit 8 as a signal D_f(k).

Note that the signal D_f(1) to D_f(M), each of which is transmitted from the corresponding one of the first inner product calculation unit 721 to the M-th inner product calculation unit 72M, are collectively referred to as vector data vec_Tmpl.

For ease of explanation, a case of M=6 will be described below.

As shown in FIG. 6, the state determination unit 8 includes a first determination unit 81 to a sixth determination unit 86.

The first determination unit 81 receives the inner product value D_f(1) (the signal D_f(1)) obtained by the first inner product calculation unit 721 and the activity value D_act(1) obtained by the first activity calculation unit 521. The first determination unit 81 obtains a state evaluation value D_deci(1) from the inner product value D_f(1) and the activity value D_act(1) and then transmits a signal representing the obtained state evaluation value, as a signal D_deci(1), to the time series estimation unit 9.

Note that the second to the sixth determination units 82 to 86 are the same as the first determination unit 81.

More specifically, the k-th determination unit 8k (k is a natural number satisfying $1 \leq k \leq 6$) receives the inner product value D_f(k) (the signal D_f(k)) obtained by the k-th inner product calculation unit 72k and the activity value D_act(k) obtained by the k-th activity calculation unit 52k. The k-th determination unit 8k obtains a state evaluation value D_deci(k) from the inner product value D_f(k) and the activity value D_act(k) and then transmits a signal representing the obtained state evaluation value, as a signal D_deci(k), to the time series estimation unit 9.

Note that the signal D_deci(1) to D_deci(6), each of which is transmitted from the corresponding one of the first determination unit 81 to the sixth determination unit 86, are collectively referred to as vector data vec_D_deci.

The case of M=6 has been described above. However, the present invention should not be limited to this case; M may be another number instead of six.

As shown in FIG. 7, the time series estimation unit 9 includes a PF processing unit (particles filter processing unit) 91 and a state estimation unit 92.

The PF processing unit 91 receives the vector data vec_D_deci transmitted from the state determination unit 8 and state transition probability data D_tr_prb transmitted from the control unit (not shown) for controlling functional units in the state determination apparatus 1000. The PF processing unit 91 performs particle filter processing on the vector data vec_D_deci to obtain particle filter output values (state estimation values) D_pf(1) to D_pf(6) for State 1 to State 6, respectively. The PF processing unit 91 then transmits the obtained particle filter output values (state estimation values) D_pf(1) to D_pf(6) for State 1 to State 6 to the state estimation unit 92.

The state estimation unit 92 receives the particle filter output values (state estimation values) D_pf(1) to D_pf(6) for State 1 to State 6 transmitted from the PF processing unit 91. The state estimation unit 92 estimates a state at the present timing t based on the particle filter output values (state estimation values) D_pf(1) to D_pf(6) for State 1 to State 6, and then transmits data representing the result of the estimation, as data Dout, out of the state determination apparatus 1000.

1.2 Operation of State Determination Apparatus

The operation of the state determination apparatus 1000 with the above-described structure will now be described.

In one example, a case in which an output from an acceleration sensor (not shown) for detecting a state of a person is inputted into the state determination apparatus 1000 will now be described. For ease of explanation, a case in which the state determination apparatus 1000 determines one of the following six states of a person will now be described.

(1) Sitting state (a state indicating that a person is sitting)
(2) Standing state (a state indicating that a person is standing)
(3) Running state (a state indicating that a person is running)
(4) Walking state (a state indicating that a person is walking)
(5) Upstairs state (a state indicating that a person is going up stairs)
(6) Downstairs state (a state indicating that a person is going down stairs) For the operation of the state determination apparatus 1000, (1) the operation in the learning phase, (2) the operation of the template creating phase, and (3) the operation of the state determination processing phase will now be described separately.

1.2.1 Operation of Learning Phase

First, the operation of the learning phase in the state determination apparatus 1000 will be described.

The output from the acceleration sensor (not shown) for detecting a state of a person is inputted, as a signal Din, to the data input unit 1. Note that the acceleration sensor may be attached to a human body, for example.

The data input unit 1 samples (digitizes) the signal Din to obtain discrete data (digital data) thereof. The data input unit 1 then transmits the obtained discrete data (digital data) to the feature vector obtaining unit 2 as the signal D1.

The feature vector obtaining unit 2 transforms the discrete data D1 (digital data D1) obtained by the data input unit 1, for example, using Gabor-wavelet transform, into frequency-domain data to obtain the magnitude and phase of each frequency spectrum of the digital data D1.

The feature vector obtaining unit 2 then obtains, for example, data of the magnitude of the frequency spectrum included in a partial frequency band as the feature vector data D2.

The transform to obtain frequency-domain data from the discrete data D1 (digital data D1) should not be limited to Gabor-wavelet transform; for example, the discrete Fourier transform, the fast Fourier transform, the wavelet transform and other transforms may be used.

Figure 8:
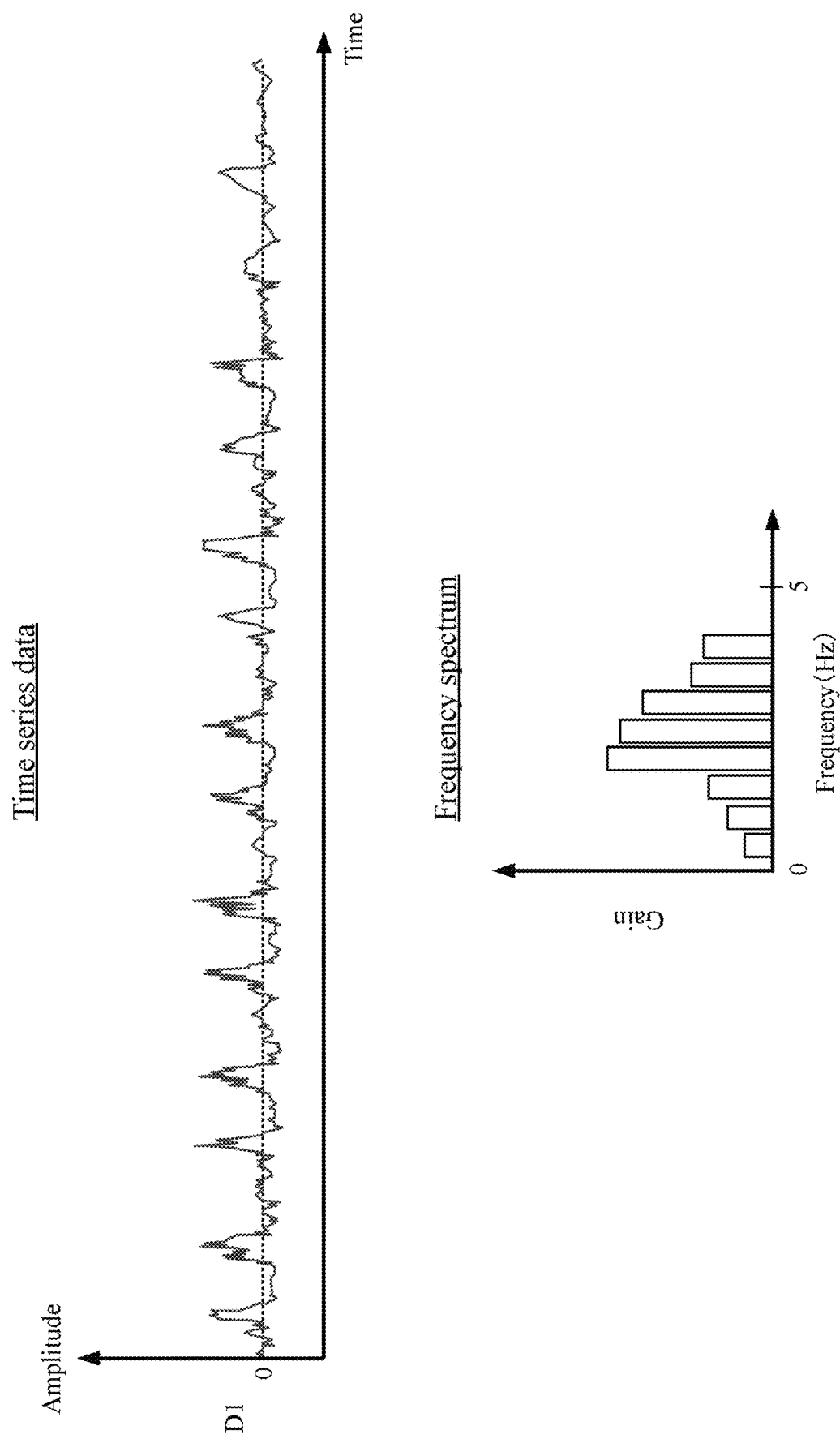
FIG. 8 is a diagram showing digital data D1 (time series data D1) obtained by a data input unit 1 and frequency-domain data D2 obtained by performing frequency transform on the digital data D1.

FIG. 8 is a diagram showing digital data D1 (time series data D1) obtained by a data input unit 1 (the upper portion of FIG. 8) and frequency-domain data D2 obtained by performing frequency transform on the digital data D1 (the lower portion of FIG. 8).

In the case of FIG. 8, the feature vector obtaining unit 2 obtains 8-dimensional data, which is vector data consisting of eight parameters (eight frequency components included in a range from 0 to 5 Hz) as the frequency-domain data D2.

For ease of explanation, a case in which the feature vector obtaining unit 2 obtains 8-dimensional data, which is vector data consisting of eight parameters (eight frequency components included in a range from 0 to 5 Hz) as the frequency-domain data D2 will now be described.

The feature vector data D2 obtained as described above is transmitted from the feature vector obtaining unit 2 to the normalization unit 3.

The normalization unit 3 obtains a norm (norm data) Norm from the feature vector data D2 and performs normalization processing on the feature vector data D2 to obtain normalized feature vector data D3.

More specifically, assuming that the feature vector data D2 is denoted as D2=(x1, x2, . . . , xn), the normalization unit 3 performs processing corresponding to the following Formula to obtain norm data Norm:

$$\text{Norm} = \text{sqrt}(x1^2 + x2^2 + \ldots + xn^2)$$

where sqrt(x) is a function that returns the square root of x.

The normalization unit 3 obtains the normalized feature vector data D3 by dividing the feature vector data D2 by the norm data Norm. More specifically, the normalization unit 3 obtains the normalized feature vector data D3 whose norm is "1" by dividing each element of the feature vector data D2 (each element of the vector) by the norm data Norm.

The norm data Norm and the normalized feature vector data D3 through the above-describe processing are transmitted from the normalization unit 3 to the selector SEL1 as vector data vec_D3.

The controller (not shown) that controls the various functional units of the state determination apparatus 1000 generates a selecting signal sel1 for selecting the terminal 0 of the selector SEL1, and then transmits the generated selecting signal sel1 to the selector SEL1.

The selector SEL1 transmits the vector data D3 to the template data obtaining unit 4 in accordance with the selecting signal sel1.

The SOM processing unit 43 of the template data obtaining unit 4 performs SOM processing using the feature vector data D3 included in the vector data D3 transmitted from the selector SEL1 to determine the combining weights between nodes in the input layer and neurons in the output layer. This processing will be described with reference to FIG. 9.

Figure 9:
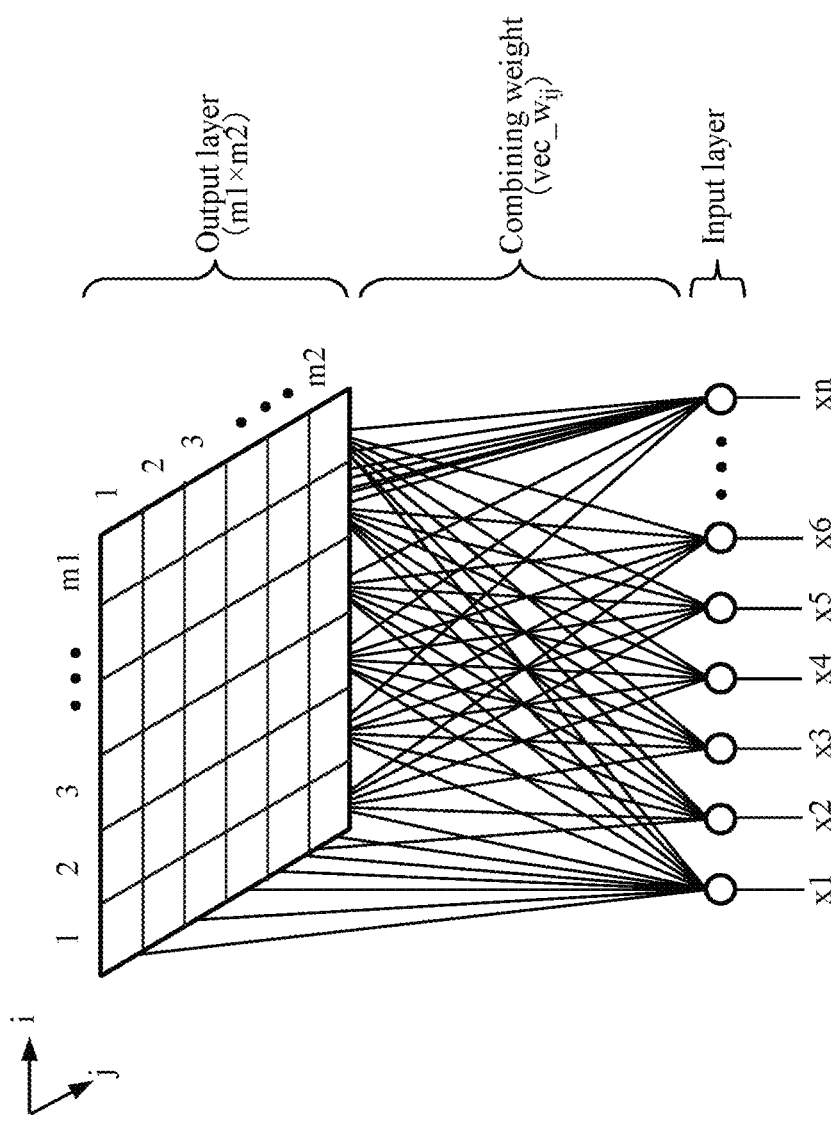
FIG. 9 is a diagram describing SOM processing and schematically showing the structure of an SOM.

FIG. 9 is a diagram describing SOM processing and schematically showing the structure of an SOM. Note that i-axis and j-axis are set as shown in FIG. 9 to define a plane on which neurons of the output layer are disposed.

Assume that input data is given as n-dimensional real number vec_x=($x_1$, $x_2$, . . . , $x_n$) and the two-dimensional SOM has neurons disposed on m1×m2(=M1) lattice points. More specifically, as shown in FIG. 9, the input layer has n nodes and the output layer has neurons each disposed on one of m1×m2(=M1) lattice points.

Each of nodes (n input nodes) in the input layer for receiving the input data vec_x is connected to all neurons (all output neurons). The neuron $u_{i,j}$, which is located at (i, j) in the two-dimensional lattice arrangement of the output layer, has variable combining weight vector vec_$w_{ij}$=($w_{ij\_1}$, $w_{ij\_2}$, . . . , $w_{ij\_n}$) for weighting and combining each element of the input data vec_x. This combining weight vector is referred to as a reference vector.

Note that $w_{ij\_3}$ is a combining weight for the output node at a coordinate (i, j) and k-th input node.

The SOM processing unit 43 performs SOM processing through processes described in "<<Step 1>>" and "<<Step 2>>" below.

<<Step 1: Initialization>>

The SOM processing unit 43 randomly sets (sets using random numbers) initial values for vec_$w_{11}$, vec_$w_{12}$, . . . , and vec_$w_{mm}$ at timing t=0 where n is the number of input data vectors and T (≥n) is the number for iteration.

<<Step 2: Learning>>

The SOM processing unit 43 performs processing described below at timing t.

2A:

The SOM processing unit 43 calculates a Euclidean distance dis(vec_x(t), vec_$w_{ij}$(t−1)) between the input data vec_x(t), which is an input data at timing t, and each of reference vectors vec_$w_{ij}$(t−1). Note that dis(vec1, vec2) is a function for calculating a Euclidean distance between a vector vec1 and a vector vec2.

2B:

The SOM processing unit 43 determines a neuron $u_{I,J}$ with the minimum Euclidean distance, and then sets the determined neuron as a winning neuron $u_{I,J}$. Note that the neuron $u_{I,J}$ is a neuron located at the coordinate (I, J).

Alternatively, the SOM processing unit 43 may determine a neuron $u_{I,J}$ with the maximum inner product value between the input data vec_x(t) at timing t and the reference vector vec_$w_{ij}$(t−1) at timing t−1, and then set the determined neuron as a winning neuron $u_{I,J}$.

2C:

The SOM processing unit 43 performs learning processing for the reference vector vec_$w_{ij}$(t), which is a reference vector at timing t, using the following formula:

$$\text{vec\_}w_{ij}(t)\text{vec\_}w_{ij}(t-1) + h((i,j),(I,J),t) \times (\text{vec\_}x(t) - \text{vec\_}w_{ij}(t-1))$$

Note that h is a monotonically decreasing function and has characteristics below.

(1) The function h is a monotonically decreasing function with respect to t, and converges zero as t approaches infinity.
(2) The function h is a monotonically decreasing function with respect the Euclidean distance dis(vec_$u_{ij}$, vec_$u_{I,J}$) between a lattice point (i, j) and a lattice point (I, J). The monotonically decreasing rate (amount) of the function h becomes larger as t becomes larger. Note that vec_$u_{ij}$ is a vector from a point (e.g., the origin) to the position of a neuron $u_{ij}$ and vec_$u_{I,J}$ is a vector from a point (e.g., the origin) to the position of a neuron $u_{I,J}$.

Furthermore, the SOM processing unit 43 performs the same processing as described above at timing t+1.

Note that the timing t+1 is timing at which the normalization unit 3 obtains the normalized feature vector data D3 and the SOM processing unit 43 receives, next to timing t, the normalized feature vector data D3 obtained by the normalization unit 3.

The SOM processing unit 43 repeatedly performs the above-described processing until timing t=T.

The SOM processing unit 43 performs the above-described SOM processing, and then obtains the reference vector vec_$w_{ij}$ which has been obtained when the above-described SOM processing has been completed as a determined reference vector vec_$w_{ij}$_fixed. The SOM processing unit 43 then transmits the determined reference vector vec_$w_{ij}$_fixed to the mapping conversion unit 6.

For ease of explanation, a case in which the input data vec_x, or normalized feature vector data D3, consists of eight pieces of frequency component data and the second-dimensional SOM has neurons each of which is assigned to its corresponding one of 32×32 lattice points will now be described as one example.

The state determination apparatus 1000 also performs norm data processing in the learning phase.

More specifically, the norm obtaining unit 41 extracts norm data Norm from the vector data vec_D3 transmitted from the selector SEL1 and then stores the extracted norm data Norm in the norm data storage unit 42. In other words, the norm obtaining unit 41 extracts norm data Norm from the vector data D3, which is obtained from data inputted into the state determination apparatus 1000 when a person continues to be in a state (e.g., when a person is walking), and then stores the extracted norm data Norm in the norm data storage unit 42.

The norm obtaining unit 41 reads norm data, which is stored in the norm data storage unit 42 when a person continues to be in a state (e.g., when a person is walking), and obtains, from the read norm data, an average value Ave(StateK) of the norm data and a standard deviation σ(StateK) of the norm data for each state StateK, which is a state in which the read norm data was obtained. The norm obtaining unit 41 transmits the obtained data to the activity value obtaining unit 5 as vector data vec_Prb.

One example of data obtained by the norm obtaining unit 41 through the above-describe processing will be described below.

(1) Sitting state (State 1)
 Ave(1)=0.082989
 σ(1)=0.059778
(2) Standing state (State 2)
 Ave(2)=0.334777
 σ(2)=0.224319
(3) Running state (State 3)
 Ave(3)=31.286555
 σ(3)=2.630188
(4) Walking state (State 4)
 Ave(4)=12.395692
 σ(4)=3.409114
(5) UpStairs state (State 5)
 Ave(5)=8.146392
 σ(5)=1.912558
(6) DownStairs state (State 6)
 Ave(6)=25.002112
 σ(6)=3.254508

A case in which the above-described data is processed will be described below.

The above-describe data is transmitted from the norm obtaining unit 41 to the activity value obtaining unit 5 as vector data vec_Prb.

1.2.2 Operation of Template Creating Phase

Next, the operation of the template creating phase in the state determination apparatus 1000 will be described.

In the template creating phase, the state determination apparatus 1000 creates template data for (1) Sitting state (a state indicating that a person is sitting), (2) Standing state (a state indicating that a person is standing), (3) Running state (a state indicating that a person is running), (4) Walking state (a state indicating that a person is walking), (5) UpStairs state (a state indicating that a person is going up stairs), and (6) DownStairs state (a state indicating that a person is going down stairs).

First, a case of creating a template for Walking state (a state indicating that a person is walking) will be described.

In this case, the output from the acceleration sensor (not shown) while a person is walking (continues to be in the Walking state) is inputted into the data input unit 1 as the signal Din.

The data input unit 1 samples (digitizes using AD conversion) the signal Din to obtain discrete data (digital data). The data input unit 1 transmits the obtained discrete data (digital data) to the feature vector obtaining unit 2 as the signal D1.

The feature vector obtaining unit 2 transforms the discrete data D1 (digital data D1) obtained by the data input unit 1, for example, using Gabor-wavelet transform into frequency-domain data to obtain the magnitude and phase of each frequency spectrum of the digital data D1.

The feature vector obtaining unit 2 then obtains, for example, data of the magnitude of the frequency spectrum included in a partial frequency band as the feature vector data D2.

The feature vector data D2 obtained by the feature vector obtaining unit 2 is transmitted from the feature vector obtaining unit 2 to the normalization unit 3.

The normalization unit 3 obtains a norm (norm data) Norm from the feature vector data D2 and performs normalization processing on the feature vector data D2 to obtain normalized feature vector data D3.

The normalization unit 3 transmits the obtained norm data Norm and normalized feature vector data D3 to the selector SEL1, as vector data vec_D3.

The controller (not shown) that controls the various functional units of the state determination apparatus 1000 generates a selecting signal sel1 for selecting the terminal 0 of the selector SEL1, and then transmits the generated selecting signal sel1 to the selector SEL1.

The selector SEL1 transmits the vector data vec_D3 to the SOM processing unit 43 in accordance with the selecting signal sel1.

The SOM processing unit 43 extracts the normalized feature vector data D3 from the vector data vec_D3 transmitted from the selector SEL1 and performs SOM processing using the normalized feature vector data D3. In this case, the SOM processing uses, as combining weight vectors (reference vectors) $vec\_w_{ij}$, the combining weight vectors (reference vectors) $vec\_w_{ij}\_fixed$ that are determined through the above-described learning processing. The SOM processing unit 43 performs SOM processing on the normalized feature vector data D3 using the combining weight vectors (reference vectors) $vec\_w_{ij}\_fixed$ to obtain SOM data D_som(t), which is SOM data at timing t. The SOM processing unit 43 transmits the obtained SOM data D_som (t) to the SOM data storage unit 44.

The SOM data storage unit 44 stores the SOM output data D_som(t) transmitted from the SOM processing unit 43.

While a person is walking (continues to be in the Walking state) during a period from the timing t=1 to the timing t=N, the state determination apparatus 1000 performs the above-described processing. The SOM processing unit 43 then stores N pieces of SOM output data D_som(t) obtained during the period from the timing t=1 to t=N to the SOM data storage unit 44.

The template data generation unit 45 reads N pieces of SOM output data D_som(1) to D_som(N) obtained during the period from the timing t=1 to t=N (the period in which the person is walking (continues to be in the Walking state)) from the SOM data storage unit 44. Using the SOM output data D_som(1) to D_som(N), the template data generation unit 45 calculates an average value of the output values at the same coordinate position on the second-dimensional SOM (an average of values output from the same output node). Template data for the Walking state (a state indicating that a person is walking) is created by setting the calculated average values to values of their corresponding nodes.

More specifically, assuming that the feature vector data vec_x(t), which is feature vector data at timing t, is defined by the following formulae:

$$vec\_x(t) = (x_1(t), x_2(t), \ldots, x_{N1}(t))$$

N1=8, and
the determined combining weight vector f_vec_$w_{ij}$ is defined by the following formulae:

$$f\_vec\_w_{ij} = (w_{ij\_1}, w_{ij\_2}, \ldots, w_{ij\_N1})$$

N1=8,
the template data is obtained by the following formula:

Formula 1

$$D_{ij}(t) = \sum_{k=1}^{N1} \{x_k(t) \times w_{ij\_k}\} \quad (1)$$

$$N1 = 8$$

where $D_{ij}(t)$ is the output value of a neuron (output node) located at (i, j) on the second-dimensional SOM at timing t.

Note that $w_{ij\_k}$ is a combining weight between the output node at the coordinate (i, j) and the k-th input node.

The template data generation unit 45 obtains a template data value $g_{ij}$ for a node corresponding to a neuron (output node) located at (i, j) on the second-dimensional SOM through the processing corresponding to the formula below.

Formula 2

$$g_{ij} = \frac{1}{N} \sum_{t=1}^{N} D_{ij}(t) \quad (2)$$

The template data generation unit 45 obtains second-dimensional template data by assigning the value $g_{ij}$ calculated through the above processing to the node at the coordinate (i, j)

Figure 10:
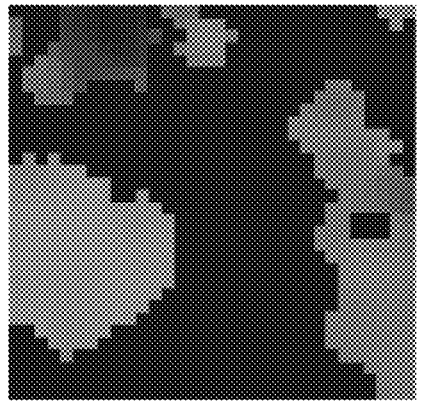
FIG. 10 is a diagram showing an example of template data.
Figure 10:
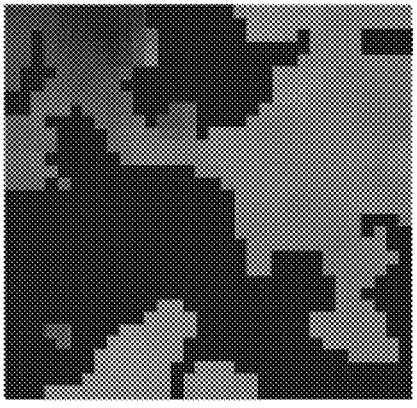
Figure 10:
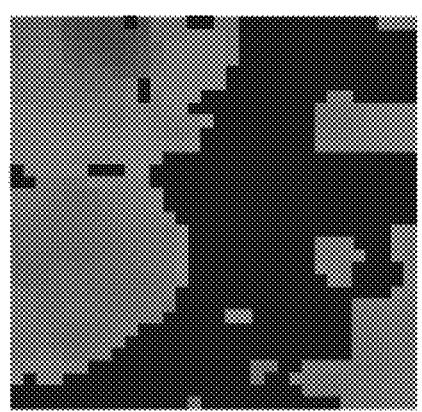
Figure 10:
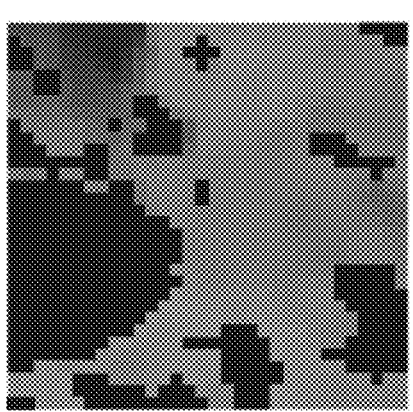
Figure 10:
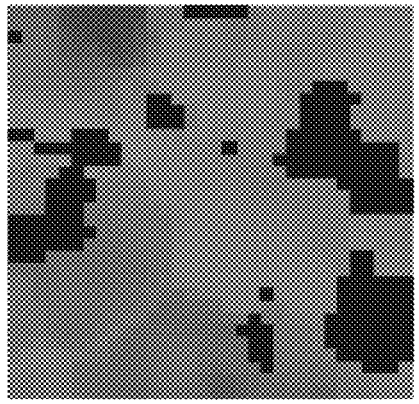
Figure 10:
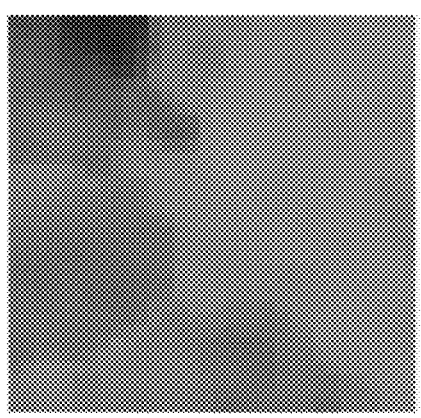

FIG. 10 is a diagram showing an example of template data.

More specifically, FIG. 10(a) is a diagram showing a template data for Sitting state (a state indicating that a person is sitting (State 1)). FIG. 10(b) is a diagram showing a template data for Standing state (a state indicating that a person is standing (State 2)). FIG. 10(c) is a diagram showing a template data for Running state (a state indicating that a person is running (State 3)).

FIG. 10(d) is a diagram showing a template data for Walking state (a state indicating that a person is walking (State 4)). FIG. 10(e) is a diagram showing a template data for UpStairs state (a state indicating that a person is going up stairs (State 5)). FIG. 10(f) is a diagram showing a template data for DownStairs state (a state indicating that a person is going down stairs (State 6)).

For example, FIG. 10(d) a diagram showing the template data Tmpl(4) (two-dimensional data consisting of 32×32 pieces of data) obtained, through the above-described processing, from N (N is a natural number) pieces of SOM output data D_som(1) to D_som(N) obtained during the period from the timing t=1 to the timing t=N (the period during which a person is walking (continues to be in Walking state)). In FIG. 10(d), the pixel value at the coordinate (i, j) of the template data Tmpl(4) is the value go calculated through the above-described processing.

In the template data shown in FIG. 10, values $g_{ij}$ are normalized to range from 0 to 1 inclusive ($0 \leq g_{ij} \leq 1$). In the template data shown in FIG. 10, the template data is represented as image data in which a pixel of $g_{ij}=0$ is depicted as a pixel with a pixel value of 0, which corresponds to W 0% level, and a pixel of $g_{ij}=1$ is depicted as a pixel with a pixel value of 1, which corresponds to W 100% level.

The template data Tmpl(4) for the Walking state (a state in which a person is walking) obtained by the template data generation unit 45 as described above is stored in the template data storage unit 46.

Processing for creating template data for the Running state (a state in which a person is running) is performed in the same manner as described above. The template data for the Running state is referred to as template data Tmpl(3).

More specifically, the output from the acceleration sensor (not shown) while a person is running (continues to be in the Running state) during a period from the timing t=1 to the timing t=N is inputted into the data input unit 1 as the signal Din. The state determination apparatus 1000 performs processing similar to the above-described processing to obtain template data Tmpl(3) for the Running state (a state in which a person is running). The obtained template data Tmpl(3) for the Running state (a state in which a person is running) is then stored in the template data storage unit 46.

FIG. 10(c) is a diagram showing the template data Tmpl (3) (two-dimensional data consisting of 32×32 pieces of data) obtained, through the above-described processing, from N (N is a natural number) pieces of SOM output data D_som(1) to D_som(N) obtained during the period from the timing t=1 to the timing t=N (the period during which a person is running (continues to be in Running state)).

Processing for creating template data for other states is performed in the same manner as described above.

A case in which the template data generation unit 45 creates template data by calculating an average value of the output values at the same coordinate position on the second-dimensional SOM (an average of values output from the same output node) using the SOM output data D_som(1) to D_som(N) is described above. However, the present invention should not be limited to the above-described processing. For example, the template data generation unit 45 may create template data through processing below (Processing 1 to Processing 4).

(1) Processing 1 (Threshold Processing for Output Values)

Using the SOM output data D_som(1) to D_som(N), the template data generation unit 45 compares the output values $D_{ij}(t)$ at the same coordinate position on the second-dimensional SOM (the values output from the same output node) with a threshold value Th1. The template data generation unit 45 calculates an average value of the output values $D_{ij}(t)$ satisfying $D_{ij}(t) \geq Th1$, and then sets the calculated average value as a value $g_{ij}$ at the coordinate (i, j) of the template data.

Figure 11:
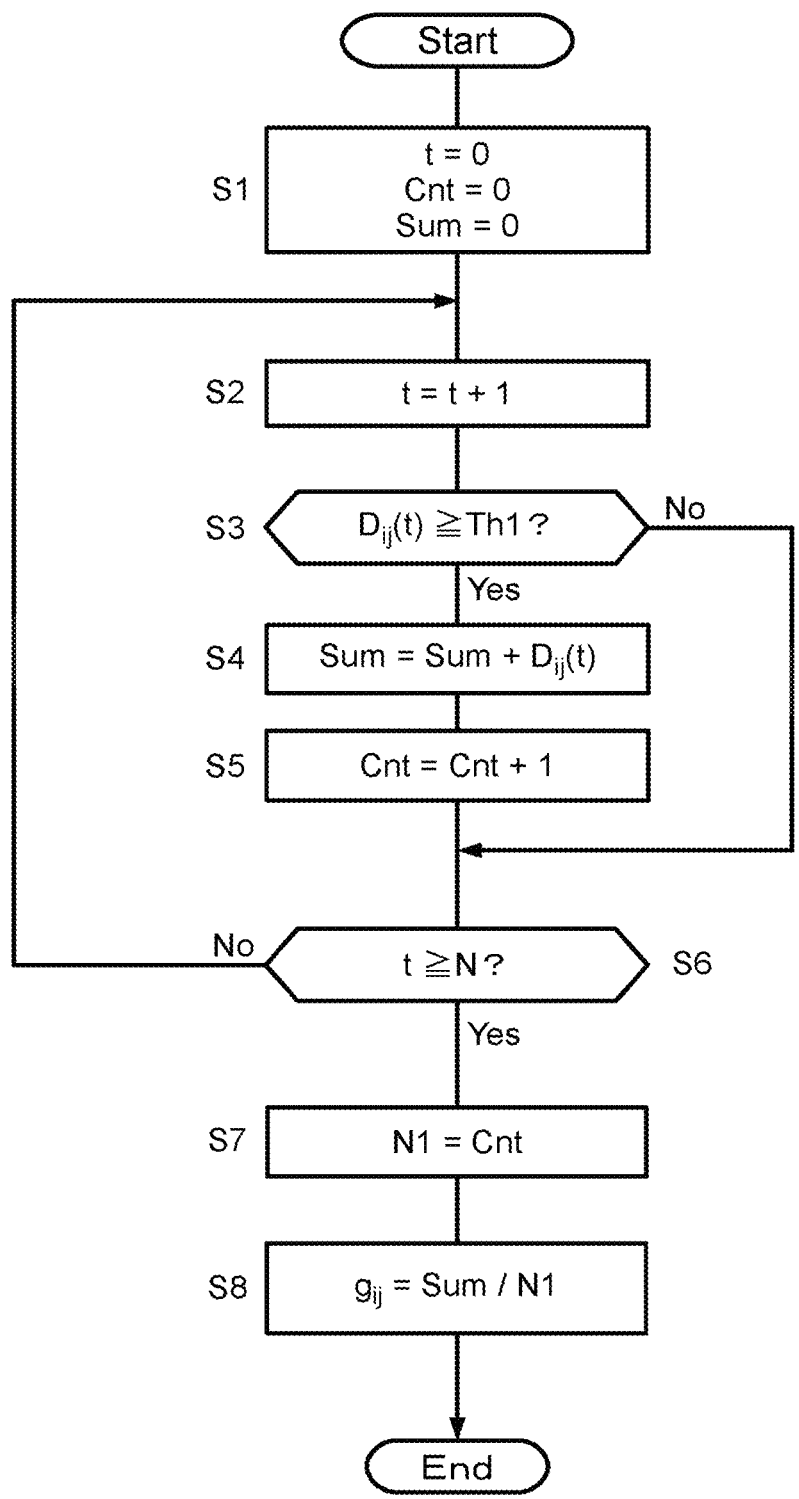
FIG. 11 is a flowchart showing Processing 1 (a threshold process for an output value).

This processing will be described with the flowchart shown in FIG. 11.

In step S1, the template data generation unit 45 sets a variable t representing timing (time), a counter value Cnt, and a sum value Sum to zeros individually.

In step S2, the template data generation unit 45 increments the variable represent timing by one.

The template data generation unit 45 compares the output value $D_{ij}(t)$ at the same coordinate position on the second-dimensional SOM (an average of values output from the same output node) with a threshold value Th1. If $D_{ij}(t) \geq Th1$ is satisfied ("Yes" at step S3), then the output value $D_{ij}(t)$ is added to the sum value Sum (step S4), and furthermore the counter value Cnt is incremented by one (step S5).

In contrast, if $D_{ij}(t) \geq Th1$ is not satisfied ("No" at step S3), then the template data generation unit 45 advances the processing to step S6.

In step S6, if $t \geq N$ is not satisfied, then the template data generation unit 45 returns the processing to step S2. If $t \geq N$ is satisfied, then the template data generation unit 45 substitutes the counter value Cnt into a final counter value N1 (Step S7). Furthermore, the template data generation unit 45 obtains the template value $g_{ij}$ at the coordinate (i, j) through processing that corresponds to $g_{ij}$=Sum/N1 (Step S8).

The above-described processing allows an average value obtained by excluding output values of SOM which are smaller than the threshold value to be set as the template data value $g_{ij}$, thereby creating more appropriate template data.

(2) Processing 2 (Threshold Processing for Variance of Output Values)

Using the SOM output data D_som(1) to D_som(N), the template data generation unit 45 calculates variance of the output values $D_{ij}(t)$ at the same coordinate position on the second-dimensional SOM (the values output from the same output node) through processing which corresponds to the following formulae:

Formula 3
$$AveD_{ij} = \frac{1}{N}\sum_{t=1}^{N} D_{ij}(t) \quad (3)$$

Formula 4
$$v_{ij} = \frac{1}{N}\sum_{t=1}^{N} (D_{ij}(t) - AveD_{ij})^2 \quad (4)$$

The template data generation unit 45 then compares the variance $v_{ij}$ with a threshold value Th2. Subsequently, the template data generation unit 45 calculates an average value of the SOM output values $D_{ij}(t)$ at the coordinate (i, j) which satisfy $v_{ij} \leq Th2$, and then sets the calculated average value as a template data value $g_{ij}$ at the coordinate (i, j).

Note that if $v_{ij} \leq Th2$ is not satisfied, the template data generation unit 45 sets template data values $g_{ij}$ at the coordinate (i, j) to zeros.

Such processing allows an average value obtained using only SOM output values $D_{ij}(t)$ whose variance in a temporal direction is small to be set as a template data value $g_{ij}$ at the coordinate (i, j), thereby creating more appropriate template data. In other words, the above-described processing allows an average value obtained using only SOM output values $D_{ij}(t)$ less variable in the temporal direction to be set as a template data value $g_{ij}$ at the coordinate (i, j), thereby creating more appropriate template data.

(3) Processing 3 (Processing combining Processing 1 and Processing 2)

The template data generation unit 45 may obtain the template data values $g_{ij}$ at the coordinate (i, j) through processing achieved by combining the above-described Processing 1 and Processing 2.

The template data generation unit 45 compares the variance $v_{ij}$ with the threshold Th2, calculates an average value using only SOM output values $D_{ij}(t)$ which satisfy $v_{ij} \leq Th2$ and are larger than the threshold value Th1, and then sets the calculated average value as a template data value go at the coordinate (i, j).

Note that if $v_{ij} \leq Th2$ is not satisfied, the template data generation unit 45 sets a template data value $g_{ij}$ at the coordinate (i, j) to zero.

As described above, processing achieved by combining Processing 1 and Processing 2 allows for creating more appropriate template data.

(4) Processing 4 (Processing Using Data within a Range Defined by n1×σ)

The template data generation unit 45 performs, using the variance $v_{ij}$, processing which corresponds to the formula below to obtain a standard deviation $\sigma_{ij}$ of the SOM output values $D_{ij}(t)$ at the coordinate (i, j).

$$\sigma_{ij} = sqrt(v_{ij})$$

where sqrt(x) is a function that returns the square root of x.

If $abs(D_{ij}(t) - AveD_{ij}) \leq n1 \times \sigma_{ij}$ (n1 is a positive natural number. abs(x) is a function that returns an absolute value of "x") is satisfied, the template data generation unit 45 calculates an average value of the SOM output values $D_{ij}(t)$ at the coordinate (i, j) and then sets the calculated average values at the coordinate (i, j) to a template data value $g_{ij}$.

If $abs(D_{ij}(t) - AveD_{ij}) \leq n1 \times \sigma_{ij}$ (n1 is a positive natural number. abs(x) is a function that returns an absolute value of "x") is not satisfied, the template data generation unit 45 sets a template data value go to zero.

Such processing allows for creating template data using data within a range from the average value minus n1×σ to the average value plus n1×σ inclusive.

For example, when n1=3, performing processing as described above allows for creating template data using data within a range from the average value minus 3σ to the average value plus 3σ inclusive. In the state determination apparatus 1000, assuming that SOM output values $D_{ij}(t)$ follows the normal distribution, setting n1 to three (i.e., n1=3) allows for creating template data using data within a range occupying 99.7 percent of the entire range. As described above, adjusting the value of n1 in the state determination apparatus 1000 allows the range of the SOM output value $D_{ij}(t)$ used for creating template data to be adjusted.

Through the above-described processing, the state determination apparatus 1000 creates template data.

Note that normalization may be performed such that the sum of all the template data values $g_{ij}$ becomes "1". Such normalization allows possible range of values indicating correlation degree (e.g., inner product values or Euclidean distances) to be constant (common) regardless of templates to be used in the determination processing for determining the correlation degree between template data and SOM output data. This allows classification determination processing to be easily achieved.

1.2.3 Operation of State Determination Processing Phase

Next, the operation of the state determination processing phase in the state determination apparatus 1000 will be described.

Figure 12:
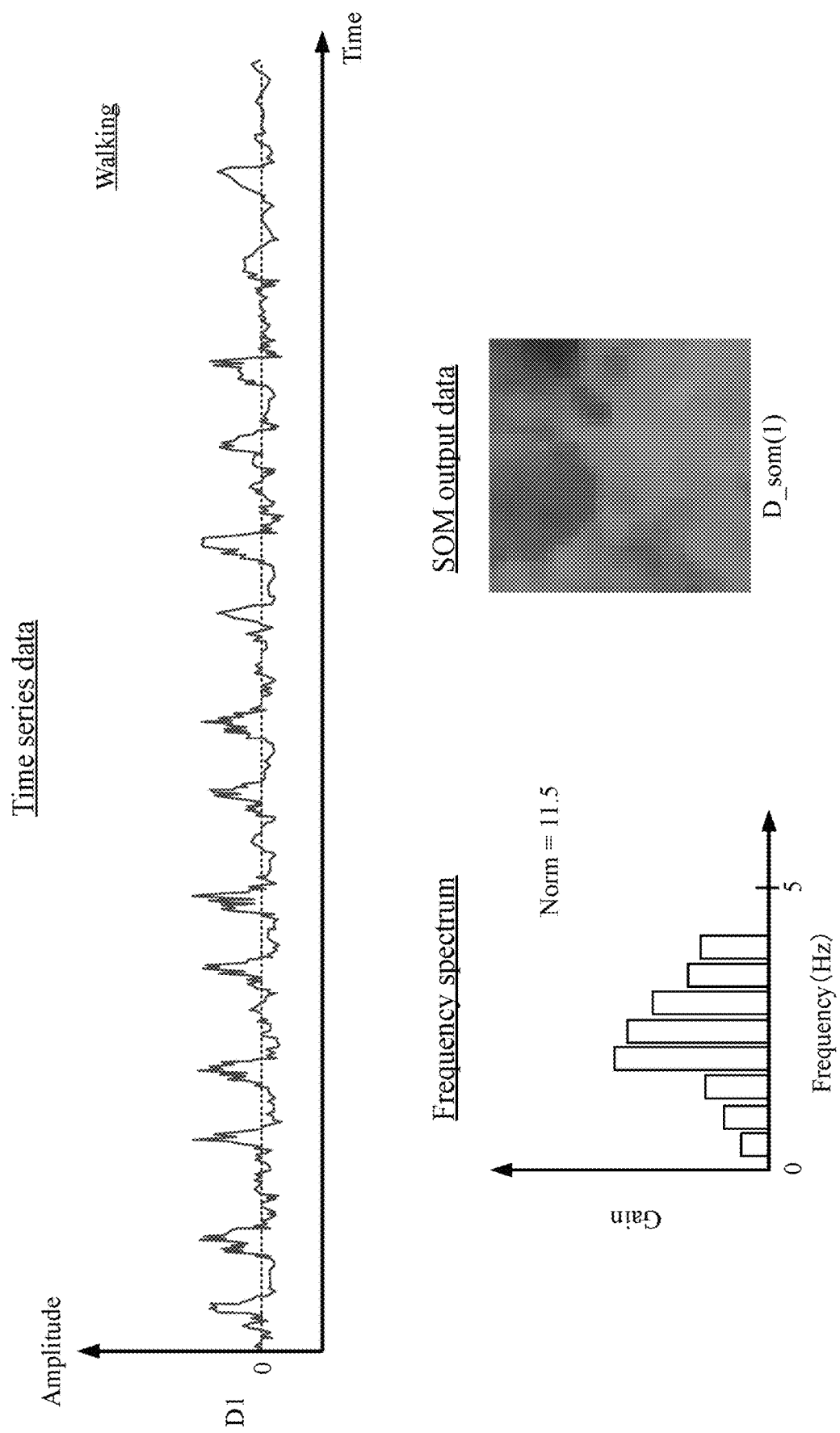
FIG. 12 is a diagram showing a waveform of a signal D1 (waveform in a state of Walking) obtained by the data input unit 1, feature vector data D2 that a feature vector obtaining unit 2 obtains from the signal D1, and SOM output data D_som(1) that a mapping conversion unit 6 obtains from the normalized feature vector data D3.

FIG. 12 is a diagram showing a waveform of the signal D1 (waveform in a state of Walking) obtained by the data input unit 1 (the upper portion of FIG. 12), feature vector data D2 that the feature vector obtaining unit 2 obtains from the signal D1 (the left lower portion of FIG. 12), and SOM output data D_som(1) that the mapping conversion unit 6 obtains from the normalized feature vector data D3 (the right lower portion of FIG. 12).

Figure 13:
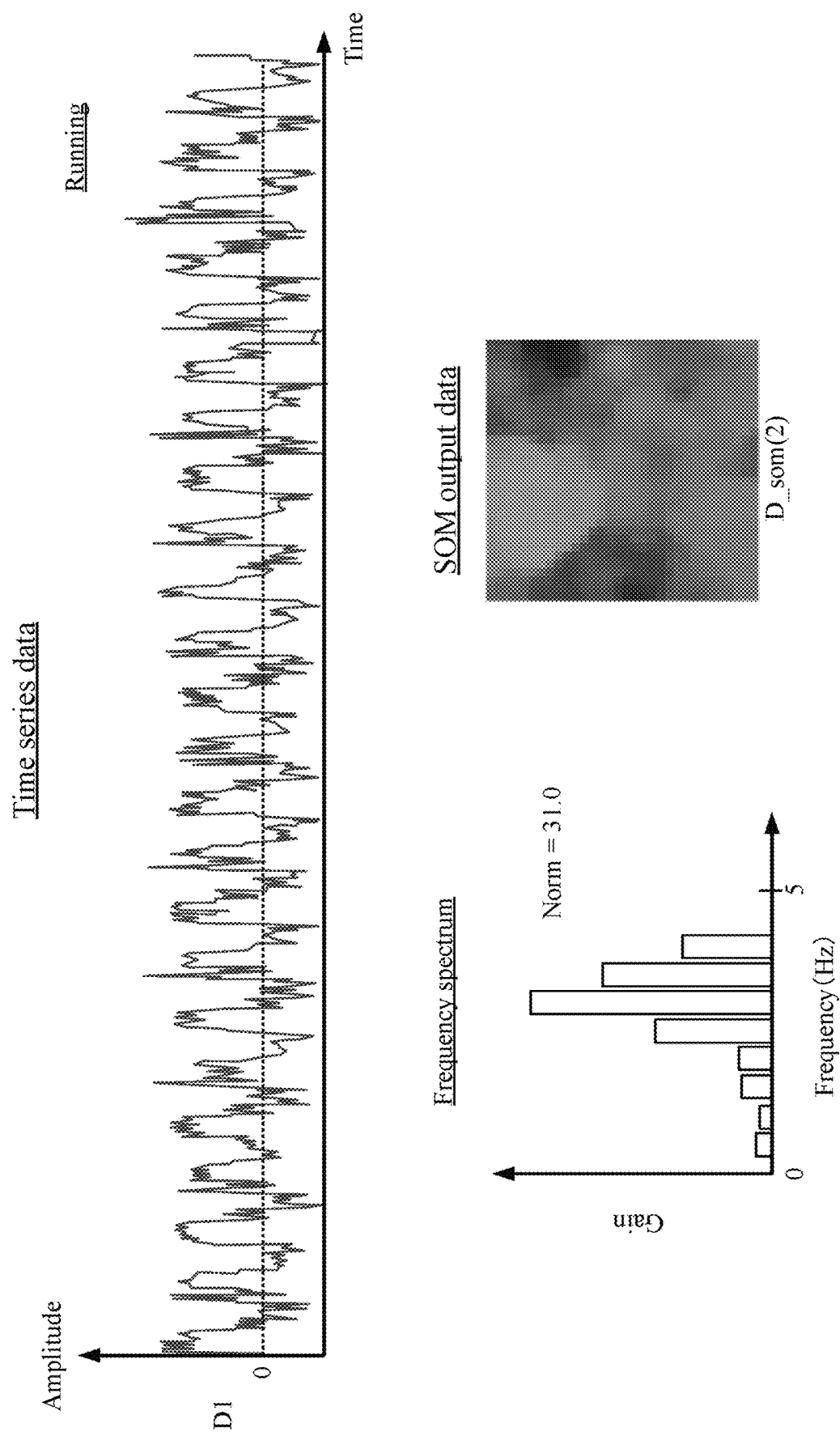
FIG. 13 is a diagram showing a waveform of the signal D1 (waveform in a state of Running) obtained by the data input unit 1, feature vector data D2 that the feature vector obtaining unit 2 obtains from the signal D1, and SOM output data D_som(2) that the mapping conversion unit 6 obtains from the normalized feature vector data D3.

FIG. 13 is a diagram showing a waveform of the signal D1 (waveform in a state of Running) obtained by the data input unit 1 (the upper portion of FIG. 13), feature vector data D2 that the feature vector obtaining unit 2 obtains from the signal D1 (the left lower portion of FIG. 13), and SOM output data D_som(2) that the mapping conversion unit 6 obtains from the normalized feature vector data D3 (the right lower portion of FIG. 13).

The output from the acceleration sensor (not shown) for detecting a state of a person is inputted, as a signal Din, to the data input unit 1. Note that the acceleration sensor may be attached to a human body, for example.

The data input unit 1 samples (digitizes) the signal Din to obtain discrete data (digital data) thereof. The data input unit 1 then transmits the obtained discrete data (digital data) to the feature vector obtaining unit 2 as the signal D1.

In Walking state, the signal D1 shown in the upper portion of FIG. 12 is obtained, for example. In Running state, the signal D1 shown in the upper portion of FIG. 13 is obtained.

The feature vector obtaining unit 2 obtains feature vector data D2 from the discrete data D1 (digital data D1) obtained by the data input unit 1 in the same manner as processing in the learning phase.

In Walking state, the feature vector data D2 shown in the lower portion of FIG. 12 is obtained, for example. In Running state, the feature vector data D2 shown in the lower portion of FIG. 13 is obtained.

The feature vector data D2 obtained by the feature vector obtaining unit 2 is transmitted from the feature vector obtaining unit 2 to the normalization unit 3.

The normalization unit 3 obtains norm data Norm and normalized feature vector data D3 from the feature vector data D2 in the same manner as processing in the learning phase. The normalization unit 3 transmits the obtained data to the selector SEL1 as vector data vec_D3.

Assume that norm data Norm obtained in the case of FIG. 12 is "11.5" and norm data Norm obtained in the case of FIG. 13 is "31.0".

The controller (not shown) that controls the various functional units of the state determination apparatus 1000 generates a selecting signal sel1 for selecting the terminal 1 of the selector SEL1, and then transmits the generated selecting signal sel1 to the selector SEL1.

The selector SEL1 transmits the vector data D3 to the activity value obtaining unit 5 and the mapping conversion unit 6 in accordance with the selecting signal sel1.

The first activity calculation unit 521 of the activity value obtaining unit 5 receives the norm data Norm transmitted included in the vector data vec_D3 transmitted from the selector SEL1 and the average value Ave(1) and the standard deviation σ(1) of the norm data of the feature vector data D2 in State 1 (Sitting state) transmitted from the data obtaining unit 51 for activity calculation. The first activity calculation unit 521 calculate an activity value D_act(1), which is an activity value in State 1, based on the average value Ave(1) and the standard deviation σ(1) of the norm data of the feature vector data D2 in State 1.

More specifically, assuming that the norm data of the feature vector data D2 in State 1 follows the normal distribution, the activity value obtaining unit 5 obtains the activity value D_act(1) using a probability density function f(x) following the normal distribution. In other words, the activity value obtaining unit 5 obtains the activity value D_act(1) through processing corresponding to the following formula:

Formula 5

$$f(x) = \frac{1}{\sqrt{2\pi\sigma^2}} \exp\left(-\frac{(x-\mu)^2}{2\sigma^2}\right) \quad (5)$$

where μ is an average value, and σ is a standard deviation.

In the present embodiment, the average value Ave(1) and standard deviation σ(1) of the norm data of the feature vector data D2 in State 1 is as follows:
Ave(1)=0.082989
σ(1)=0.059778

Thus, the activity value obtaining unit 5 calculates the value of the probability density function f(x) using μ=Ave(1)=0.082989 and σ=σ(1)=0.059778, and then obtains the calculated value as the activity value D_act(1).

The activity value obtaining unit 5 transmits the activity value D_act(1) obtained through the above-describe processing to the state determination unit 8.

The second activity calculation unit 522 obtains an activity value D_act(2) for State 2 (Standing state) through the same processing as the above-describe processing.

More specifically, the second activity calculation unit 522 calculates the value of the probability density function f(x) using μ=Ave(2)=0.334777 and σ=σ(2)=0.224319, and then obtains the calculated value as the activity value D_act(2).

The third activity calculation unit 523 obtains an activity value D_act(3) for State 3 (Running state) through the same processing as the above-describe processing.

More specifically, the third activity calculation unit 523 calculates the value of the probability density function f(x) using μ=Ave(3)=31.286555 and σ=σ(3)=2.630188, and then obtains the calculated value as the activity value D_act(3).

The fourth activity calculation unit 524 obtains an activity value D_act(4) for State 4 (Walking state) through the same processing as the above-describe processing.

More specifically, the fourth activity calculation unit 524 calculates the value of the probability density function f(x) using μ=Ave(4)=12.395692 and σ=σ(4)=3.409114, and then obtains the calculated value as the activity value D_act(4).

The fifth activity calculation unit 525 obtains an activity value D_act(5) for State 5 (UpStairs state) through the same processing as the above-describe processing.

More specifically, the fifth activity calculation unit 525 calculates the value of the probability density function f(x) using μ=Ave(5)=8.146392 and σ=σ(5)=1.912558, and then obtains the calculated value as the activity value D_act(5).

The sixth activity calculation unit 526 obtains an activity value D_act(6) for State 6 (DownStairs state) through the same processing as the above-describe processing.

More specifically, the sixth activity calculation unit 526 calculates the value of the probability density function f(x) using μ=Ave(6)=25.002112 and σ=σ(6)=3.254508, and then obtains the calculated value as the activity value D_act(6).

Figure 14:
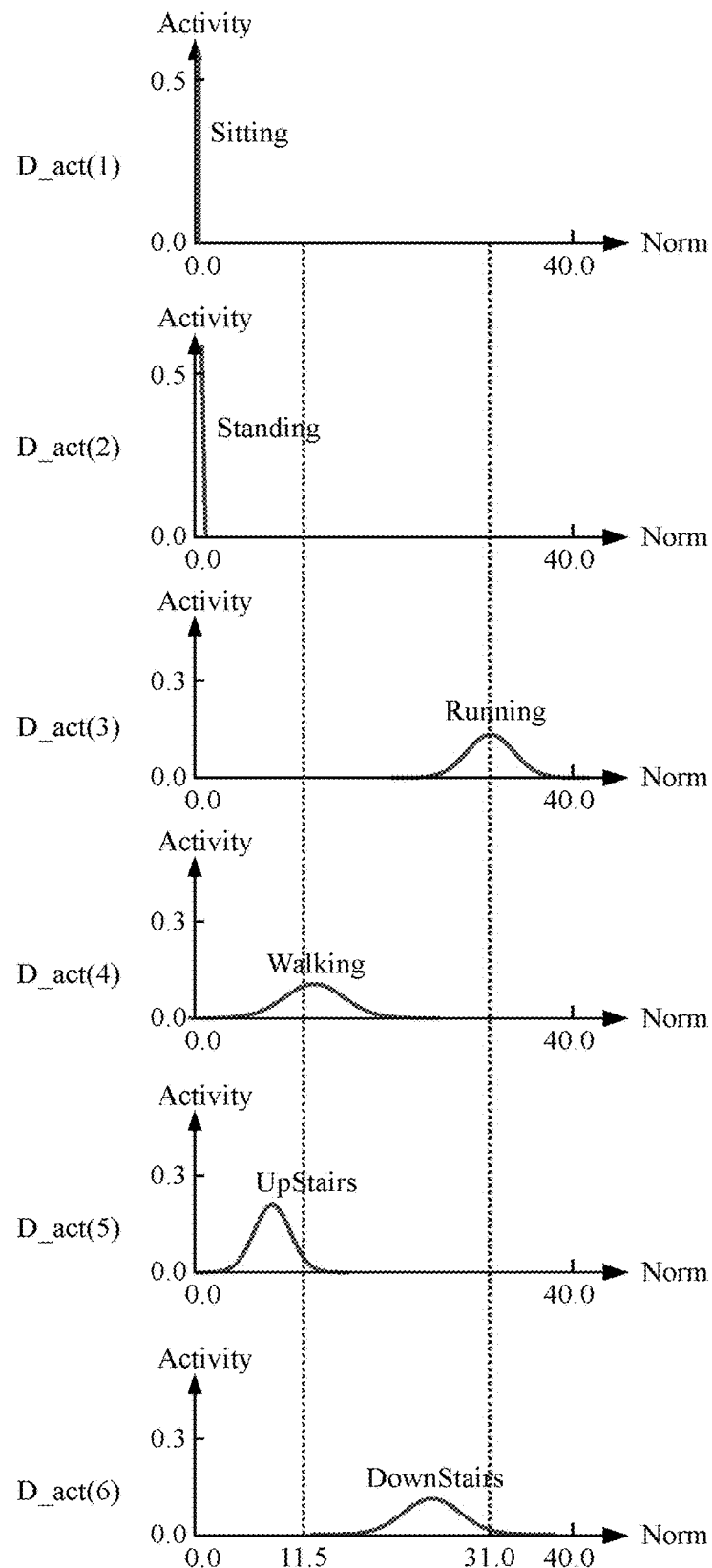
FIG. 14 is a graph in which values calculated using a probability density function f(x) are plotted assuming that norm data of the feature vector data D2 in State k (k is a natural number satisfying $1 \leq k \leq 6$) follows the normal distribution.

FIG. 14 is a graph in which values calculated using a probability density function f(x) are plotted assuming that norm data of the feature vector data D2 in State k (k is a natural number satisfying 1≤k≤6) follows the normal distribution. In other words, FIG. 14 shows a graph of the probability density function f(x) in the case in which the variable x of the function f(x) following the normal distribution is the norm data Norm and the average value and standard deviation in State k are the above-describe values.

In one example, the activity values D_act(k) obtained by the activity value obtaining unit 5 in a case of x=Norm=1.5

(a case of FIG. 12) and a case of x=Norm=31.0 (a case of FIG. 13) will be shown below.

(1) In the case of x=Norm=11.5 (FIG. 12)
D_act(1)=0.00
D_act(2)=0.00
D_act(3)=0.00
D_act(4)=0.11
D_act(5)=0.04
D_act(4)=0.00

In this case, the activity value D_act(4) for State 4 (Walking state) is large.

(2) In the case of x=Norm=31.0 (FIG. 13)
D_act(1)=0.00
D_act(2)=0.00
D_act(3)=0.15
D_act(4)=0.00
D_act(5)=0.00
D_act(4)=0.02

In this case, the activity value D_act(3) for State 3 (Running state) is large.

The activity values D_act(1) to D_act(6) obtained for each state are transmitted from the activity value obtaining unit 5 to the state determination unit 8.

The mapping conversion unit 6 performs SOM processing on the normalized feature vector data D3 using the combining weights data wij_fixed between nodes in the input layer and neurons in the output layer, which is determined by the SOM processing unit 43. The mapping conversion unit 6 then transmits the SOM output data D_som obtained through the SOM processing to the matching processing unit 7.

In Walking state, the SOM output data shown in the right lower portion of FIG. 12 is obtained, for example. In Running state, the SOM output data shown in the right lower portion of FIG. 13 is obtained.

The TP data obtaining unit 71 of the matching processing unit 7 reads, from the template storage unit 46, six pieces of template data Tmpl(1) to Tmpl(6) for six states.

The TP data obtaining unit 71 then transmits the six read pieces of template data Tmpl(1) to Tmpl(6) to the first inner product calculation unit 721 to the sixth inner product calculation unit 726, respectively. Note that a case (a case of M=6) in which the matching processing unit 7 shown in FIG. 5 includes six inner product calculation units will be described.

The first inner product calculation unit 721 performs processing for calculating an inner product using the SOM output data D_som and the template data Tmpl(1).

More specifically, the first inner product calculation unit 721 performs processing corresponding to the formula below to calculate an inner product.

Formula 6

$$D\_f(1) = \sum_{j=1}^{m2}\sum_{i=1}^{m1}(D_{ij} \times g_{ij}) \quad (6)$$

Note that $D_{ij}$ is an SOM output value at the coordinate (i, j) on the second-dimensional SOM, and $g_{ij}$ is a value at the coordinate (i, j) of the template data Tmpl(1).

The first inner product calculation unit 721 transmits the signal indicating the calculated inner product value through the above-described processing to the state determination unit 8 as the signal D_f(1).

The k-th (k is a natural number satisfying 1≤k≤6) inner product calculation unit 72k performs processing for calculating an inner product using the SOM output data D_som and the template data Tmpl(k).

More specifically, the k-th inner product calculation unit 72k performs processing corresponding to the formula below to calculate an inner product.

Formula 7

$$D\_f(k) = \sum_{j=1}^{m2}\sum_{i=1}^{m1}(D_{ij} \times g_{ij}) \quad (7)$$

Note that $D_{ij}$ is an SOM output value at the coordinate (i, j) on the second-dimensional SOM, and $g_{ij}$ is a value at the coordinate (i, j) of the template data Tmpl(k).

The k-th inner product calculation unit 72k transmits the signal indicating the calculated inner product value through the above-described processing to the state determination unit 8 as the signal D_f(k).

The matching processing unit 7 transmits the data obtained through the above-described processing to the state determination unit 8 as vector data vec_D_f(=(D_f(1), D_f(2), D_f(3), D_f(4), D_f(5), D_f(6))) for adaptability data.

The state determination unit 8 obtains the vector data vec_D_deci for state evaluation values based on the received vector data vec_D_act transmitted from the activity value obtaining unit 5 and the received vector data vec_D_f for adaptability data transmitted from the matching processing unit 7.

More specifically, assuming that a state evaluation for State k is D_deci(k) (k is a natural number satisfying 1≤k≤6), the k-th determination unit 8k of the state determination unit 8 obtains a state evaluation value D_deci(k) for state K through processing corresponding to the following formula:

$$D\_deci(k) = D\_act(k) \times D\_f(k).$$

When the adaptability data is obtained by calculation of the inner product as described above, the larger the adaptability data (the inner product value) is, the higher the probability that the current state is the state corresponding to the template used in the processing for calculating the inner product is.

The larger the activity value D_act(k) is, the higher the probability that data inputted into the state determination apparatus 1000 is data obtained in State k.

Thus, the larger the state evaluation value D_deci_(k) is, the higher the probability that a state of data inputted into the state determination apparatus 1000 is State k.

The state evaluation values D_deci(1) to D_deci(6) for State 1 to State 6 obtained as described above are transmitted, as vector data vec_D_deci, from the state determination unit 8 to the time series estimation unit 9.

Using the state transition probability data D_tr_prb, the PF processing unit 91 of the time series estimation unit 9 performs particle filter processing on the vector data vec_D_deci to obtain particle filter output values (state estimation values) D_pf(1) to D_pf(6) for State 1 to State 6.

The specific processing in the PF processing unit 91 will now be described.

First, the state transition probability D_tr_prb will be described.

FIG. 15 is a table showing state transition probabilities for States 1 to 6.

As understood from FIG. 15, for example, a transition probability from the state S1 (Sitting) at timing t to the state S2 (Standing) at the timing t+1 is "0.010". As understood from FIG. 15, for example, a transition probability from the state S1 (Sitting) at timing t to the state S1 (Sitting) at the timing t+1 is "0.990". In other words, the state transition probability data D_tr_prb represents probability of transition from a state at the timing t to a state at the timing t+1 (or probability that the current state remains during a period from the timing t to the timing t+1).

The state transition probability data D_tr_prb is stored in a storage unit (not shown) included in the state determination apparatus 1000, and the control unit reads data from the storage unit and transmits the data to the PF processing unit 91 of the time series estimation unit 9.

Figure 16:
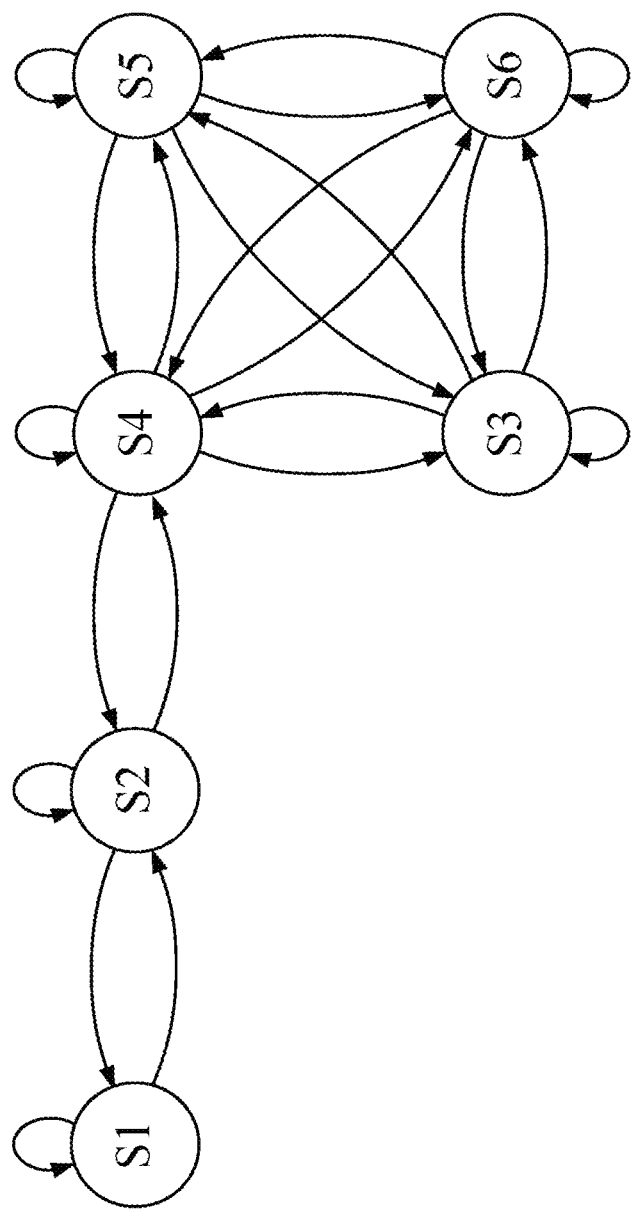
FIG. 16 is a state transition diagram for States 1 to 6.

FIG. 16 is a state transition diagram for States 1 to 6.

The state transition diagram in FIG. 16 is depicted based on the state transition probability data D_tr_prb. For example, a transition probability from the state S1 to the state S3 is "0", which is derived from the state transition probability data D_tr_prb, and thus no path from the state S1 to the state S3 exists in the state transition diagram in FIG. 16.

Particle filter processing performed by the PF processing unit 91 at the timing t in a case in which the current timing is the timing t and a state at the previous timing t−1 is determined to be "State 4" (State 4 (Walking)) will now be described with reference to the drawings.

Figure 17:
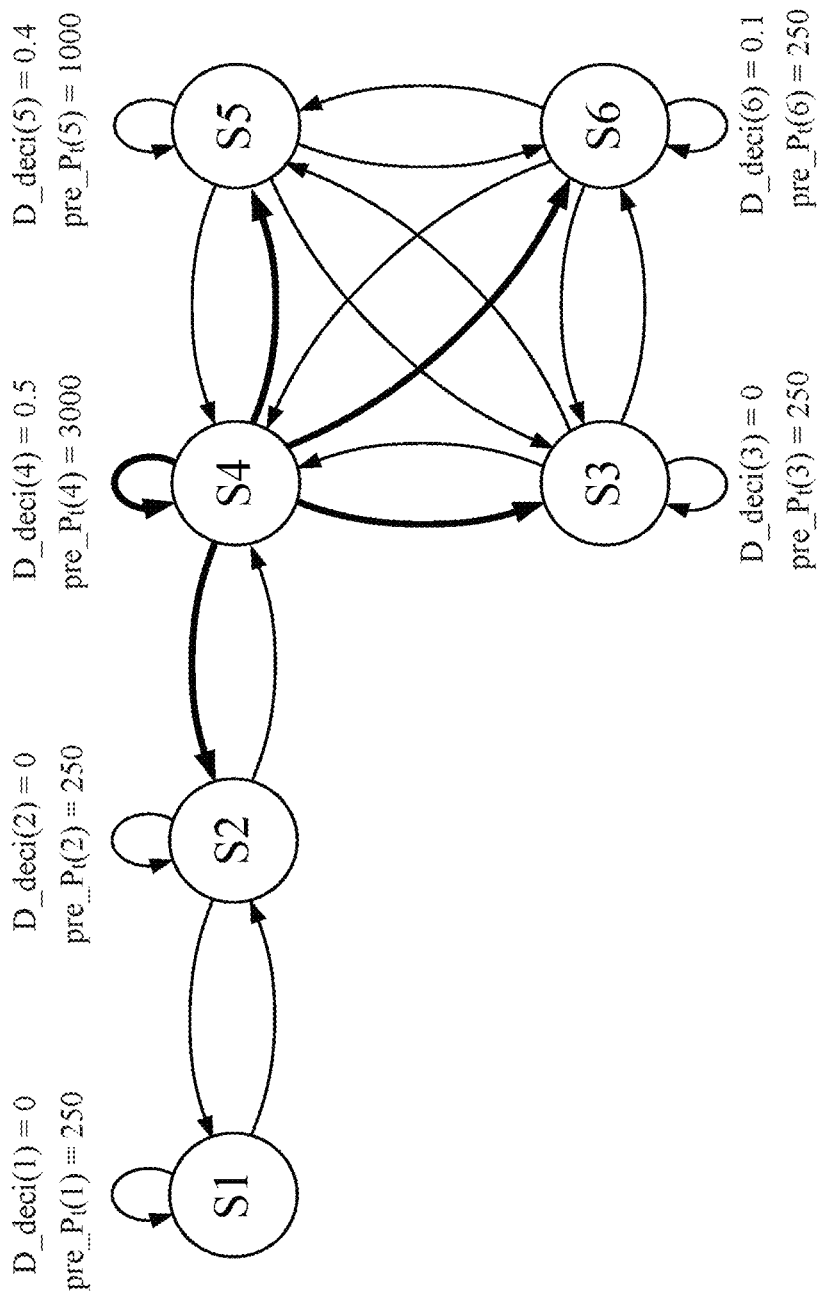
FIG. 17 is a state transition diagram for States 1 to 6.
Figure 18:
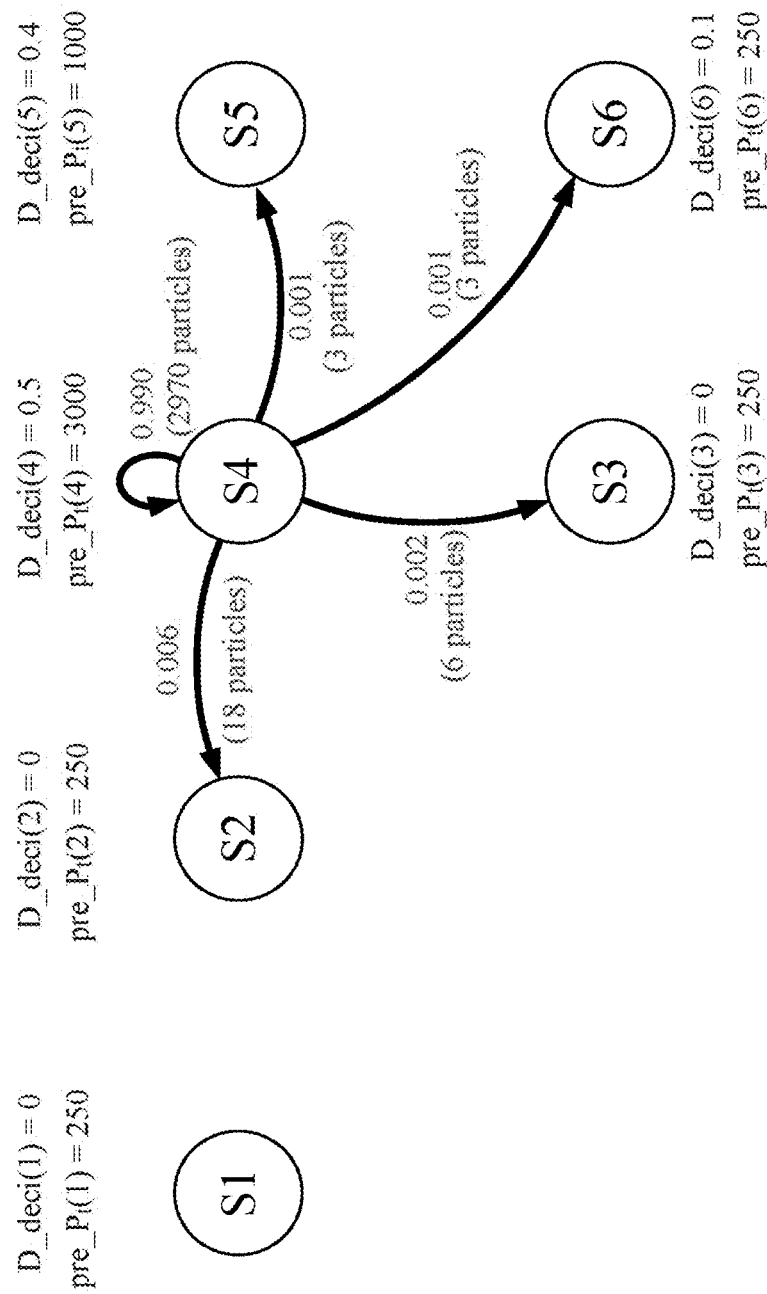
FIG. 18 is a state transition diagram for States 1 to 6.
Figure 19:
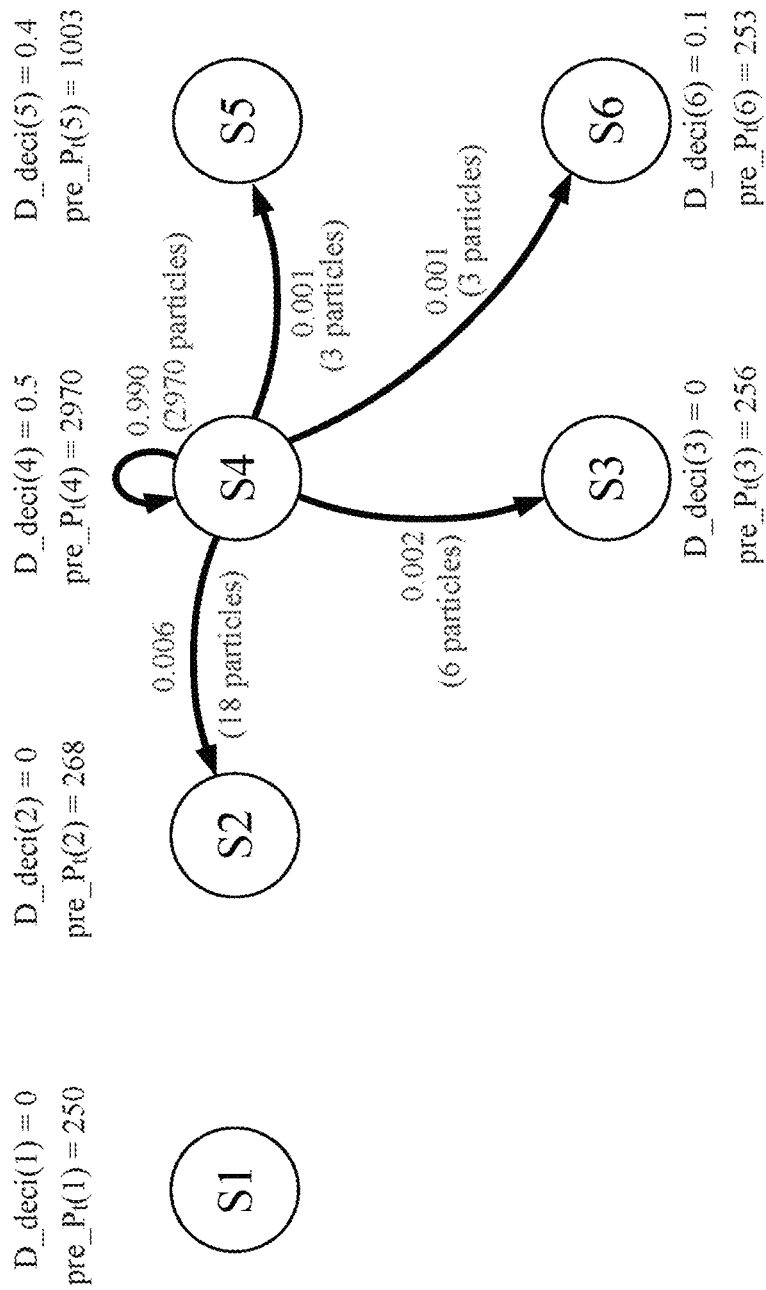
FIG. 19 is a state transition diagram for States 1 to 6.

FIGS. 17 to 19 are state transition diagrams when the state at the previous timing t−1 is "State 4" (State 4 (Walking)).

FIG. 20 is a diagram describing particle filter processing.

For ease of explanation, it is assumed that the number of particles to be used in the particle filter processing is "5000" and the values D_deci(1) to D_deci(6) obtained by the state determination unit 8 at the timing t (current timing) are as follows:

D_deci(1)=0.0
D_deci(2)=0.0
D_deci(3)=0.0
D_deci(4)=0.5
D_deci(5)=0.4
D_deci(6)=0.1

It is also assumed that the number pre_Pt(k) of particles assigned for the previous state k, which is a state before the particle filter processing at the present timing t is performed, is as follows:

pre_Pt(1)=250
pre_Pt(2)=250
pre_Pt(3)=3000
pre_Pt(4)=1000
pre_Pt(5)=250
pre_Pt(6)=250

It is preferable that in an initial processing or a reset processing, the number of particles assigned for each state is the same. For example, assuming that the total number of particles to be assigned is P_all, it is preferable that the number of particles assigned for each of State 1 to State M in the initial processing or the reset processing is "P_all/M".

The PF processing unit 91 performs prediction processing using the state transition probability data D_tr_prb.

More specifically, the state at the previous timing t−1 is "State 4" (State 4 (Walking)), and thus the PF processing unit 91 obtains transition probabilities from State to one of States 1 to 6 based on the state transition probability data D_tr_prb as follows:

(Transition probability from State S4 to State S1)=0.000
(Transition probability from State S4 to State S2)=0.006
(Transition probability from State S4 to State S3)=0.002
(Transition probability from State S4 to State S4)=0.990
(Transition probability from State S4 to State S5)=0.001
(Transition probability from State S4 to State S6)=0.001

Based on the above transition probability, the PF processing unit 91 then calculates the number of particles to be moved from the state S4 to individual states as follows:

(The number of particles to be moved from State S4 to State S1)=0×3000=0

(The number of particles to be moved from State S4 to State S2)=0.006×3000=18

(The number of particles to be moved from State S4 to State S3)=0.002×3000=6

(The number of particles to remain in State S4)=0.990×3000=2970

(The number of particles to be moved from State S4 to State S5)=0.001×3000=3

(The number of particles to be moved from State S4 to State S6)=0.001×3000=3

Note that the number of particles assigned for the state S4 at the previous timing t−1 is "600".

Based on the above, the PF processing unit 91 performs prediction processing by moving the above-identified number of particles, and then obtains the number of particles for each state after the prediction processing as follows:

$Pt(1)=250+0=250$ $Pt(2)=250+18=268$ $Pt(3)=250+6=256$ $Pt(4)=2970$ $Pt(5)=1000+3=1003$ $Pt(6)=250+3=253$

Note that the number of particles for the state k after the prediction processing is referred to as Pt(k). Next, the PF processing unit 91 performs weight calculation processing (likelihood calculation processing).

More specifically, the PF processing unit 91 performs weight calculation processing (likelihood calculation processing) by obtaining the state estimation value D_pf(k) for State k through processing corresponding to D_pf(k)=D_deci(k)×Pt(k).

In the above case, the PF processing unit 91 obtains the state estimation value D_pf(k) for State k as follows:

$D\_pf(1)=D\_deci(1) \times Pt(1)=0 \times 250=0$ $D\_pf(2)=D\_deci(2) \times Pt(2)=0 \times 268=0$ $D\_pf(3)=D\_deci(3) \times Pt(3)=0 \times 256=0$ $D\_pf(4)=D\_deci(4) \times Pt(4)=0.5 \times 2970=1485$ $D\_pf(5)=D\_deci(5) \times Pt(5)=0.4 \times 1003=401.2$ $D\_pf(6)=D\_deci(6) \times Pt(6)=0.1 \times 253=25.3$ The PF processing unit 91 transmits the state estimation values D_pf(1) to D_pf(6) obtained through the above-described processing to the state estimation unit 92.

The PF processing unit 91 also performs resampling processing.

More specifically, the PF processing unit 91 calculates a total value Sum for D_pf(1) to D_pf(6), and then assigns Pnum (In the present embodiment, Pnum=5000) particles used for particle filter processing to each state. In other words, assuming that the number of particles to be assigned for State k after the resampling processing is post_Pt(k), post_P(k) is obtained as follows:

Pnum=5000
Sum=1911.5 post_$Pt$(1)=Pnum×0/Sum=0 post_$Pt$(2)=Pnum×0/Sum=0 post_$Pt$(3)=Pnum×0/Sum=0 post_$Pt$(4)=Pnum×1485/Sum=3884 post_$Pt$(5)=Pnum×401.2/Sum=1049 post_$Pt$(6)=Pnum×25.30/Sum=66

In the above, the values post_Pk(k) are round off to integers. The number of particles assigned for each state obtained through the above-described processing are set to be the number of particles assigned for State k before the particle filter processing at the next timing t+1 are performed.

At the timing t+1, the PF processing unit 91 performs the same processing as the above-described processing (processing at the timing t).

Note that the PF processing unit 91 stores information on a state (this state is referred to as State k_t) in which the number post_Pt(k) of particles assigned, at the timing t, for State k after the resampling processing is maximum. At the next timing t+1, the PF processing unit 91 performs prediction processing based on the state transition processing data D_tr_prb assuming that the state at the previous timing t is the state k_t.

For example, in the above case, a state in which the number post_Pt(k) of particles assigned, at the timing t, for State k after the resampling processing is maximum is State 4 (State 4 (Walking)), and thus the PF processing unit 91 performs prediction processing at the next timing t+1 based on the state transition processing data D_tr_prb assuming that the state at the previous timing t is State 4 (State S4).

Note that FIG. 20 shows values calculated in the above processing (processing at the timing t) in the form of a table.

The state estimation unit 92 determines that State k whose state estimation value D_pf(k) is the largest of the state estimation values D_pf(1) to D_pf(6) for State 1 to 6 is a state at current timing t, and then transmits a signal indicating the determination result, as the signal Dout, out of the state determination apparatus 1000.

More specifically, (1) when the state estimation value D_pf(1) is the largest of the state estimation values D_pf(1) to D_pf(6), the state estimation unit 92 transmits the signal Dout indicating that data inputted into the state determination apparatus 1000 is data obtained in State 1, or "Sitting state" out of the state determination apparatus 1000.

(2) when the state estimation value D_pf(2) is the largest of the state estimation values D_pf(1) to D_pf(6), the state estimation unit 92 transmits the signal Dout indicating that data inputted into the state determination apparatus 1000 is data obtained in State 2, or "Standing state" out of the state determination apparatus 1000.

(3) when the state estimation value D_pf(3) is the largest of the state estimation values D_pf(1) to D_pf(6), the state estimation unit 92 transmits the signal Dout indicating that data inputted into the state determination apparatus 1000 is data obtained in State 3, or "Running state" out of the state determination apparatus 1000.

(4) when the state estimation value D_pf(4) is the largest of the state estimation values D_pf(1) to D_pf (6), the state estimation unit 92 transmits the signal Dout indicating that data inputted into the state determination apparatus 1000 is data obtained in State 4, or "Walking state" out of the state determination apparatus 1000.

(5) when the state estimation value D_pf(5) is the largest of the state estimation values D_pf(1) to D_pf(6), the state estimation unit 92 transmits the signal Dout indicating that data inputted into the state determination apparatus 1000 is data obtained in State 5, or "UpStairs state" out of the state determination apparatus 1000.

(6) when the state estimation value D_pf(6) is the largest of the state estimation values D_pf(1) to D_pf(6), the state estimation unit 92 transmits the signal Dout indicating that data inputted into the state determination apparatus 1000 is data obtained in State 6, or "DownStairs state" out of the state determination apparatus 1000.

For example, in the case of FIGS. 12 and 17, D_pf(4) (=Pt(4)×D_deci(4)=297) is maximum as shown in FIG. 20, and thus the state estimation unit 92 transmits the signal Dout indicating that data inputted into the state determination apparatus 1000 is data obtained in State 4, or "Walking state" out of the state determination apparatus 1000.

This allows the state determination apparatus 1000 to appropriately determine that data inputted into the state determination apparatus 1000 is data obtained in "Walking state".

As described above, the state determination apparatus 1000 creates template data indicating a state, and calculates a value D_f(k) (e.g., inner product value) indicating the correlation degree between template data and SOM output data. Furthermore, the state determination apparatus 1000 obtains norm data of the feature vector data D2, and obtains a probability density (relative likelihood) by the probability density function using the obtained norm data. In other words, the state determination apparatus 1000 obtains, as the activity value D_act(k), the probability density (relative likelihood) for State K, which is a state in obtaining the norm data, from the obtained norm data.

The state determination apparatus 1000 then obtains the state evaluation value D_deci(k) based on (1) the value indicating the correlation degree for State k and (2) the activity value D_act(k) for State k.

The state determination apparatus 1000 obtains transition probability between states from the state transition probability data D_tr_prb, and then performs prediction processing of particle filter processing based on the obtained transition probability to obtain the number Pt(k) of particles for State k after prediction processing.

Furthermore, the state determination apparatus 1000 obtains the state estimation value D_pf(k) based on the number Pt(k) of particles for State k after prediction processing and the state evaluation value D_deci(k) for State k.

The state estimation value D_pf(k) obtained as described above is based on the result of time series estimation based on the state transition probability between states. Thus, the state determination apparatus 1000 performs state determination processing with high accuracy using the state estimation value D_pf(k).

For example, when two state evaluation values of the state evaluation values D_deci(k) at the timing t are close to each other (e.g., when D_deci(4)=0.5 and D_deci(5)=0.4), the state determination apparatus 1000 performs particle filter processing as described above to estimate state transition in time series. This prevents erroneous determination from occurring and allows the state determination apparatus 1000 to appropriately perform state determination processing.

The state determination apparatus 1000 appropriately detects the correlation degree (the degree of similarity) between the template indicating a state and the SOM output data even when a map generated by the SOM technique includes discontinuous image regions (e.g., split image regions). Thus, the state determination apparatus 1000 appropriately performs pattern classification processing and/or pattern determination processing even when a map generated by the SOM technique includes discontinuous image regions (e.g., split image regions).

Furthermore, the state determination apparatus 1000 performs using the state 16 evaluation value D_deci(k) in consideration of the activity value D_ack(k) for State k and performs time series estimation processing with particle filter processing in consideration of state transition probabilities between states, thus allowing for determining the state of the input data appropriately. Accordingly, the state determination apparatus 1000 performs state determination processing with high accuracy even when a plurality of pieces of similar template data are used.

First Modification

A first modification of the first embodiment will now be described.

The components in this modification that are the same as the components described in the above embodiment will be given the same reference numerals as those components and will not be described in detail.

Figure 21:
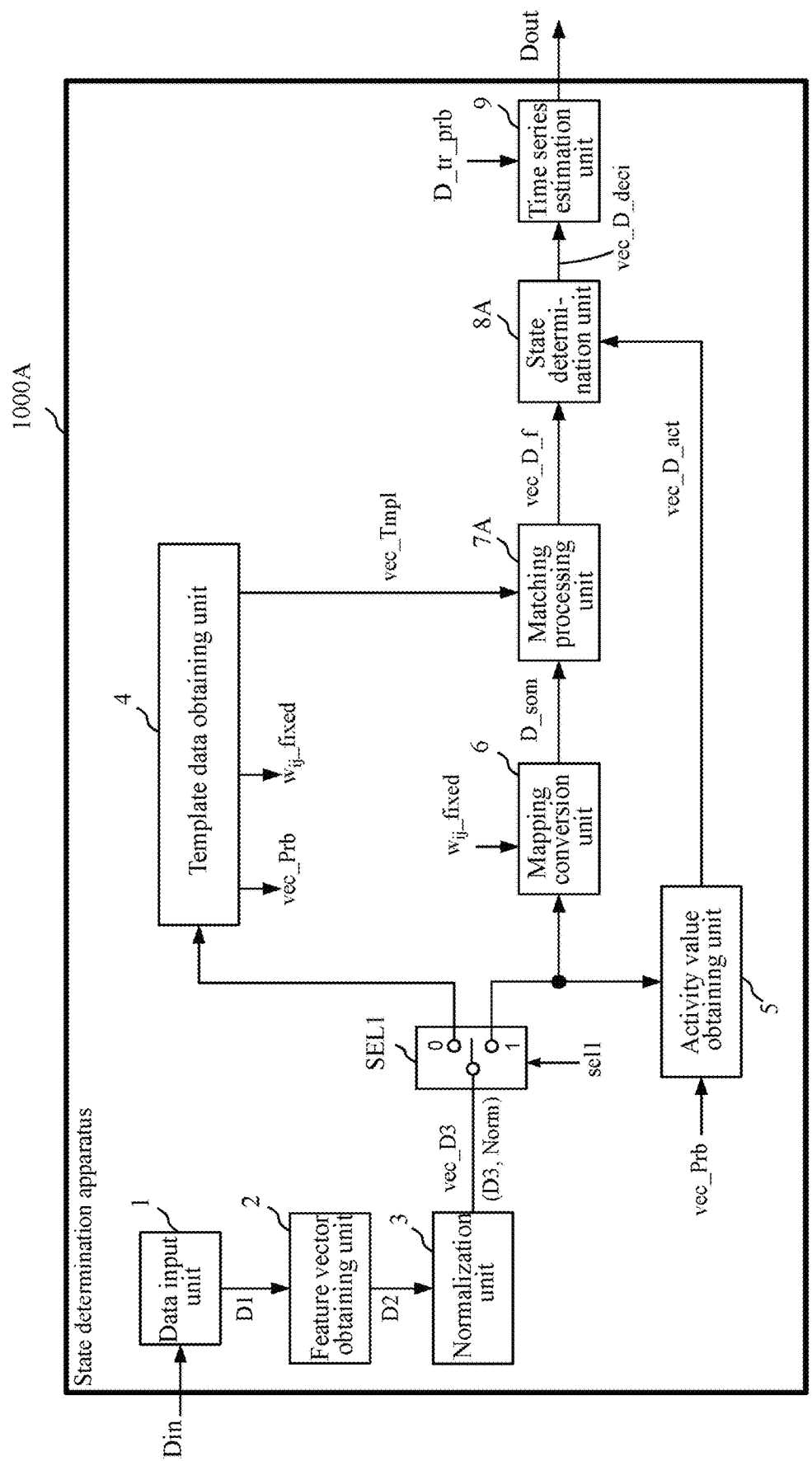
FIG. 21 is a schematic diagram of a state determination apparatus 1000A according to a first modification of the first embodiment.

FIG. 21 is a schematic diagram of a state determination apparatus 1000A according to the first modification of the first embodiment.

Figure 22:
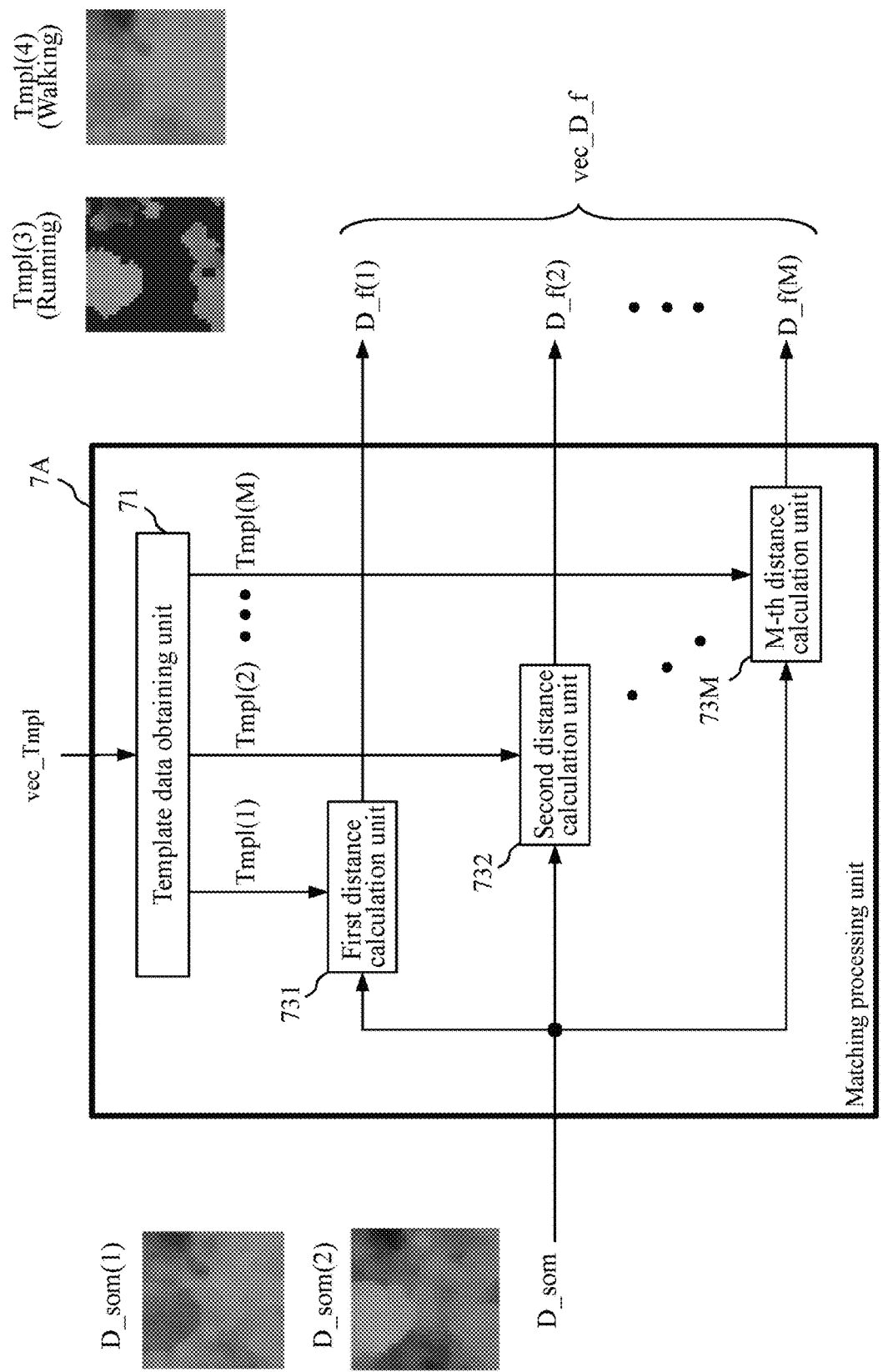
FIG. 22 is a schematic diagram of a matching processing unit 7A according to a first modification of the first embodiment.

FIG. 22 is a schematic diagram of a matching processing unit 7A according to the first modification of the first embodiment.

Figure 23:
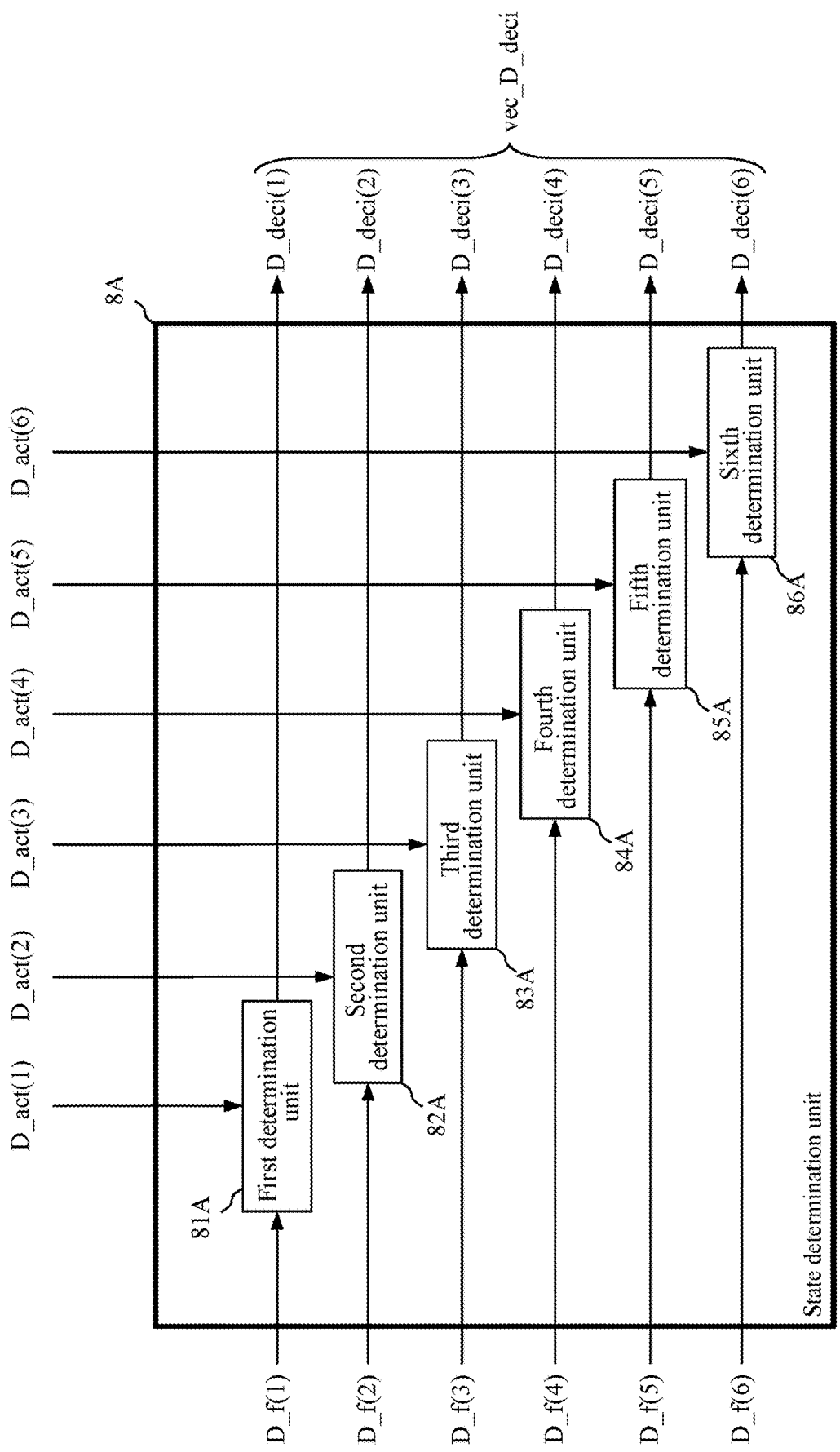
FIG. 23 is a schematic diagram of a state determination unit 8A according to a first modification of the first embodiment.

FIG. 23 is a schematic diagram of a state determination unit 8A according to the first modification of the first embodiment.

As shown in FIG. 21, the state determination apparatus 1000A of the present modification includes a matching processing unit 7A, which replaces the matching processing unit 7 of the state determination apparatus 1000 according to the first embodiment, and a state determination unit 8A, which replaces the state determination unit 8 of the state determination apparatus 1000 according to the first embodiment.

The matching processing unit 7A of the present modification includes a first distance calculation unit 731 to an M-th distance calculation unit 73M, which replaces the first inner product calculation unit 721 to the M-th inner product calculation unit 72M, respectively.

The matching processing unit 7 obtains the adaptability data D_f by calculating an inner product, whereas the matching processing unit 7A of the present modification obtains the adaptability data D_f by calculating a Euclidean distance.

More specifically, the first distance calculation unit 731 performs processing corresponding to the formula below to calculate a Euclidean distance between the SOM output data D_som and the template data Tmpl(1).

Formula 8

$$D\_f(1) = \sum_{j=1}^{m2} \sum_{i=1}^{m1} |D_{ij} - g_{ij}|^2 \quad (8)$$

Note that $D_{ij}$ is an SOM output value at the coordinate (i, j) on the second-dimensional SOM, and $g_{ij}$ is a value at the coordinate (i, j) of the template data Tmpl(1).

More specifically, the first distance calculation unit 83k (k is a natural number satisfying 1≤k≤6) performs processing corresponding to the formula below to calculate a Euclidean distance between the SOM output data D_som and the template data Tmpl(k).

Formula 9

$$D\_f(k) = \sum_{j=1}^{m2} \sum_{i=1}^{m1} |D_{ij} - g_{ij}|^2 \quad (9)$$

Note that $D_{ij}$ is an SOM output value at the coordinate (i, j) on the second-dimensional SOM, and $g_{ij}$ is a value at the coordinate (i, j) of the template data Tmpl(k).

The matching processing unit 7A transmits the data obtained through the above-described processing to the state determination unit 8A as vector data vec_D_f(=(D_f(1), D_f(2), D_f(3), D_f(4), D_f(5), D_f(6))) for adaptability data.

As shown in FIG. 23, the state determination unit 8A includes a first determination unit 81A to a sixth determination unit 86A, which respectively replace the first determination unit 81 to the sixth determination unit 86.

The state determination unit 8A obtains vector data vec_D_deci for the state evaluation value based on the vector data vec_D_act transmitted from the activity value obtaining unit 5 and the vector data vec_D_f for adaptability data transmitted from the matching processing unit 7A.

More specifically, assuming that a state evaluation value is D_deci(k) (k is a natural number satisfying 1≤k≤6), the k-th determination unit 8kA obtains a state evaluation value D_deci(k) for state K through processing corresponding to the following formula:

$$D\_deci(k) = D\_act(k) \times F1(D\_f(k))$$

Assume that the function F1(x) is a monotonically decreasing function with respect to x, and the value of the function F1(x) is always positive value or zero.

When the adaptability data is obtained by calculation of the Euclidean distance as described above, the smaller the adaptability data is, the higher the probability that the current state is the state corresponding to the template used in the processing for calculating the Euclidean distance. Since the function F1(x) is a monotonically decreasing function with respect to x, the larger the value of the function F1(D_f(k)) is, the higher the probability that the data inputted into the state determination apparatus 1000A is data in the state corresponding to the template used in the processing for calculating the Euclidean distance.

The larger the activity value D_act(k) is, the higher the probability that data inputted into the state determination apparatus 1000A is data obtained in State k.

Thus, the larger the state evaluation value D_deci(k) is, the higher the probability that data inputted into the state determination apparatus 1000A is obtained in State k.

The state evaluation value D_deci(1) to D_deci(6) for State 1 to State 6 obtained as described above are transmitted, as vector data vec_D_deci, from the state determination unit 8A to time series estimation unit 9.

Processing performed in the time series estimation unit 9 is the same as one described in the first embodiment.

As described above, the state determination apparatus 1000A obtains the adaptability data D_f(k) for State k using the Euclidean distance, and then obtains the state evaluation value D_deci(k) based on the obtained adaptability data D_f(k) for State k and activity value D_act(k) for State k.

The state determination apparatus 1000A obtains state transition probabilities between states from the state transition probability data D_tr_prb, and then performs prediction processing of the particle filter processing based on the obtained transition probability to obtain the number Pt(k) of particles for State k after the prediction processing.

Furthermore, the state determination apparatus 1000A obtains the state estimation value D_pf(k) based on the number Pt(k) of particles for State k after the prediction processing and the state evaluation value D_deci(k) for State k.

The state estimation value D_pf(k) obtained as described above is based on the result of time series estimation based on the state transition probability between states. Thus, the state determination apparatus 1000A performs state determination processing with high accuracy using the state estimation value D_pf(k).

For example, when two state evaluation values of the state evaluation values D_deci(k) at the timing t are close to each other (e.g., when D_deci(4)=0.5 and D_deci(5)=0.4), the state determination apparatus 1000A performs particle filter processing as described above to estimate state transition in time series. This prevents erroneous determination from occurring and allows the state determination apparatus 1000A to appropriately perform state determination processing.

The state determination apparatus 1000A appropriately detects the correlation degree (the degree of similarity) between the template indicating a state and the SOM output data even when a map generated by the SOM technique includes discontinuous image regions (e.g., split image regions). Thus, the state determination apparatus 1000A appropriately performs pattern classification processing and/or pattern determination processing even when a map generated by the SOM technique includes discontinuous image regions (e.g., split image regions).

Furthermore, the state determination apparatus 1000A performs using the state evaluation value D_deci(k) in consideration of the activity value D_ack(k) for State k and performs time series estimation processing with particle filter processing in consideration of state transition probabilities between states, thus allowing for determining the state of the input data appropriately. This enables the state determination apparatus 1000A to perform state determination processing with high accuracy even when a plurality of pieces of similar template data are used.

Second Modification

A second modification of the first embodiment will now be described.

The components in this modification that are the same as the components described in the above embodiment will be given the same reference numerals as those components and will not be described in detail.

Figure 24:
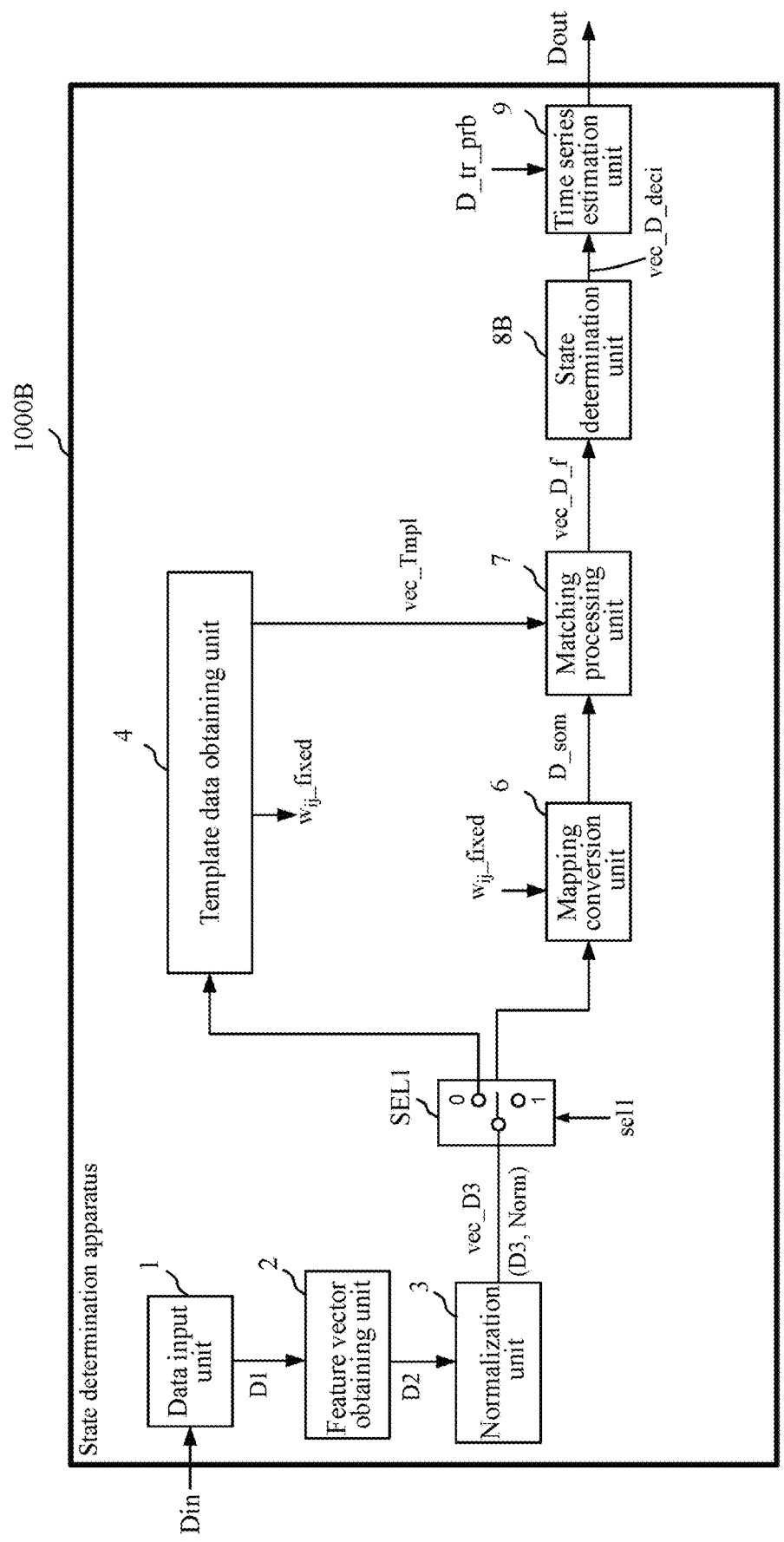
FIG. 24 is a schematic diagram of a state determination apparatus 1000B according to a second modification of the first embodiment.

FIG. 24 is a schematic diagram of a state determination apparatus 1000B according to the second modification of the first embodiment.

Figure 25:
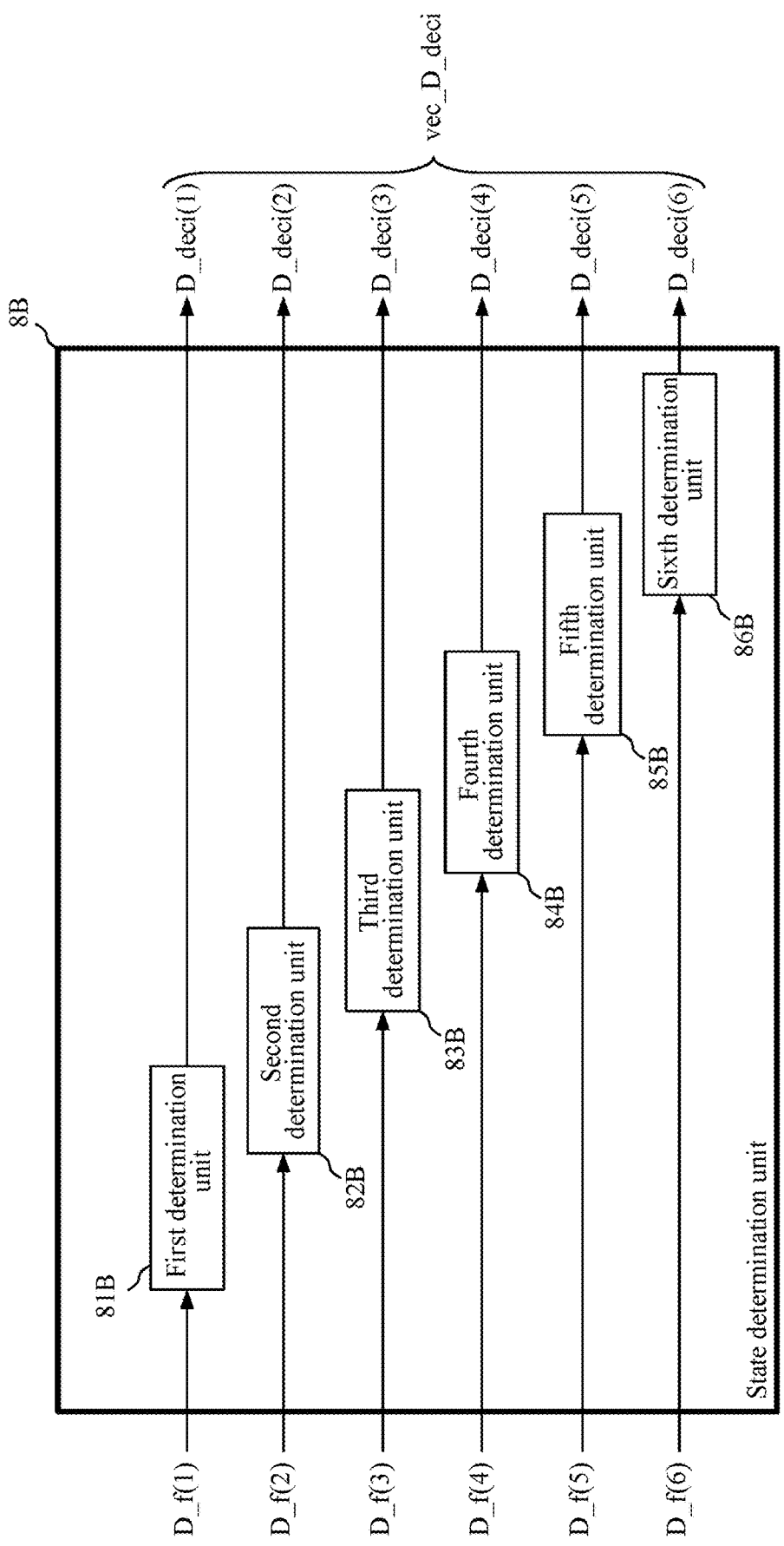
FIG. 25 is a schematic diagram of a state determination unit 8B according to the second modification of the first embodiment.

FIG. 25 is a schematic diagram of a state determination unit 8B according to the second modification of the first embodiment.

As shown in FIG. 24, the state determination apparatus 1000B according to the present modification has the same structure as the state determination apparatus 1000 except that it eliminates the activity value obtaining unit 5 and replaces the state determination unit 8 with a state determination unit 8B.

As shown in FIG. 24, the state determination unit 8B includes a first determination unit 81B to a sixth determination unit 86B, which replaces the first determination unit 81B to the sixth determination unit 86B, respectively.

The state determination unit 8B obtains vector data vec_D_deci for the state evaluation value based on the vector data vec_D_f for the adaptability data transmitted from the matching processing unit 7A.

More specifically, assuming that a state evaluation value for State k is D_deci(k) (k is a natural number satisfying 1≤k≤6), the k-th determination unit 8kB of the state determination unit 8B obtains the state evaluation value D_deci(k) for State k as D_deci(k)=D_f(k).

The state evaluation values D_deci(1) to D_deci(6) for State 1 to State 6 obtained as described above are transmitted, as vector data vec_D_deci, from the state determination unit 8B to time series estimation unit 9.

Processing performed in the time series estimation unit 9 is the same as one described in the first embodiment.

In the state determination apparatus 1000B according to the present modification, the matching processing unit 7 may be replaced with the matching processing unit 7A according to the first modification.

In this case, the state determination unit 8B performs as described below.

More specifically, assuming that a state evaluation value for State k is D_deci(k) (k is a natural number satisfying 1≤k≤6), the k-th determination unit 8kB of the state determination unit 8B obtains the state evaluation value D_deci(k) for State k through processing corresponding to D_deci(k)=F1(D_f(k)).

Note that the function F1(x) is a monotonically increasing function with respect to a variable x, and all possible values that the function F1(x) returns are positive values including zero.

When the adaptability data is obtained by calculation of the Euclidean distance as described above, the smaller the adaptability data is, the higher the probability that the current state is the state corresponding to the template used in the processing for calculating the Euclidean distance. Since the function F1(x) is a monotonically decreasing function with respect to x, the larger the value of the function F1(D_f(k)) is, the higher the probability that the data inputted into the state determination apparatus 1000B is data in the state corresponding to the template used in the processing for calculating the Euclidean distance.

Thus, the larger the state determination value D_deci(k) is, the higher the probability that the data inputted into the state determination apparatus 1000B is obtained in State k.

The state evaluation values D_deci(1) to D_deci(6) for State 1 to State 6 obtained as described above are transmitted, as vector data vec_D_deci, from the state determination unit 8B to time series estimation unit 9.

Processing performed in the time series estimation unit 9 is the same as one described in the first embodiment.

As described above, the state determination apparatus 1000B obtains the adaptability data D_f(k) for State k using the result from the inner product calculation processing or Euclidean distance calculation processing, and then obtains the state evaluation value D_deci(k) based on the obtained adaptability data D_f(k) for State k.

The state determination apparatus 1000B obtains transition probability between states from the state transition probability data D_tr_prb, and then performs prediction processing of particle filter processing based on the obtained transition probability to obtain the number Pt(k) of particles for State k after prediction processing.

Furthermore, the state determination apparatus 1000B obtains the state estimation value D_pf(k) based on the number Pt(k) of particles for State k after prediction processing and the state evaluation value D_deci(k) for State k.

The state estimation value D_pf(k) obtained as described above is based on the result of time series estimation based on the state transition probability between states. Thus, the state determination apparatus 1000B performs state determination processing with high accuracy using the state estimation value D_pf(k).

For example, when two state evaluation values of the state evaluation values D_deci(k) at the timing t are close to each other (e.g., when D_deci(4)=0.5 and D_deci(5)=0.4), the state determination apparatus 1000B performs particle filter processing as described above to estimate state transition in time series. This prevents erroneous determination from occurring and allows the state determination apparatus 1000B to appropriately perform state determination processing.

The state determination apparatus 1000B appropriately detects the correlation degree (the degree of similarity) between the template indicating a state and the SOM output data even when a map generate by the SOM technique includes discontinuous image regions (e.g., split image regions). Thus, the state determination apparatus 1000B appropriately performs pattern classification processing and/or pattern determination processing even when a map generated by the SOM technique includes discontinuous image regions (e.g., split image regions).

Other Embodiments

The above embodiments and modifications may be combined to form state determination apparatuses.

Although the above embodiments and modifications describe the case in which the norm data storage unit 42, the SOM data storage unit 44 and the template data storage unit 46 are achieved by using different memories, the embodiments and modifications should not be limited to this structure. For example, the norm data storage unit 42, the SOM data storage unit 44 and the template data storage unit 46 may be achieved by using one memory.

Although the above embodiments and modifications describe the case in which the activity value obtaining unit 5 calculates the activity value D_act(k) using a probability density function f(x) following the normal distribution assuming that the norm data of the feature vector data D2 for State k follows the normal distribution, the embodiments and modifications should not be limited to this configuration. For example, the activity value obtaining unit 5 may calculate the value of the probability density function f(x) using polygonal line approximation or the like, and then obtain the activity value D_act(k) based on the calculated approximate value of the probability density function f(x).

Although the above embodiments and modifications describe the case in which in the learning phase, the norm obtaining unit 41 obtains norm data and then stores the obtained norm data in the norm data storage unit 42, the embodiments and modifications should not be limited to this configuration. For example, in the template creating phase, the norm obtaining unit 41 may obtain norm data and then store the obtained norm data in the norm data storage unit 42.

Although the above embodiments and modifications describe the case in which the number of dimension for the feature vector data D2 and the normalized feature vector data D3 is eight (i.e., in the case of eight-dimensional vector data), the embodiments and modifications should not be limited to this configuration; the number of the feature vector data D2 or the normalized feature vector data D3 may be another number. For example, the feature vector data D2 and the normalized feature vector data D3 may be multidimensional vector data other than eight-dimensional vector data.

The state transition probability data (e.g., the state transition probability data shown in FIG. 15) described in the above embodiments and modifications is merely one example; the present invention should not be limited to this disclosure.

Each block of the state determination apparatus described in the above embodiments may be formed using a single chip with a semiconductor device, such as an LSI (large-scale integration) device, or some or all of the blocks of the moving object controller may be formed using a single chip.

Although LSI is used as the semiconductor device technology, the technology may be an integrated circuit (IC), a system LSI, a super LSI, or an ultra LSI depending on the degree of integration of the circuit.

The circuit integration technology employed should not be limited to LSI, but the circuit integration may be achieved using a dedicated circuit or a general-purpose processor. A field programmable gate array (FPGA), which is an LSI circuit programmable after manufactured, or a reconfigurable processor, which is an LSI circuit in which internal circuit cells are reconfigurable or more specifically the internal circuit cells can be reconnected or reset, may be used.

All or part of the processes performed by the functional blocks described in the above embodiments may be implemented by a central processing unit (CPU) in a computer.

All or part of the processes performed by the functional blocks described in the above embodiments may be implemented by a central processing unit (CPU) in a computer.

The programs for these processes may be stored in a storage device, such as a hard disk or a ROM, and may be executed from the ROM or be read into a RAM and then executed.

The processes described in the above embodiments may be implemented by using either hardware or software (including use of an operating system (OS), middleware, or a library), or may be implemented using both software and hardware.

Figure 26:
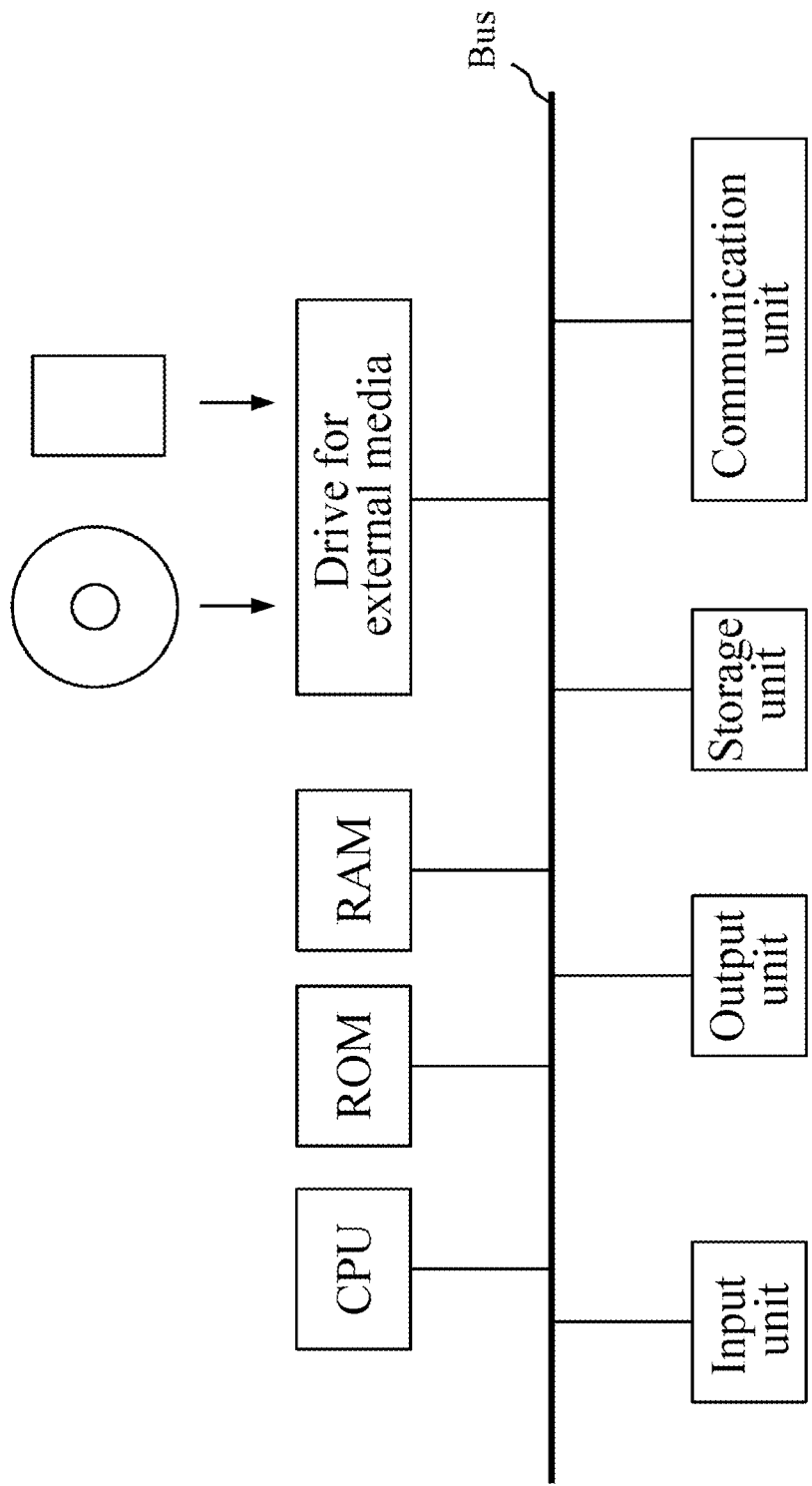
FIG. 26 is a schematic diagram of an exemplary configuration with a CPU bus

For example, when functional units of the above embodiments and modifications is achieved by using software, the hardware structure (the hardware structure including CPU, ROM, RAM, an input unit, an output unit or the like, each of which is connected to a bus) shown in FIG. 26 may be employed to achieve the functional units by using software.

The processes described in the above embodiments may not be performed in the order specified in the above embodiments. The order in which the processes are performed may be changed without departing from the scope and the spirit of the invention.

The present invention may also include a computer program enabling a computer to implement the method described in the above embodiments and a computer readable recording medium on which such a program is recorded. The computer readable recording medium may be, for example, a flexible disk, a hard disk, a CD-ROM, an MO, a DVD, a DVD-ROM, a DVD-RAM, a large-capacity DVD, a next-generation DVD, or a semiconductor memory.

The computer program may not be recorded on the recording medium but may be transmitted with an electric communication line, a radio or cable communication line, or a network such as the Internet.

The term "unit" herein may include "circuitry," which may be partly or entirely implemented by using either hardware or software, or both hardware and software.

The specific structures described in the above embodiments are mere examples of the present invention, and may be changed and modified variously without departing from the scope and the spirit of the invention.

APPENDIXES

The present invention may also be expressed in the following forms.

A first aspect of the present invention provides a state determination apparatus including feature vector obtaining circuitry, normalization circuitry, mapping conversion circuitry, matching processing circuitry, state determination circuitry, and time series estimation circuitry.

The feature vector obtaining circuitry is configured to obtain feature vector data from measured data obtained by measuring an event with an unknown state.

The normalization circuitry is configured to obtain a norm of the feature vector data and obtain normalized feature vector data by normalizing the feature vector data.

The mapping conversion circuitry is configured to obtain SOM output data by mapping the feature vector data into a space whose dimension differs from a dimension of the feature vector data.

The matching processing circuitry is configured to obtain adaptability data indicating a correlation degree between template data indicating a state and the SOM output data obtained by the mapping conversion circuitry.

The state determination circuitry is configured to obtain a state evaluation value based on the adaptability data obtained by the matching processing circuitry.

The time series estimation circuitry is configured to estimate a state indicated by the measured data based on the state evaluation value and state transition probability between states.

In the state determination apparatus, the matching processing circuitry obtains the adaptability data indicating the correlation degree between template data indicating a state and the SOM output data, and the state determination circuitry obtains the state evaluation value based on the adaptability data.

In the state determination apparatus, the time series estimation circuitry estimates a state indicated by the measured data based on the state evaluation value and state transition probability between states.

The state determination apparatus can estimate state transition in time series based on the state transition probability between states using the state evaluation value.

This allows the state determination apparatus to perform state determination processing with high accuracy.

As described above, the state determination apparatus appropriately detects the correlation degree (the degree of similarity) between the template indicating a state and the SOM output data even when a map generated by the SOM technique includes discontinuous image regions (e.g., split image regions). Thus, the state determination apparatus appropriately performs pattern classification processing and/or pattern determination processing even when a map generated by the SOM technique includes discontinuous image regions (e.g., split image regions).

A second aspect of the invention provides the state determination apparatus of the first aspect of the invention further including activity value obtaining circuitry configured to obtain an activity value indicating a probability that the norm obtained by the normalization circuitry corresponds to a norm of the feature vector data obtained in a state.

The state determination circuitry obtains the state evaluation value based on the adaptability data obtained by the matching processing circuitry and the activity value obtained by the activity value obtaining circuitry.

The time series estimation circuitry estimates the state indicated by the measured data based on the state evaluation value obtained by the state determination circuitry and the state transition probability between states.

In the state determination apparatus, the matching processing circuitry obtains the adaptability data indicating the correlation degree between the template data indicating a state and the SOM output data, and the state determination circuitry obtains the state evaluation value.

In the state determination apparatus, the time series estimation circuitry estimates a state indicated by the measured data based on the state evaluation value and state transition probability between states.

The state determination apparatus can estimate state transition in time series based on the state transition probability between states using the state evaluation value.

This allows the state determination apparatus to perform state determination processing with high accuracy.

As described above, the state determination apparatus appropriately detects the correlation degree (the degree of similarity) between the template indicating a state and the SOM output data even when a map generated by the SOM technique includes discontinuous image regions (e.g., split image regions). Thus, the state determination apparatus appropriately performs pattern classification processing and/or pattern determination processing even when a map generated by the SOM technique includes discontinuous image regions (e.g., split image regions).

Furthermore, the state determination apparatus performs using the state evaluation value in consideration of the activity value indicating a probability (relative likelihood) of the state and performs time series estimation processing (e.g., particle filter processing) in consideration of state transition probabilities between states, thus allowing for determining the state of the input data appropriately. This enables the state determination apparatus to perform state determination processing with high accuracy even when a plurality of pieces of similar template data are used.

A third aspect of the invention provides the state determination apparatus of the second aspect of the invention in which the activity value obtaining circuitry obtains the activity value for a k-th state (k is a natural number satisfying 1≤k≤M, and M is a natural number) through processing corresponding to Formula 10

$$f(x) = \frac{1}{\sqrt{2\pi\sigma^2}} \exp\left(-\frac{(x-\mu)^2}{2\sigma^2}\right) \qquad (10)$$

where μ is an average value of norms of the feature vector data obtained in the k-th state, σ is a standard deviation, x is a value of the norm of the feature vector data, and f(x) is a probability density function.

Thus, the state determination apparatus obtains the activity value using the probability density function f(x) assuming that the norm (norm data) of the feature vector obtained in the k-th state (State k) follows the normal distribution.

A fourth aspect of the invention provides the state determination apparatus of the second or third aspect of the invention in which the matching processing circuitry obtains M (M is a natural number) pieces of adaptability data D_f(1) to D_f(M), which respectively indicate the correlation degree with respect to M pieces of template data Tmpl(1) to Tmpl(M).

The activity value obtaining circuitry obtains activity values D_act(1) to D_act(M), which respectively corresponds to a first state to M-th state.

The state determination circuitry obtains a state evaluation value D_deci(k) for k-th state based on the adaptability data D_f(k) for the k-th state and the activity value D_act(k) for the k-th state, and determines a state indicated by the measured data based on the obtained determination evaluation value D_est(k) for the k-th state.

The time series estimation circuitry performs particle filter processing using state transition probability data indicating state transition probability between states, performs prediction processing of the particle filter processing based on the state transition probability data, and obtains the number Pt(k) of particles for the k-th state after the prediction processing.

The time series estimation circuitry obtains a state estimation value D_pf(k) for the k-th state based on the number Pt(k) of particles after the prediction processing and the state evaluation value D_deci(k) for the k-th state, and determines a state indicated by the measured data based on the obtained state estimation value D_pf(k) for the k-th state.

This enables the state determination apparatus to determine the correlation degree between the SOM output data obtained from the input data and M pieces of template data Tmpl(1) to Tmpl(M) using the adaptability data. Thus, the state determination apparatus appropriately determines which state among the M states corresponding to the template data Tmpl(1) to Tmpl(M) is close to the state in which the input data is obtained.

In other words, the state determination apparatus appropriately detects the correlation degree (the degree of similarity) between the template indicating a state and the SOM output data even when a map generated by the SOM technique includes discontinuous image regions (e.g., split image regions). Thus, the state determination apparatus appropriately performs pattern classification processing and/or pattern determination processing even when a map generated by the SOM technique includes discontinuous image regions (e.g., split image regions).

Furthermore, the state determination apparatus performs using the state evaluation value in consideration of the activity value indicating a probability (relative likelihood) of the state and performs time series estimation processing (e.g., particle filter processing) in consideration of state transition probabilities between states, thus allowing for determining the state of the input data appropriately. This enables the state determination apparatus to perform state determination processing with high accuracy even when a plurality of pieces of similar template data are used.

A fifth aspect of the invention provides the state determination apparatus of the fourth aspect of the invention in which the matching processing circuitry calculates inner products using M (M is a natural number) pieces of template data and the SOM output data and obtains the calculated inner products as the adaptability data D_f(1) to D_f(M).

The state determination circuitry obtains the state evaluation value D_deci(k) for the k-th state through processing corresponding to $$D\_deci(k)=h1(D\_f(k),D\_act(k))$$

h1(x, y): a function of variables x and y.

The time series estimation circuitry obtains the state estimation value D_pf(k) for the k-th state through processing corresponding to $$D\_pf(k)=h2(D\_deci(k),Pt(k))$$

h2(x, y): a function of variables x and y.

The time series estimation circuitry determines that a state corresponding to the largest state estimation value of the state estimation values D_pf(1) to D_pf(M) is the state indicated by the measured data.

The state determination apparatus creates template data indicating a state, and calculates a value (e.g., inner product value) indicating the correlation degree between template data and SOM output data. Furthermore, the state determination apparatus obtains norm data of the feature vector data, and obtains a probability density (relative likelihood) by the probability density function using the obtained norm data. In other words, the state determination apparatus obtains, as the activity value D_act(k), the probability density (relative likelihood) for the k-th state, which is a state in obtaining the norm data, from the obtained norm data.

The state determination apparatus then obtains the state evaluation value D_deci(k) based on based on (1) the value indicating the correlation degree for k-th state and (2) the activity value D_act(k) for the k-th state.

The state determination apparatus obtains transition probability between states from the state transition probability data, and then performs prediction processing of the particle filter processing based on the obtained transition probability to obtain the number Pt(k) of particles for the k-th state after the prediction processing.

Furthermore, the state determination apparatus obtains the state estimation value D_pf(k) based on the number Pt(k) of particles for the k-th state after the prediction processing and the state evaluation value D_deci(k) for the k-th state.

The state estimation value D_pf(k) obtained as described above is based on the result of time series estimation based on the state transition probability between states. Thus, the state determination apparatus performs state determination processing with high accuracy using the state estimation value D_pf(k).

It is preferable that the larger the values of the variables x and y are, the larger the value of the function h1(x, y) is.

In one example, the function h1(x, y) is a function defined by h1(x, y)=x×y.

When the function h1(x, y) is set as described above, the state evaluation value D_deci(k) for the k-th state (State k) is calculated using the following formula:

$$D\_deci(k)=D\_f(k) \times D\_act(k).$$

It is preferable that the larger the values of the variables x and y are, the larger the value of the function h2(x, y) is.

In one example, the function h2(x, y) is a function defined by h2(x, y)=x×y.

When the function h2(x, y) is set as described above, the state estimation value D_pf(k) for the k-th state (State k) is calculated using the following formula:

$$D\_pf(k)=D\_deci(k) \times Pt(k).$$

A sixth aspect of the invention provides the state determination apparatus of the fourth aspect of the invention in which the matching processing circuitry calculates Euclidean distances using M (M is a natural number) pieces of template data and the SOM output data and obtains the calculated Euclidean distances as the adaptability data D_f(1) to D_f(M).

The state determination circuitry obtains the state evaluation value D_deci(k) for the k-th state through processing corresponding to $$D\_deci(k)=h1(F1(D\_f(k)),D\_act(k))$$

where h1(x,y) is a function of variables x and y, and F1(x) is a monotonically decreasing function with respect to x and the value of the function F1(x) is a positive value or zero.

The time series estimation circuitry obtains the state estimation value D_pf(k) for the k-th state through processing corresponding to $$D\_pf(k)=h2(D\_deci(k),Pt(k))$$

h2(x, y): a function of variables x and y.

The time series estimation circuitry determines that a state corresponding to the largest state estimation value of the state estimation values D_pf(1) to D_pf(M) is the state indicated by the measured data.

Thus, the state determination apparatus obtains the correlation degree between the SOM output data obtained from the input data and the M pieces of template data Tmpl(1) to Tmpl(M) by calculating the Euclidean distances.

It is preferable that the larger the values of the variables x and y are, the larger the value of the function h1(x, y) is.

In one example, the function h1(x, y) is a function defined by h1(x, y)=x×y.

When the function h1(x, y) is set as described above, the state evaluation value D_deci(k) for the k-th state (State k) is calculated using the following formula:

$$D\_deci(k)=F1(D\_f(k)) \times D\_act(k).$$

It is preferable that the larger the values of the variables x and y are, the larger the value of the function h2(x, y) is.

In one example, the function h2(x, y) is a function defined by h2(x, y)=x×y.

When the function h2(x, y) is set as described above, the state estimation value D_pf(k) for the k-th state (State k) is calculated using the following formula:

$$D\_pf(k)=D\_deci(k) \times Pt(k).$$

A seventh aspect of the invention provides the state determination apparatus of one of the second to sixth aspect of the invention in which the template data is composed of two-dimensional elements, and a sum of all the values of the elements of the template data is "1".

In the state determination apparatus, normalization is performed such that the sum of the values of element data of the template data is "1". Such normalization allows possible range of values indicating correlation degree (e.g., inner product values or Euclidean distances) to be constant (common) regardless of templates to be used in the determination processing for determining the correlation degree between template data and SOM output data. This allows classification determination processing to be easily achieved.

An eighth aspect of the invention provides the state determination apparatus of one of the second to seventh aspect of the invention in which the template data is composed of two-dimensional elements.

The template data is created based on N pieces of SOM output data obtained during a period from timing t=1 to timing t=N (N is a natural number) in which an identical state continues.

Assuming that the template data is composed of m×n (m and n are natural numbers) pieces of data, the template data is created by setting a value $g_{ij}$ to element data at a second-dimensional coordinate (i,j) (i and j are natural numbers satisfying 1≤i≤m and 1≤j≤n) of the template, the value $g_{ij}$ being obtained by Formula 11

$$g_{ij} = \frac{1}{N} \sum_{t=1}^{N} D_{ij}(t) \tag{11}$$

where $g_{ij}$ is element data at a second-dimensional coordinate (i, j) (i and j are natural numbers satisfying 1≤i≤m and 1≤j≤n) of the template data, and $D_{ij}(t)$ is element data at a second-dimensional coordinate (i, j) of the SOM output data at timing t.

Thus, the state determination apparatus performs state determination processing using the template data obtained by averaging, in the temporal direction, the SOM output data obtained during the period in which the identical state continues.

A ninth aspect of the invention provides the state determination apparatus of the one of the second to seventh aspect of the invention in which the template data is composed of two-dimensional elements.

The template data is created based on N pieces of SOM output data obtained during a period from timing t=1 to timing t=N (N is a natural number) in which an identical state continues.

Assuming that (1) the template data is composed of m×n (m and n are natural numbers) pieces of data, (2) $g_{ij}$ is element data at a second-dimensional coordinate (i, j) (i and j are natural numbers satisfying 1≤i≤m and 1≤j≤n) of the template data, and (3) $D_{ij}(t)$ is element data at a second-dimensional coordinate (i, j) of the SOM output data at timing t, and the template data is created by setting an average value obtained by calculating an average value of the element data $D_{ij}(t)$ satisfying $D_{ij}(t) \geq Th1$ to a value $g_{ij}$ at a second-dimensional coordinate (i, j) of the template data.

Thus, the state determination apparatus performs state determination processing using the template data obtained by averaging, in the temporal direction, the SOM output data obtained during the period in which the identical state continues. The template data is created through the averaging processing with the data smaller than the threshold excluded. Using such template data allows the state determination apparatus to perform appropriate state determination processing.

A tenth aspect of the invention provides the state determination apparatus of one of the second to seventh aspect of the invention in which the template data is composed of two-dimensional elements.

The template data is created based on N pieces of SOM output data obtained during a period from timing t=1 to timing t=N (N is a natural number) in which an identical state continues.

Assuming that (1) the template data is composed of m×n (m and n are natural numbers) pieces of data, (2) $g_{ij}$ is element data at a second-dimensional coordinate (i, j) (i and j are natural numbers satisfying 1≤i≤m and 1≤j≤n) of the template data, and (3) $D_{ij}(t)$ is element data at a second-dimensional coordinate (i, j) of the SOM output data at timing t, and the template data is created by setting a value $g_{ij}$ to element data at a second-dimensional coordinate (i, j) (i and j are natural numbers satisfying 1≤i≤m and 1≤j≤n) of the template, the value $g_{ij}$ being obtained by calculating an average value of values $D_{ij}(t)$ of the SOM output data at the coordinate (i, j) whose corresponding variance value $v_{ij}$ is obtained by Formula 12

$$AveD_{ij} = \frac{1}{N}\sum_{t=1}^{N} D_{ij}(t) \quad (12)$$

Formula 13

$$v_{ij} = \frac{1}{N}\sum_{t=1}^{N} (D_{ij}(t) - AveD_{ij})^2 \quad (13)$$

and satisfies $v_{ij} \leq Th2$.

Thus, the state determination apparatus performs state determination processing using the template data obtained by averaging, in the temporal direction, the SOM output data obtained during the period in which the identical state continues. The template data is created through the averaging processing using only data whose variance in the temporal direction is smaller than the threshold. Using such template data allows the state determination apparatus to perform appropriate state determination processing.

An eleventh aspect of the invention provides the state determination apparatus of one of the second to seventh aspect of the invention in which the template data is composed of two-dimensional elements.

The template data is created based on N pieces of SOM output data obtained during a period from timing t=1 to timing t=N (N is a natural number) in which an identical state continues.

Assuming that (1) the template data is composed of m×n (m and n are natural numbers) pieces of data, (2) $g_{ij}$ is element data at a second-dimensional coordinate (i, j) (i and j are natural numbers satisfying 1≤i≤m and 1≤j≤n) of the template data, and (3) $D_{ij}(t)$ is element data at a second-dimensional coordinate (i, j) of the SOM output data at timing t, and the template data is created by setting a value $g_{ij}$ to element data at a second-dimensional coordinate (i, j) (i and j are natural numbers satisfying 1≤i≤m and 1≤j≤n) of the template, the value $g_{ij}$ being obtained by calculating an average value of values $D_{ij}(t)$ of the SOM output data at the coordinate (i, j) whose corresponding variance value $v_{ij}$ is obtained by Formula 14

$$AveD_{ij} = \frac{1}{N}\sum_{t=1}^{N} D_{ij}(t) \quad (14)$$

Formula 15

$$v_{ij} = \frac{1}{N}\sum_{t=1}^{N} (D_{ij}(t) - AveD_{ij})^2 \quad (15)$$

and satisfies $v_{ij} \leq Th2$, the values $D_{ij}(t)$ of the SOM output data each satisfying $D_{ij}(t) > Th3$ where Th3 is a threshold.

Thus, the state determination apparatus performs state determination processing using the template data obtained by averaging, in the temporal direction, the SOM output data obtained during the period in which the identical state continues. The template data is created through the averaging processing using data whose variance in the temporal direction is smaller than the threshold and element data larger than the threshold. Using such template data allows the state determination apparatus to perform appropriate state determination processing.

A twelfth aspect of the invention provides the state determination apparatus of the one of the second to seventh aspect of the invention in which the template data is composed of two-dimensional elements.

The template data is created based on N pieces of SOM output data obtained during a period from timing t=1 to timing t=N (N is a natural number) in which an identical state continues.

The template data is created based on N pieces of SOM output data obtained during a period from timing t=1 to timing t=N (N is a natural number) in which an identical state continues.

Assuming that (1) the template data is composed of m×n (m and n are natural numbers) pieces of data, (2) gi is element data at a second-dimensional coordinate (i, j) (i and j are natural numbers satisfying 1≤i≤m and 1≤j≤n) of the template data, (3) $D_{ij}(t)$ is element data at a second-dimensional coordinate (i, j) of the SOM output data at timing t, and (4) $\sigma_{ij}$ is a standard deviation of element data at the coordinate (i, j) obtained by Formula 16

$$AveD_{ij} = \frac{1}{N}\sum_{t=1}^{N} D_{ij}(t) \quad (16)$$

Formula 17

$$v_{ij} = \frac{1}{N}\sum_{t=1}^{N} (D_{ij}(t) - AveD_{ij})^2 \quad (17)$$

$\sigma_{ij} = sqrt(v_{ij})$ sqrt(x): a function that returns the square root of x, the template data is created by (A) setting an average values of the SOM output data $D_{ij}(t)$ to the value $g_{ij}$ when $abs(D_{ij}(t) - AveD_{ij}) \leq n1 \times \sigma_{ij}$ is satisfied and (B) setting zero to the value $g_{ij}$ when $abs(D_{ij}(t) - AveD_{ij}) \leq n1 \times \sigma_{ij}$ is not satisfied.

Thus, the state determination apparatus performs state determination processing using the template data obtained by averaging, in the temporal direction, the SOM output data obtained during the period in which the identical state continues. The template data is created through the averaging processing using data whose value is within a range from the average value minus 3σ to the average value plus 3σ inclusive. Using such template data allows the state determination apparatus to perform appropriate state determination processing.

A thirteenth aspect of the present invention provides a state determination method including a feature vector obtaining step, a normalization step, a mapping conversion step, a matching processing step, an activity value obtaining step, a state determination step, and a time series estimation step.

The feature vector obtaining step includes obtaining feature vector data from measured data obtained by measuring an event with an unknown state.

The normalization step includes obtaining a norm of the feature vector data and obtaining normalized feature vector data by normalizing the feature vector data;

The mapping conversion step includes obtaining SOM output data by mapping the normalized feature vector data into a space whose dimension differs from a dimension of the normalized feature vector data.

The matching processing step includes obtaining adaptability data indicating a correlation degree between template data indicating a state and the SOM output data obtained by the mapping conversion step.

The activity value obtaining step includes obtaining an activity value indicating a probability that the norm obtained by the normalization step corresponds to a norm of the feature vector data obtained in a state.

The state determination step including obtaining a state evaluation value based on at least one of the adaptability data obtained by the matching processing circuitry and the activity value obtained by the activity value obtaining step.

The time series estimation step includes estimating a state indicated by the measured data based on the state evaluation value and state transition probability between states.

This achieves the state determination method having the same advantageous effects as the state determination apparatus of the first or second aspect of the present invention.

A fourteenth aspect of the present invention provides an integrated circuit including feature vector obtaining circuitry, normalization circuitry, mapping conversion circuitry, matching processing circuitry, activity value obtaining circuitry, state determination circuitry, and time series estimation circuitry.

The feature vector obtaining circuitry is configured to obtain feature vector data from measured data obtained by measuring an event with an unknown state.

The normalization circuitry is configured to obtain a norm of the feature vector data and obtain normalized feature vector data by normalizing the feature vector data.

The mapping conversion circuitry is configured to obtain SOM output data by mapping the feature vector data into a space whose dimension differs from the dimension of the feature vector data.

The matching processing circuitry configured to obtain adaptability data indicating a correlation degree between template data indicating a state and the SOM output data obtained by the mapping conversion circuitry.

The activity value obtaining circuitry is configured to obtain an activity value indicating a probability that the norm obtained by the normalization circuitry corresponds to a norm of the feature vector data obtained in a state.

The state determination circuitry is configured to obtain a state evaluation value based on at least one of the adaptability data obtained by the matching processing circuitry and the activity value obtained by the activity value obtaining circuitry.

The time series estimation circuitry is configured to estimate a state indicated by the measured data based on the state evaluation value and state transition probability between states.

This achieves the integrated circuit having the same advantageous effects as the state determination apparatus of the first or second aspect of the present invention.

What is claimed is:

1. A state determination apparatus comprising:
feature vector obtaining circuitry configured to obtain feature vector data from measured data obtained by measuring an event by a target object with an unknown state;
normalization circuitry configured to obtain a norm of the feature vector data and obtain normalized feature vector data by normalizing the feature vector data;
mapping conversion circuitry configured to obtain SOM output data by mapping the normalized feature vector data into a space whose dimension differs from a dimension of the normalized feature vector data using only a single map, the SOM output data being outputted from a last output layer of SOM, the SOM output data being two-dimensional map data including discontinuous image regions, wherein the mapping conversion circuitry is configured to obtain the SOM output data based on the normalized feature vector data and SOM combining weight vector data;
matching processing circuitry configured to obtain adaptability data indicating a correlation degree between template data indicating a k-th state, k being a natural number satisfying $1 \leq k \leq M$, where M is a natural number, and the SOM output data, by calculating an inner product (IP(k)) or a Euclidean distance (ED(k)) between the template data and the SOM output, the template data being a calculated average value of the k-th state in a m1×m2 two-dimensional template data form, m1 and m2 being natural numbers, wherein the IP(k) is calculated by $$IP(k) = \sum_{j=1}^{m2} \sum_{i=1}^{m1} (D_{ij} \times g_{ij})$$

and the ED(k) is calculated by $$ED(k) = \sum_{j=1}^{m2} \sum_{i=1}^{m1} |D_{ij} - g_{ij}|^2$$

where $g_{ij}$ is element data at a second-dimensional coordinate (i, j), i and j being natural numbers satisfying $1 \leq i \leq m1$ and $1 \leq j \leq m2$ of the template data, and $D_{ij}$ is element data at the second-dimensional coordinate (i, j) of the SOM output data;
activity value obtaining circuitry configured to obtain an activity value indicating a probability that the norm obtained by the normalization circuitry corresponds to a norm of the feature vector data obtained in a state;
state determination circuitry configured to obtain a state evaluation value using both the adaptability data obtained by the matching processing circuitry and the activity value obtained by the activity value obtaining circuitry, the state evaluation value being obtained after the adaptability data and the activity value have been obtained by the matching processing circuitry and the activity value obtaining circuitry respectively; and time series estimation circuitry configured to:
obtain information regarding a previous state of the target object,
obtain, from a memory, each state transition probability from the previous state to a plurality of predetermined states, the memory storing, as the state transition probability, each probability data for combinations of transitions from one of the plurality of predetermined states at a first timing to another of the plurality of predetermined states at a second timing after the first timing, and
estimate a current state of the target object, from among the plurality of predetermined states, indicated by the measured data based on the state evaluation value and each of the obtained state transition probability from the previous state to the plurality of predetermined states, by identifying, from among the plurality of predetermined states, a state having a largest value after multiplying the state evaluation value with each of the obtained state transition probability from the previous state to the plurality of predetermined states.

2. The state determination apparatus according to claim 1, wherein
the activity value obtaining circuitry obtains the activity value for the k-th state through processing corresponding to $$f(x) = \frac{1}{\sqrt{2\pi\sigma^2}} \exp\left(-\frac{(x-\mu)^2}{2\sigma^2}\right) \tag{cl3}$$

where $\mu$ is an average value of norms of the feature vector data obtained in the k-th state, $\sigma$ is a standard deviation, x is a value of the norm of the feature vector data, and f(x) is a probability density function.

3. The state determination apparatus according to claim 1, wherein
the matching processing circuitry obtains M (M is a natural number) pieces of adaptability data D_f(1) to D_f(M), which respectively indicate the correlation degree with respect to M pieces of template data Tmpl(1) to Tmpl(M),
the activity value obtaining circuitry obtains activity values D_act(1) to D_act(M), which respectively corresponds to a first state to an M-th state,
the state determination circuitry obtains a state evaluation value D_deci(k) for the k-th state based on the adaptability data D_f(k) for the k-th state and the activity value D_act(k) for the k-th state,
the time series estimation circuitry performs particle filter processing using state transition probability data indicating state transition probability between states, performs prediction processing of the particle filter processing based on the state transition probability data, obtains the number Pt(k) of particles for the k-th state after the prediction processing, obtains a state estimation value D_pf(k) for the k-th state based on the number Pt(k) of particles after the prediction processing and the state evaluation value D_deci(k) for the k-th state, and determines a state indicated by the measured data based on the obtained state estimation value D_pf(k) for the k-th state.

4. The state determination apparatus according to claim 3, wherein
the matching processing circuitry calculates inner products using M (M is a natural number) pieces of the template data and the SOM output data and obtains the calculated inner products as the adaptability data D_f(1) to D_f(M), and
the state determination circuitry obtains the state evaluation value D_deci(k) for the k-th state through processing corresponding to $$D\_deci(k)=h1(D\_f(k),D\_act(k))$$

h1(x, y): a function of variables x and y, and
the time series estimation circuitry obtains the state estimation value D_pf(k) for the k-th state through processing corresponding to $$D\_pf(k)=h2(D\_deci(k),Pt(k))$$

h2(x, y): a function of variables x and y, and
determines that a state corresponding to the largest state estimation value of the state estimation values D_pf(1) to D_pf(M) is the state indicated by the measured data.

5. The state determination apparatus according to claim 3, wherein
the matching processing circuitry calculates Euclidean distances using M (M is a natural number) pieces of the template data and the SOM output data and obtains the calculated Euclidean distances as the adaptability data D_f(1) to D_f(M), and
the state determination circuitry obtains the state evaluation value D_deci(k) for the k-th state through processing corresponding to $$D\_deci(k)=h1(F1(D\_f(k)),D\_act(k))$$

where h1(x,y) is a function of variables x and y, and F1(x) is a monotonically decreasing function with respect to x and the value of the function F1(x) is a positive value or zero, and
the time series estimation circuitry obtains the state estimation value D_pf(k) for the k-th state through processing corresponding to $$D\_pf(k)=h2(D\_deci(k),Pt(k))$$

h2(x, y): a function of variables x and y, and
determines that a state corresponding to the largest state estimation value of the state estimation values D_pf(1) to D_pf(M) is the state indicated by the measured data.

6. The state determination apparatus according to claim 1, wherein
the template data is composed of two-dimensional elements, and
a sum of all values of the two-dimensional elements is "1".

7. The state determination apparatus according to claim 1, wherein
the template data is composed of two-dimensional elements,
the template data is created based on N pieces of SOM output data obtained during a period from timing t=1 to timing t=N (N is a natural number) in which an identical state continues, and
assuming that the template data is composed of m×n (m and n are natural numbers) pieces of data, the template data is created by setting a value $g_{ij}$ to element data at a second-dimensional coordinate (i, j) (i and j are natural numbers satisfying 1≤i≤m and 1≤j≤n) of the template, the value $g_{ij}$ being obtained by $$g_{ij} = \frac{1}{N}\sum_{t=1}^{N} D_{ij}(t) \tag{cl8}$$

where $g_{ij}$ is element data at a second-dimensional coordinate (i, j) (i and j are natural numbers satisfying 1≤i≤m and 1≤j≤n) of the template data, and $D_{ij}(t)$ is element data at a second-dimensional coordinate (i, j) of the SOM output data at timing t.

8. The state determination apparatus according to claim 1, wherein
the template data is composed of two-dimensional elements,
the template data is created based on N pieces of SOM output data obtained during a period from timing t=1 to timing t=N (N is a natural number) in which an identical state continues, and
assuming that (1) the template data is composed of m×n (m and n are natural numbers) pieces of data, (2) $g_{ij}$ is element data at a second-dimensional coordinate (i, j) (i and j are natural numbers satisfying 1≤i≤m and 1≤j≤n) of the template data, and (3) $D_{ij}(t)$ is element data at a second-dimensional coordinate (i, j) of the SOM output data at timing t, and the template data is created by setting an average value obtained by calculating an average value of the element data $D_{ij}(t)$ satisfying $D_{ij}(t) \geq Th1$ to a value $g_{ij}$ at a second-dimensional coordinate (i, j) of the template data.

9. The state determination apparatus according to claim 1, wherein
the template data is composed of two-dimensional elements,
the template data is created based on N pieces of SOM output data obtained during a period from timing t=1 to timing t=N (N is a natural number) in which an identical state continues, and
assuming that (1) the template data is composed of m×n (m and n are natural numbers) pieces of data, (2) $g_{ij}$ is element data at a second-dimensional coordinate (i, j) (i and j are natural numbers satisfying 1≤i≤m and 1≤j≤n) of the template data, and (3) $D_{ij}(t)$ is element data at a second-dimensional coordinate (i, j) of the SOM output data at timing t, and the template data is created by setting a value $g_{ij}$ to element data at a second-dimensional coordinate (i, j) (i and j are natural numbers satisfying 1≤i≤m and 1≤j≤n) of the template, the value $g_{ij}$ being obtained by calculating an average value of values $D_{ij}(t)$ of the SOM output data at the coordinate (i, j) whose corresponding variance value $v_{ij}$ is obtained by $$AveD_{ij} = \frac{1}{N}\sum_{t=1}^{N} D_{ij}(t) \tag{cl10-1}$$

$$v_{ij} = \frac{1}{N}\sum_{t=1}^{N} (D_{ij}(t) - AveD_{ij})^2 \tag{cl10-2}$$

and satisfies $v_{ij} \leq Th2$.

10. The state determination apparatus according to claim 1, wherein
the template data is composed of two-dimensional elements,
the template data is created based on N pieces of SOM output data obtained during a period from timing t=1 to timing t=N (N is a natural number) in which an identical state continues, and
assuming that (1) the template data is composed of m×n (m and n are natural numbers) pieces of data, (2) $g_{ij}$ is element data at a second-dimensional coordinate (i, j) (i and j are natural numbers satisfying 1≤i≤m and 1≤j≤n) of the template data, and (3) $D_{ij}(t)$ is element data at a second-dimensional coordinate (i, j) of the SOM output data at timing t, and the template data is created by setting a value $g_{ij}$ to element data at a second-dimensional coordinate (i, j) (i and j are natural numbers satisfying 1≤i≤m and 1≤j≤n) of the template, the value $g_{ij}$ being obtained by calculating an average value of values $D_{ij}(t)$ of the SOM output data at the coordinate (i, j) whose corresponding variance value $v_{ij}$ is obtained by $$AveD_{ij} = \frac{1}{N}\sum_{t=1}^{N} D_{ij}(t) \tag{cl11-1}$$

$$v_{ij} = \frac{1}{N}\sum_{t=1}^{N} (D_{ij}(t) - AveD_{ij})^2 \tag{cl11-2}$$

and satisfies $v_{ij} \leq Th2$, the values $D_{ij}(t)$ of the SOM output data each satisfying $D_{ij}(t) > Th3$ where Th3 is a threshold.

11. The state determination apparatus according to claim 1, wherein
the template data is composed of two-dimensional elements,
the template data is created based on N pieces of SOM output data obtained during a period from timing t=1 to timing t=N (N is a natural number) in which an identical state continues, and
assuming that (1) the template data is composed of m×n (m and n are natural numbers) pieces of data, (2) $g_{ij}$ is element data at a second-dimensional coordinate (i, j) (i and j are natural numbers satisfying 1≤i≤m and 1≤j≤n) of the template data, (3) $D_{ij}(t)$ is element data at a second-dimensional coordinate (i, j) of the SOM output data at timing t, and (4) $\sigma_{ij}$ is a standard deviation of element data at the coordinate (i, j) obtained by $$AveD_{ij} = \frac{1}{N}\sum_{t=1}^{N} D_{ij}(t) \tag{cl2-1}$$

$$v_{ij} = \frac{1}{N}\sum_{t=1}^{N} (D_{ij}(t) - AveD_{ij})^2 \tag{cl12-2}$$

$\sigma_{ij} = sqrt(v_{ij})$ sqrt(x): a function that returns the square root of x, the template data is created by (A) setting an average value of the SOM output data $D_{ij}(t)$ to the value $g_{ij}$ when $abs(D_{ij}(t) - AveD_{ij}) \leq n1 \times \sigma_{ij}$ is satisfied and (B) setting zero to the value $g_{ij}$ when $abs(D_{ij}(t) - AveD_{ij}) \leq n1 \times \sigma_{ij}$ is not satisfied.

12. A state determination method comprising:
(A) obtaining feature vector data from measured data obtained by measuring an event by a target object with an unknown state;
(B) obtaining a norm of the feature vector data and obtaining normalized feature vector data by normalizing the feature vector data;
(C) obtaining SOM output data by mapping the normalized feature vector data into a space whose dimension differs from a dimension of the normalized feature vector data using only a single map, the SOM output data being outputted from a last output laver of SOM, the SOM output data being two-dimensional map data including discontinuous image regions, wherein the SOM output data is obtained based on the normalized feature vector data and SOM combining weight vector data;
(D) obtaining adaptability data indicating a correlation degree between template data indicating a k-th state, k being a natural number satisfying 1≤k≤M, where M is a natural number, and the SOM output data, by calculating an inner product (IP(k)) or a Euclidean distance (ED(k)) between the template data and the SOM output, the template data being a calculated average value of the k-th state in a m1×m2 two-dimensional template data form, m1 and m2 being natural numbers, wherein the IP(k) is calculated by $$IP(k) = \sum_{j=1}^{m2}\sum_{i=1}^{m1}(D_{ij} \times g_{ij})$$

and the ED(k) is calculated by $$ED(k) = \sum_{j=1}^{m2}\sum_{i=1}^{m1}|D_{ij} - g_{ij}|^2$$

where $g_{ij}$ is element data at a second-dimensional coordinate (i, j), i and j being natural numbers satisfying 1≤i≤m1 and 1≤j≤m2 of the template data, and $D_{ij}$ is element data at the second-dimensional coordinate (i, j) of the SOM output data;
(E) obtaining an activity value indicating a probability that the norm obtained by the step (B) corresponds to a norm of the feature vector data obtained in a state;
(F) obtaining a state evaluation value using both the adaptability data obtained by the step (D) and the activity value obtained by the step (E), the state evaluation value being obtained after the adaptability data and the activity value have been obtained by the step (D) and the step (E) respectively;
(G) obtaining information regarding a previous state of the target object;
(H) obtaining, from a memory, each state transition probability from the previous state to a plurality of predetermined states, the memory storing, as the state transition probability, each probability data for combinations of transitions from one of the plurality of predetermined states at a first timing to another of the plurality of predetermined states at a second timing after the first timing; and
(I) estimating a current state of the target object, from among the plurality of predetermined states, indicated by the measured data based on the state evaluation value and each of the obtained state transition probability from the previous state to the plurality of predetermined states, by identifying, from among the plurality of predetermined states, a state having a largest value after multiplying the state evaluation value with each of the obtained state transition probability from the previous state to the plurality of predetermined states.

13. An integrated circuit comprising:
feature vector obtaining circuitry configured to obtain feature vector data from measured data obtained by measuring an event by a target object with an unknown state;
normalization circuitry configured to obtain a norm of the feature vector data and obtain normalized feature vector data by normalizing the feature vector data;
mapping conversion circuitry configured to obtain SOM output data by mapping the normalized feature vector data into a space whose dimension differs from a dimension of the normalized feature vector data using only a single map, the SOM output data being outputted from a last output laver of SOM, the SOM output data being two-dimensional map data including discontinuous image regions, wherein the manning conversion circuitry is configured to obtain the SOM output data based on the normalized feature vector data and SOM combining weight vector data;
matching processing circuitry configured to obtain adaptability data indicating a correlation degree between template data indicating a k-th state, k being a natural number satisfying 1≤k≤M, where M is a natural number, and the SOM output data, by calculating an inner product (IP(k)) or a Euclidean distance (ED(k)) between the template data and the SOM output, the template data being a calculated average value of the k-th state in a m1×m2 two-dimensional template data form, m1 and m2 being natural numbers, wherein the IP(k) is calculated by $$IP(k) = \sum_{j=1}^{m2}\sum_{i=1}^{m1}(D_{ij} \times g_{ij})$$

and the ED(k) is calculated by $$ED(k) = \sum_{j=1}^{m2}\sum_{i=1}^{m1}|D_{ij} - g_{ij}|^2$$

where $g_{ij}$ is element data at a second-dimensional coordinate (i, j), i and j being natural numbers satisfying 1≤i≤m1 and 1≤j≤m2 of the template data, and $D_{ij}$ is element data at the second-dimensional coordinate (i, j) of the SOM output data;
activity value obtaining circuitry configured to obtain an activity value indicating a probability that the norm obtained by the normalization circuitry corresponds to a norm of the feature vector data obtained in a state;
state determination circuitry configured to obtain a state evaluation value using both the adaptability data obtained by the matching processing circuitry and the activity value obtained by the activity value obtaining circuitry, the state evaluation value being obtained after the adaptability data and the activity value have been obtained by the matching processing circuitry and the activity value obtaining circuitry respectively; and time series estimation circuitry configured to:
- obtain information regarding a previous state of the target object,
- obtain, from a memory, each state transition probability from the previous state to a plurality of predetermined states, the memory storing, as the state transition probability, each probability data for combinations of transitions from one of the plurality of predetermined states at a first timing to another of the plurality of predetermined states at a second timing after the first timing, and
- estimate a current state of the target object, from among the plurality of predetermined states, indicated by the measured data based on the state evaluation value and each of the obtained state transition probability from the previous state to the plurality of predetermined states, by identifying, from among the plurality of predetermined states, a state having a largest value after multiplying the state evaluation value with each of the obtained state transition probability from the previous state to the plurality of predetermined states.

14. The state determination apparatus according to claim 1, wherein
the state transition probability is stored in the memory in a table format.

15. The state determination apparatus according to claim 1, wherein
the measured data is obtained by at least a sensor attached to a human body, and
the time series estimation circuitry is configured to estimate a state of the human body, from among the plurality of the states including at least a sitting state indicating the human body is sitting, a standing state indicating the human body is standing, a running state indicating the human body is running, and a walking state indicating the human body is walking, an upstairs state indicating the human body is going upstairs, and a downstairs state indicating the human body is going down stairs, indicated by the measured data based on the state evaluation value and the state transition probability between states, the state transition probability being stored in a memory and including each probability data for combinations of transitions from one of the sitting state, the standing state, the running state, the walking state, the upstairs state, and the downstairs state at a first timing to another of the sitting state, the standing state, the running state, the walking state, the upstairs state, and the downstairs state at a second timing after the first timing.

16. The state determination apparatus according to claim 1, wherein
the SOM combining weight vector data indicates a combining weight between nodes in an input layer and neurons in an output layer in a learning phase of the mapping conversion circuitry.

* * * * *